(12) United States Patent
Nakagawa et al.

(10) Patent No.: US 10,673,289 B2
(45) Date of Patent: Jun. 2, 2020

(54) MOTOR WITH STIFFENED STATOR CORE, MANUFACTURING METHOD THEREOF, AND WASHING MACHINE INCLUDING THE MOTOR

(71) Applicant: Samsung Electronics Co., Ltd., Suwon-si (KR)

(72) Inventors: Yukinori Nakagawa, Minoo (JP); Minoru Yoshida, Minoo (JP); Yasuyuki Sonoda, Minoo (JP); Yasmasa Nagasaki, Minoo (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 958 days.

(21) Appl. No.: 15/024,184

(22) PCT Filed: Nov. 7, 2014

(86) PCT No.: PCT/KR2014/010693
§ 371 (c)(1),
(2) Date: Mar. 23, 2016

(87) PCT Pub. No.: WO2015/069062
PCT Pub. Date: May 14, 2015

(65) Prior Publication Data
US 2016/0241090 A1 Aug. 18, 2016

(30) Foreign Application Priority Data

Nov. 8, 2013 (JP) ................................ 2013-231706
Nov. 22, 2013 (JP) ................................ 2013-241654
(Continued)

(51) Int. Cl.
*H02K 1/16* (2006.01)
*H02K 15/02* (2006.01)
(Continued)

(52) U.S. Cl.
CPC ............. *H02K 1/16* (2013.01); *D06F 37/206* (2013.01); *D06F 37/304* (2013.01); *H02K 1/148* (2013.01);
(Continued)

(58) Field of Classification Search
CPC .......... H02K 1/16; H02K 1/165; H02K 1/148; H02K 1/185; H02K 3/522; H02K 2213/03;
(Continued)

(56) References Cited

U.S. PATENT DOCUMENTS 4,914,934 A * 4/1990 Fritzsche ................. H02K 1/16
29/596
7,067,948 B2 * 6/2006 Yamaguchi ............ H02K 1/278
310/156.47
(Continued)

FOREIGN PATENT DOCUMENTS

EP 2120313 11/2009
EP 2584680 4/2013
(Continued)

OTHER PUBLICATIONS

European Communication dated Nov. 15, 2018 in European Patent Application No. 14859907.9.
(Continued)

*Primary Examiner* — Maged M Almawri
(74) *Attorney, Agent, or Firm* — Staas & Halsey LLP

(57) ABSTRACT

Provided is a high-powered low profile motor. The motor includes a stator (20) facing a rotor (50) while having a gap from the rotor (50). The stator (20) includes a ring-shaped connection core (10) formed by connecting a plurality of divided cores (5*a*) and an insulator (24) formed as if surrounding the connection core (10) by resin molding by an insertion forming. An inner diameter (r) of the connection
(Continued)

core (10) is set smaller than inner diameters (R) of the divided cores (5a) bent in a half moon shape when connected.

6 Claims, 57 Drawing Sheets

(30) Foreign Application Priority Data

| | | |
|---|---|---|
| Dec. 4, 2013 | (JP) | 2013-251030 |
| Dec. 26, 2013 | (JP) | 2013-268292 |
| Aug. 8, 2014 | (JP) | 2014-162977 |
| Nov. 7, 2014 | (KR) | 10-2014-0154270 |

(51) Int. Cl.

| | |
|---|---|
| *H02K 1/18* | (2006.01) |
| *H02K 15/12* | (2006.01) |
| *H02K 1/14* | (2006.01) |
| *H02K 3/52* | (2006.01) |
| *D06F 37/30* | (2020.01) |
| *D06F 37/20* | (2006.01) |
| *H02K 1/27* | (2006.01) |
| *H02K 3/34* | (2006.01) |
| *H02K 15/00* | (2006.01) |
| *H02K 3/487* | (2006.01) |
| *H02K 15/095* | (2006.01) |

(52) U.S. Cl.
CPC ............. *H02K 1/185* (2013.01); *H02K 3/522* (2013.01); *H02K 15/02* (2013.01); *H02K 15/12* (2013.01); *H02K 1/2753* (2013.01); *H02K 3/345* (2013.01); *H02K 3/487* (2013.01); *H02K 15/0018* (2013.01); *H02K 15/095* (2013.01); *H02K 2203/06* (2013.01); *H02K 2213/03* (2013.01)

(58) Field of Classification Search
CPC .... H02K 2213/06; H02K 15/02; H02K 15/12; H02K 15/0018; H02K 15/095; H02K 3/345; H02K 3/487
USPC ............ 310/156.47, 154.09, 154.41, 156.35, 310/216.111, 216.004, 216.023, 216.024, 310/216.025–216.035, 216.008, 216.009, 310/216.015, 216.018, 216.025–216.032, 310/114, 45, 216, 23, 216.001–216.137, 310/49.29, 49.31, 49.39, 49.41, 216.02, 310/5–216.035, 216.025–216.032; 29/596
See application file for complete search history.

(56) References Cited

U.S. PATENT DOCUMENTS

| | | | | |
|---|---|---|---|---|
| 8,487,502 | B2* | 7/2013 | Kaiser | H02K 1/16 |
| | | | | 310/216.004 |
| 8,581,468 | B2* | 11/2013 | Kudose | H02K 1/16 |
| | | | | 310/156.78 |
| 9,780,607 | B2* | 10/2017 | Weiske | H02K 1/146 |
| 2003/0127938 | A1* | 7/2003 | Shen | H02K 15/026 |
| | | | | 310/216.043 |
| 2004/0061406 | A1* | 4/2004 | Yokota | H02K 1/17 |
| | | | | 310/216.004 |
| 2004/0217665 | A1* | 11/2004 | Hans | H02K 16/00 |
| | | | | 310/156.47 |
| 2005/0067912 | A1* | 3/2005 | Murakami | H02K 1/148 |
| | | | | 310/216.043 |
| 2005/0189837 | A1* | 9/2005 | Lee | H02K 1/148 |
| | | | | 310/216.004 |
| 2008/0088197 | A1* | 4/2008 | Okamoto | H02K 1/16 |
| | | | | 310/216.008 |
| 2008/0136272 | A1* | 6/2008 | Ishikawa | H02K 1/145 |
| | | | | 310/58 |
| 2011/0169368 | A1* | 7/2011 | Tsumagari | H02K 1/12 |
| | | | | 310/216.009 |
| 2014/0210284 | A1* | 7/2014 | Banba | H02K 1/16 |
| | | | | 310/43 |
| 2014/0354108 | A1* | 12/2014 | Nobata | H02K 1/185 |
| | | | | 310/216.135 |
| 2016/0164351 | A1* | 6/2016 | Weiske | H02K 1/146 |
| | | | | 310/216.009 |
| 2016/0365778 | A1* | 12/2016 | Yu | H02K 1/148 |

FOREIGN PATENT DOCUMENTS

| | | |
|---|---|---|
| JP | 2001-69727 | 3/2001 |
| JP | 2005-130620 | 5/2005 |
| JP | 2005-176597 | 6/2005 |
| JP | 2007-181372 | 7/2007 |
| JP | 2012-222834 | 11/2012 |
| JP | 2012-235624 | 11/2012 |
| KR | 10-1243589 | 3/2013 |
| KR | 10-2013-0032330 | 4/2013 |

OTHER PUBLICATIONS

Extended European Search Report dated May 2, 2018 in European Patent Application No. 14859907.9.
International Search Report dated Feb. 12, 2015 in International Patent Application No. PCT/KR2014/010693.
European Communication dated Jan. 2, 2018 in European Patent Application No. 14859907.9.
European Communication dated Mar. 29, 2016 in European Patent Application No. 14859907.9.

* cited by examiner (a)

(b)

(a)

(b)

(a)

(b)

(a)

(b)

(a)

(b)

(a)

(b)

(a)

(b)

(a)

(b)

(a)　　　　　　　　　　(b)

(c)　　　　　　　　　　(d)

MOTOR WITH STIFFENED STATOR CORE, MANUFACTURING METHOD THEREOF, AND WASHING MACHINE INCLUDING THE MOTOR

CROSS-REFERENCE TO RELATED APPLICATIONS

This application is a U.S. national stage application of International Application No. PCT/KR2014/010693 filed Nov. 7, 2014, and claims the priority benefit of Japanese Application No. 2013-231706, filed on Nov. 8, 2013 in the Japanese Intellectual Property Office, Japanese Application No. 2013-241654, filed on Nov. 22, 2013 in the Japanese Intellectual Property Office, Japanese Application No. 2013-251030, filed on Dec. 4, 2013 in the Japanese Intellectual Property Office, Japanese Application No. 2013-268292, filed on Dec. 26, 2013 in the Japanese Intellectual Property Office, Japanese Application No. 2014-162977, filed on Aug. 8, 2014 in the Japanese Intellectual Property Office, and Korean Application No. 10-2014-0154270, filed on Nov. 7, 2014 in the Korean Intellectual Property Office, the disclosures of which are incorporated herein by reference.

BACKGROUND

1. Field

The present invention relates to a low profile motor having a thin thickness in a rotation axis direction that is highly preferably used as a washing machine driving motor and the like.

2. Description of the Related Art

The prior art of the present invention includes, for example, Patent Documents 1 to 7.

Patent Document 1 relates to a first embodiment to be described below, and Patent Documents 2 to 4 relate to a second embodiment. Patent Documents 5 and 6 relate to a third embodiment, and Patent Document 7 relates to a fourth embodiment.

A method of forming a ring-shaped stator core by curving band-shaped, divided cores, storing the plurality of bent divided cores in a mold, and resin molding the plurality of divided cores by an insertion forming is described in Patent Document 1.

A flat motor having a large diameter is disclosed in Patent Document 2. Here, a stator includes a main core having a plurality of teeth protruding from a ring-shaped base toward the outside (outer rotor type). A coil is formed on the teeth of the main core using an insulating insulator.

In the second embodiment of Patent Document 2, a sub-core formed by press processing a weakly magnetic material is mounted on the main core. The sub-core has a ring-shaped plate installed as if surrounding an upper surface of the main core, and a plurality of blocking units bent downward from an outer circumference of the plate, wherein the blocking units are disposed to be placed between front ends of the teeth adjacent to each other. Here, however, the blocking units are not fixed to the teeth.

A fixing structure that blocks the front ends of the teeth adjacent to each other are, for example, disclosed in Patent Document 3 or Patent Document 4.

A nonmagnetic adhesive or a resin is fixed between the front ends of the teeth adjacent to each other in Patent Document 3.

In Patent Document 4, grooves extending in an axial direction are formed at circumferential side surfaces of the front ends of the teeth, and connection members formed of ceramic materials in a shape of a rectangular plate are inserted into and adhered to the grooves.

A nozzle winding method and a flyer method exist as a winding method of forming each of three-phase coils by intensively winding one wire.

FIG. 1 illustrates schematics of these methods, and (a) represents the flyer method, and (b) represents the nozzle winding method.

In the flyer method, a flyer 102 is rapidly rotated and moved back and forth while a wire W is withdrawn from a front end of each of teeth 101a of a stator core 101, thereby winding the wire W around the teeth 101a to form a coil.

In the nozzle winding method, a nozzle 103 is vertically moved and the stator core 101 is rotated while the wire W is withdrawn from a front end of the nozzle 103 with respect to each of the teeth 101a of the stator core 101 to rotate the nozzle 103 around each of the teeth 101a, thereby winding the wire W around the teeth 101a to form a coil.

Although a rapid winding is possible by the flyer method, aligned winding (winding a wire around teeth in an aligned state) is difficult, thus not being able to simultaneously wind a plurality of phase coils.

Meanwhile, since aligned winding is possible by the nozzle winding method although rapid winding is difficult, a plurality of phase coils may be simultaneously wound by increasing nozzles.

Content related to a wiring structure of a connection line is in Patent Documents 5 and 6. Problems to be solved in these related art documents include avoiding twisting between different phases or effectively using spaces.

In Patent Document 5, disclosed is a stator in which connection lines of three-phase coils are wired and including an upper end connection line route and a lower end connection line route that are vertically separated. The connection lines of each of the phases are wound in order for the first-phase connection line to be disposed at the upper end connection line route, the second-phase connection line to be disposed at the upper end connection line route and the lower end connection line, and the third-phase connection line to be disposed at the lower end connection line route.

In Patent Document 6, disclosed is a stator that has the first-phase connection line disposed at an upper cover side of the stator and has the connection lines of the other two phases disposed at a lower cover side of the stator among the connection lines of three phases.

In an example related to a rotor, as illustrated in FIG. 2, disclosed is a rotor in which a rotor core 110 having a plurality of magnet pieces 111 buried therein and a support plate 120 to interlock and support a rotation axis are integrally formed by a resin 130 (Patent Document 7).

[Patent Document 1] Japanese Unexamined Patent Application Publication No. 2003-143814
[Patent Document 2] Japanese Unexamined Patent Application Publication No. 2007-159396
[Patent Document 3] Japanese Unexamined Patent Application Publication No. 2000-184648
[Patent Document 4] Japanese Unexamined Patent Application Publication No. 2000-134849
[Patent Document 5] Japanese Unexamined Patent Application Publication No. 2007-181372
[Patent Document 6] Japanese Unexamined Patent Application Publication No. 1998-4645
[Patent Document 7] Japanese Unexamined Patent Application Publication No. 2006-320141

SUMMARY

Disclosure

Technical Problem

A plurality of divided cores are molded by a resin in the method described in Patent Document 1 such that some degree of stiffness of a stator core may be obtained. As mentioned above, increasing a stiffness of a stator is an effective way to decrease a vibrational noise of a motor.

However, since motors being used in driving washing machines or electric vehicles, and the like are becoming capable of higher outputs, stator cores are becoming larger and lower in profile. Thus, it is required to further improve a stiffness of the stator cores.

Here, the present invention is directed to providing a high-powered low profile motor, and one main aspect of the present invention is to provide a high-powered low profile motor that is capable of improving a stiffness of a stator core.

Technical Solution

A first motor being disclosed is a motor including a rotor that rotates about a rotation axis and a stator facing the rotor while having a gap from the rotor. The stator includes a ring-shaped connection core formed by connecting a plurality of divided cores and an insulator formed by an insertion forming as if surrounding the connection core, wherein an inner diameter of the connection core is set smaller than an inner diameter of the divided cores that are bent in a half moon shape when connected.

Consequently, due to the inner diameter of the ring-shaped connection core formed by connecting the parabolic divided cores being smaller than the inner diameters of the divided cores in the first motor, a spring-back force, i.e. a force of each of the divided cores attempting to expand outward in a diameter direction in order to restore to its original inner diameter acts on all directions of the connection core.

Consequently, a stiffness of the connection core may be improved by the action of the spring-back force.

A second motor being disclosed is an inner rotor type motor in which a stator is disposed around a rotor that rotates about a rotation axis.

The stator includes a stator core having a core main body formed of a magnetic body integrated with an insulator formed of a synthetic resin by being buried in the insulator by an insertion forming, a cylindrical yoke part, and a plurality of teeth parts extending from an inner circumferential surface of the corresponding yoke part toward a center to be radially disposed, a plurality of coils formed by each being wound around the teeth parts, and an enclosure integrally formed using a synthetic resin to be mounted on the stator core from at least one direction of a rotation axis direction.

The enclosure includes a ring-shaped base portion covered by the coils, and a plurality of gap blocking parts drooping from an inner circumference of the ring-shaped base portion to block gaps between front ends of the teeth parts adjacent to each other. Joining surfaces extending in the rotation axis direction to come in contact with the central side are each installed at both circumferential sides of the front end portions of the teeth parts. Also, both side portions of each of the gap blocking parts are deposited on the joining surfaces.

According to the second motor, although it will be described in detail later, flame resistance or durability, manufacturability of a stator may be increased and a stiffness of teeth parts may be improved at the same time.

A third motor being disclosed is a motor including a stator core having a cylindrical yoke part and a plurality of teeth parts radially extending in equal intervals in a circumferential direction from the yoke part, wherein the yoke part and the teeth parts are covered with an insulating insulator. Coil groups of first to third phases are installed at each of the teeth parts by intensive winding a wire to form the coils.

The coil group of each phase is formed using one wire and has a connection line to connect two coils disposed by having one or more coils placed therebetween. The insulator is inserted at a ring-shaped one end portion coming in contact with the rotation axis direction, and has an inside guide wall unit and an outside guide wall unit disposed in a concentric circle form while having a gap therebetween.

A plurality of crossing routes through which the connection lines pass are formed at an upper end edge of each of the inside guide wall unit and the outside guide wall unit as the corresponding upper end edge is concave. An inside route that enables the connection lines to be wired is installed between the inside guide wall unit and the outside guide wall unit, and an outside route that enables the connection lines to be wired is installed at an outside of the outside guide wall unit.

In addition, the connection line of the first-phase coil group is wired to the inside route, the connection line of the second-phase coil group is wired to the outside route, and the connection line of the third-phase coil group passes through an upper portion of the connection line of the first-phase or second-phase coil group to be wired to the inside route or the outside route.

According to the third motor, although it will be described in detail later, a motor may be lower in profile since a coil of each phase may be formed with a small number of processes.

A fourth motor being disclosed is an inner rotor type motor in which a stator is disposed around a rotor that rotates about a rotation axis. The rotor includes a ring-shaped rotary body having a rotor core and a plurality of magnet pieces and a support body installed at an inside of the rotary body in a diameter direction to interlock and support a shaft rotating about a rotation axis.

The rotary body and the support body are integrally formed with a resin by an insertion forming, an inner circumferential surface of a first resin portion that surrounds the rotary body, and an outer circumferential surface of a second resin portion that surrounds the support body are connected by a connection part formed of a third resin portion, and the third resin portion forming the connection part is connected to an axial central portion of the inner circumferential surface of the first resin portion.

According to the fourth motor, although it will be described in detail later, an axial tilting of a rotary body may be prevented, and a precision of vibration in a radial direction of the rotary body may be improved.

A fifth motor being disclosed is an inner rotor type motor in which a stator is disposed around a rotor that rotates about a rotation axis. The stator has a core surrounded by an insulator by resin molding by an insertion forming. The rotor includes a ring-shaped rotary body having a rotor core and a plurality of magnet pieces, and a support body installed at an inside of the rotary body in a diameter direction to interlock and support a shaft rotating about a rotation axis.

The rotary body and the support body are integrally formed with a resin by resin molding by an insertion forming. Stator-side resin injection traces which are a plurality of resin injection traces are formed approximately in equal intervals in the circumferential direction at the insulator of the stator. Rotor-side resin injection traces which are a plurality of resin injection traces are formed approximately in equal intervals in the circumferential direction at the rotor.

In addition, a number of the stator-side resin injection traces and a number of the rotor-side resin injection traces cannot have a common factor other than 1.

A least common multiple between the number of stator-side resin injection traces and the number of rotor-side resin injection traces may be greater than a number of slots of the stator and a number of magnetic poles of the rotor.

According to the fifth motor, although it will be described in detail later, vibration or noise of a motor may be suppressed.

Advantageous Effects

According to the present invention, a high-powered low profile motor may be provided.

Figure 4:
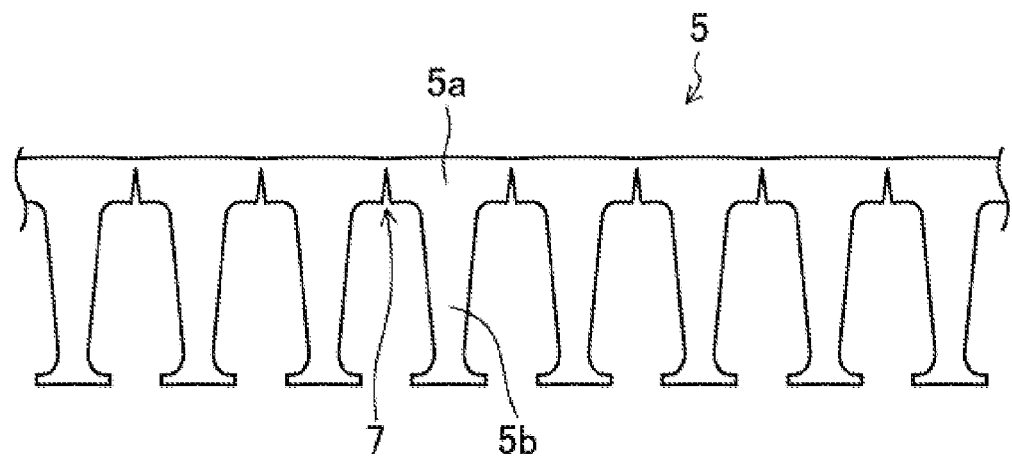
Figure 4:
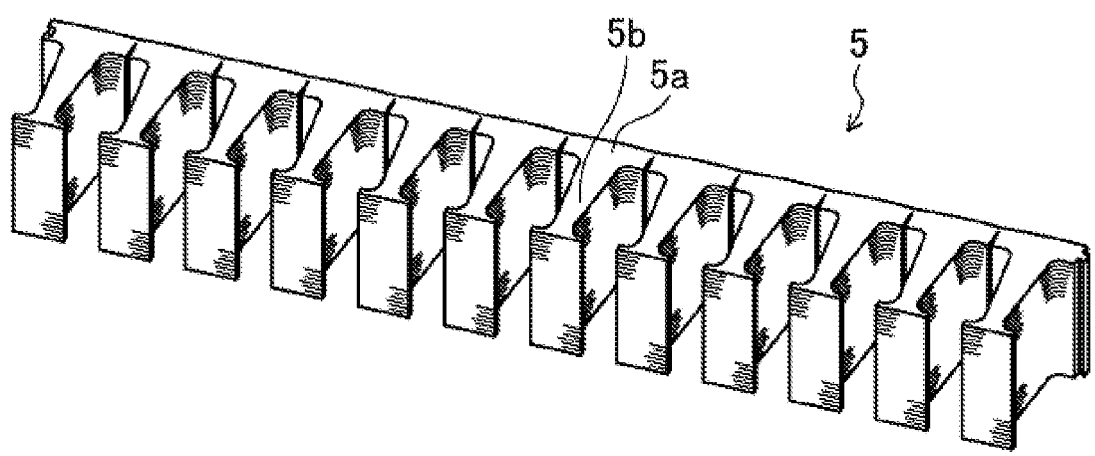

(a) and (b) of FIG. 4 are views illustrating a process of preparing band-shaped divided cores in a first embodiment.

Figure 5:
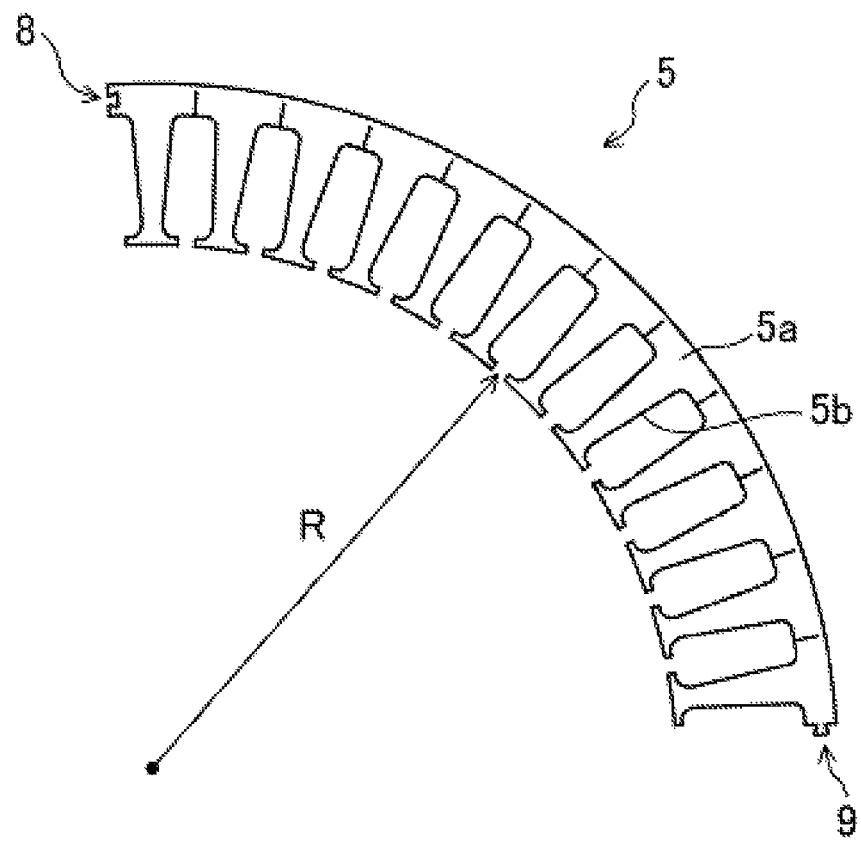
Figure 5:
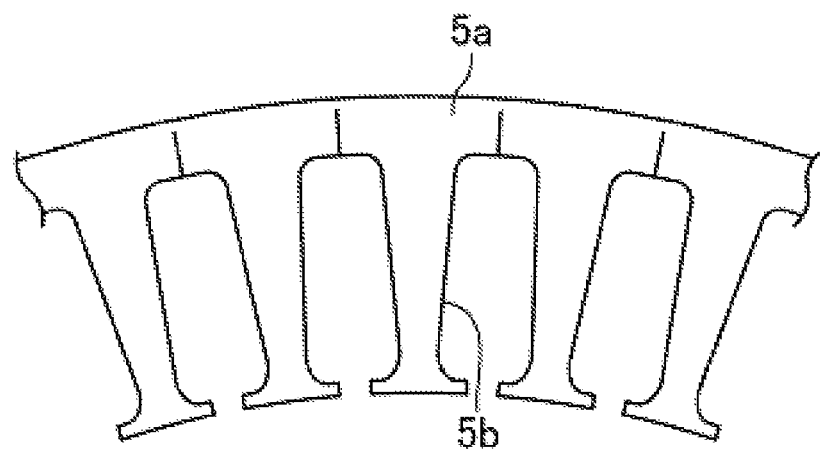

(a) and (b) of FIG. 5 are views illustrating a process of curving band-shaped divided cores in the first embodiment.

Figure 6:
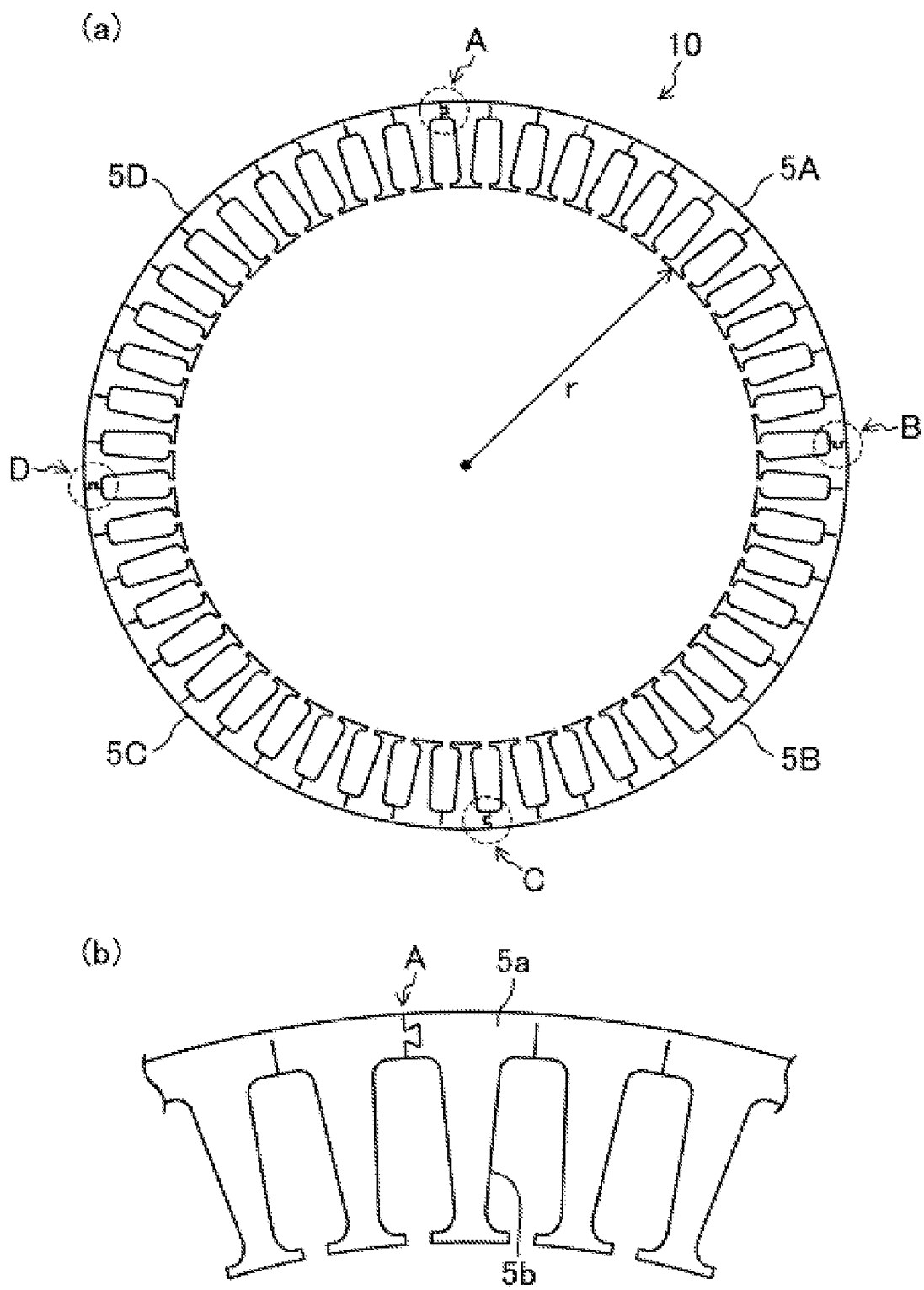

(a) and (b) of FIG. 6 are views illustrating a process of forming a ring-shaped connection core by coupling the divided cores that are bent in a half moon shape.

Figure 7:
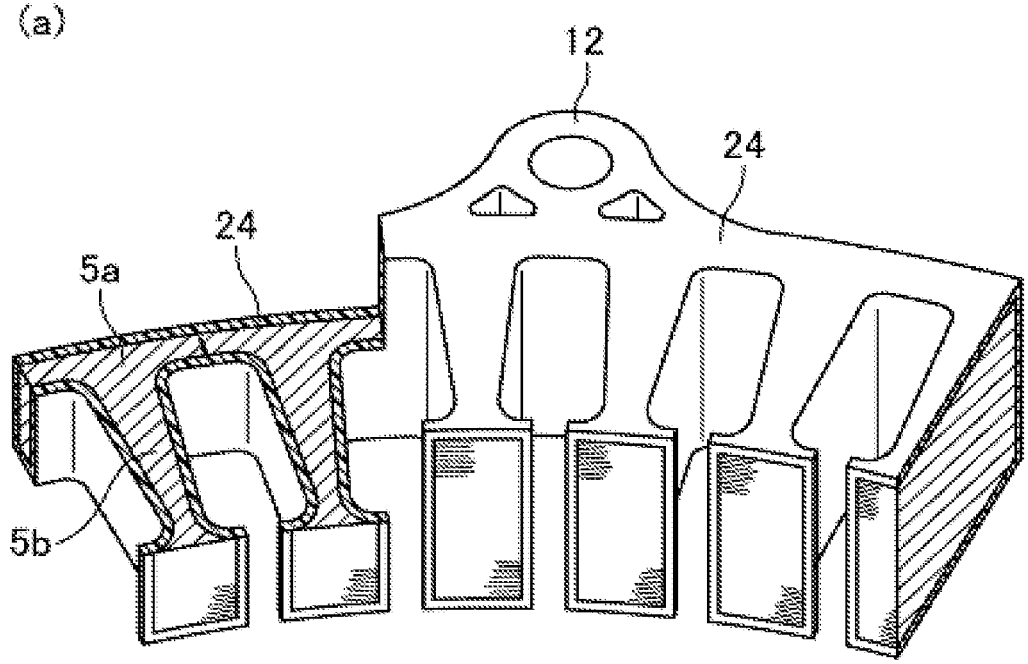
Figure 7:
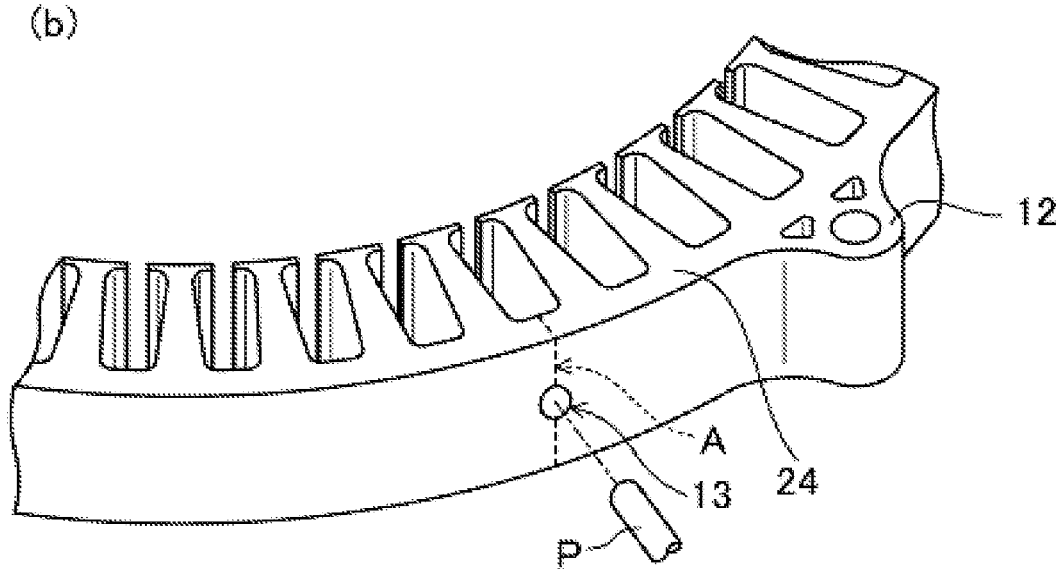

(a) and (b) of FIG. 7 are views illustrating a process of resin-molding the ring-shaped connection core by an insertion forming in the first embodiment.

Figure 8:
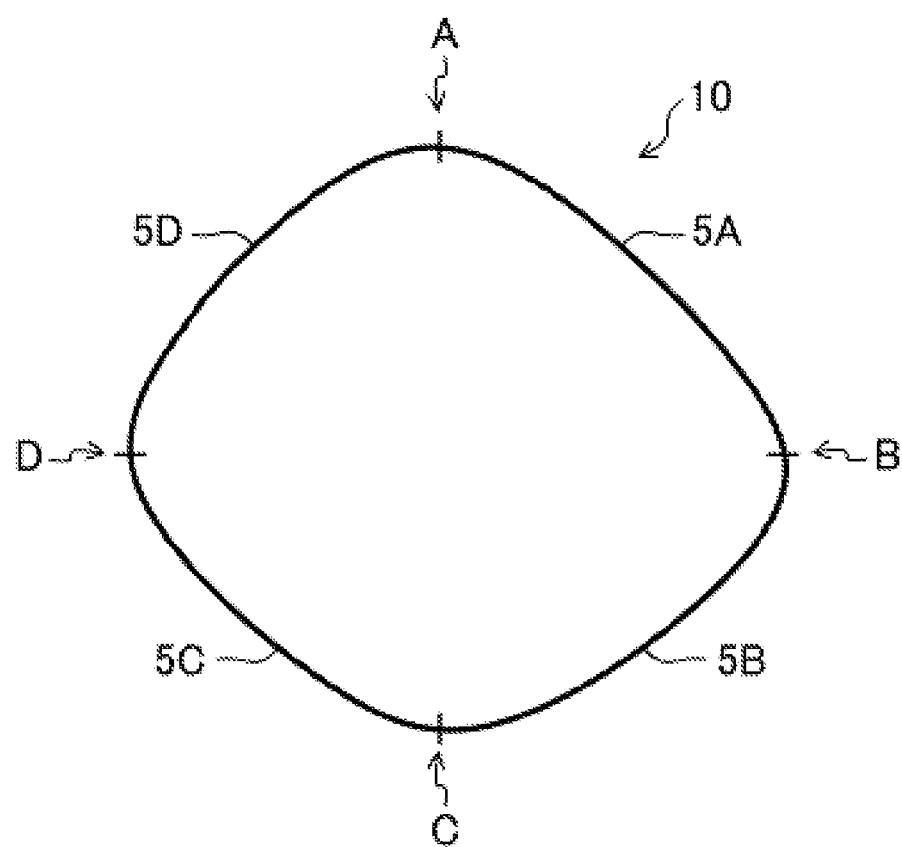

FIG. 8 is a view illustrating an image of an inner diameter of the connection core formed by coupling the divided cores.

Figure 9:
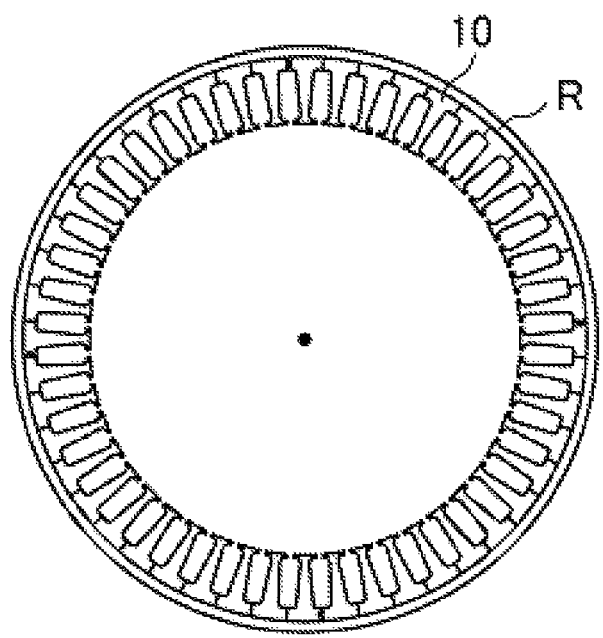
Figure 9:
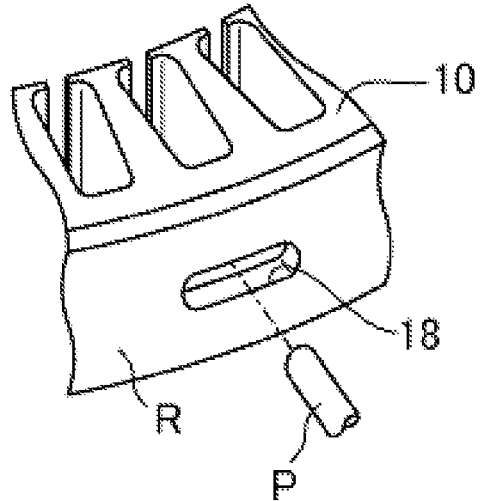

(a) and (b) of FIG. 9 are schematic views illustrating mounting of a reinforcement ring.

Figure 10:
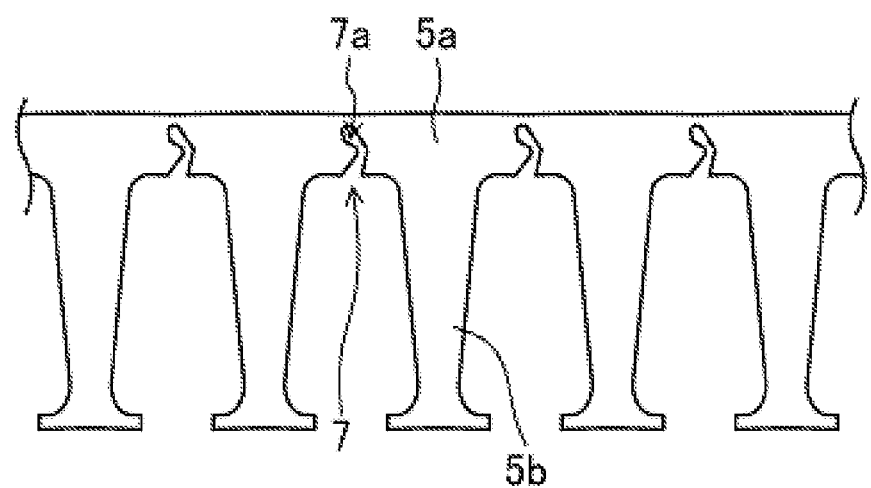
Figure 10:
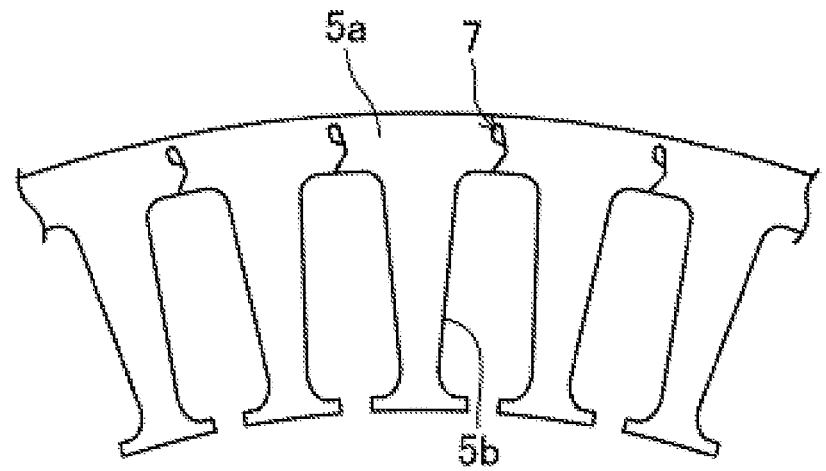

(a) and (b) of FIG. 10 are views illustrating a modified embodiment of the first embodiment.

Figure 11:
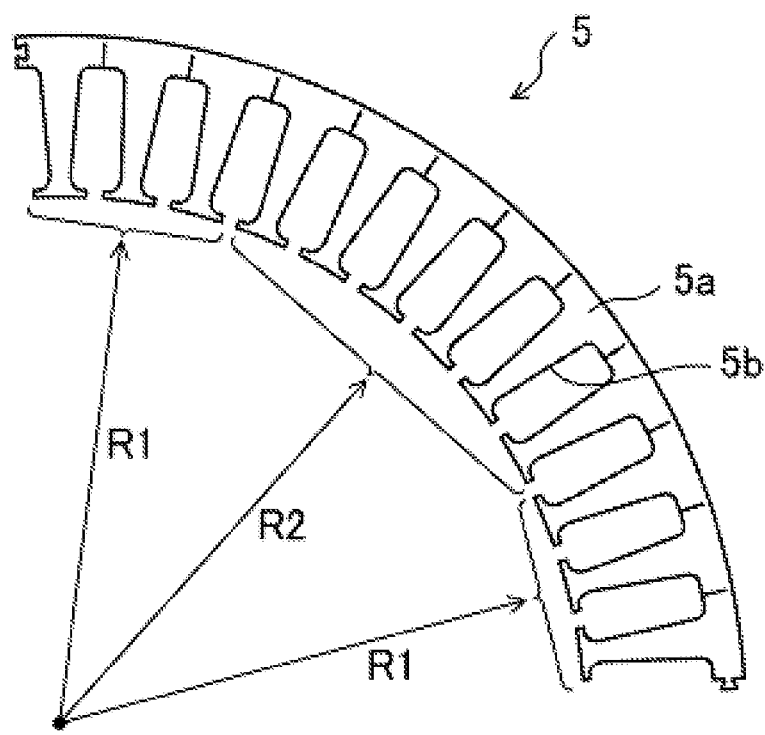

FIG. 11 is a view illustrating another modified embodiment of the first embodiment.

Figure 12:
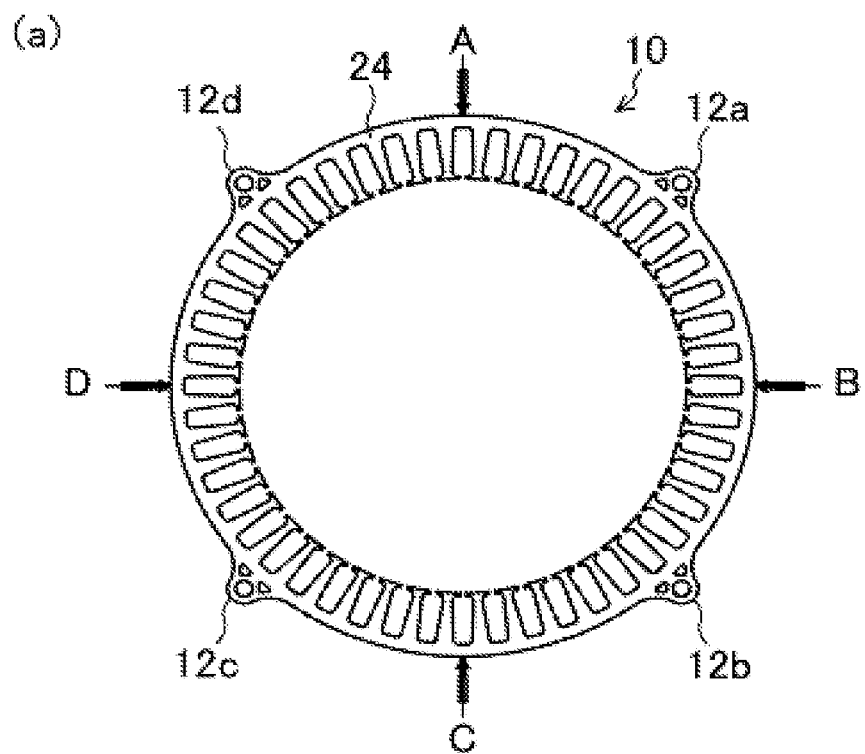
Figure 12:
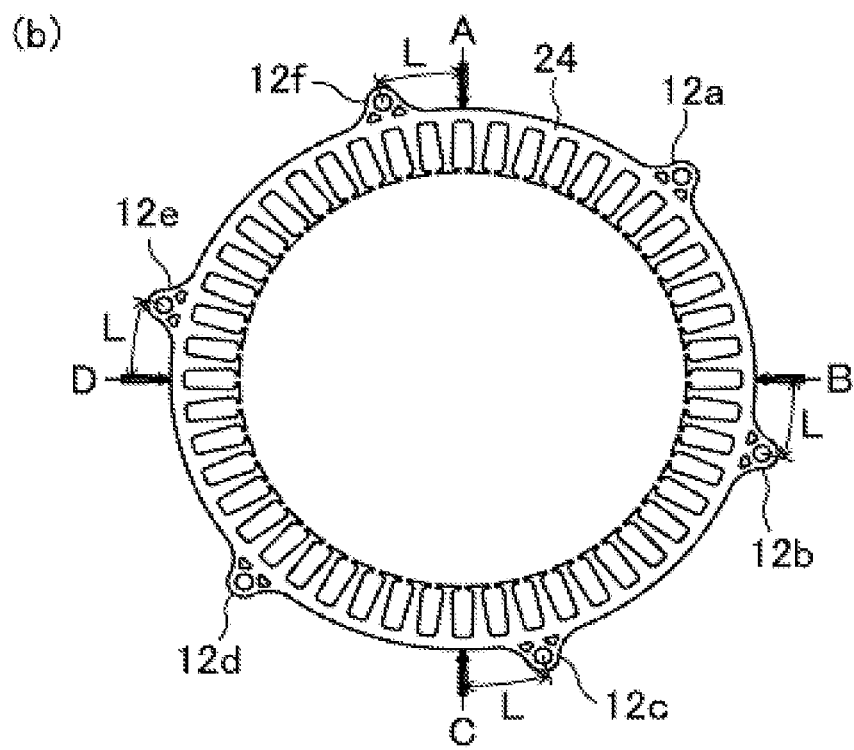

(a) and (b) of FIG. 12 are views illustrating still another modified embodiment of the first embodiment.

Figure 13:
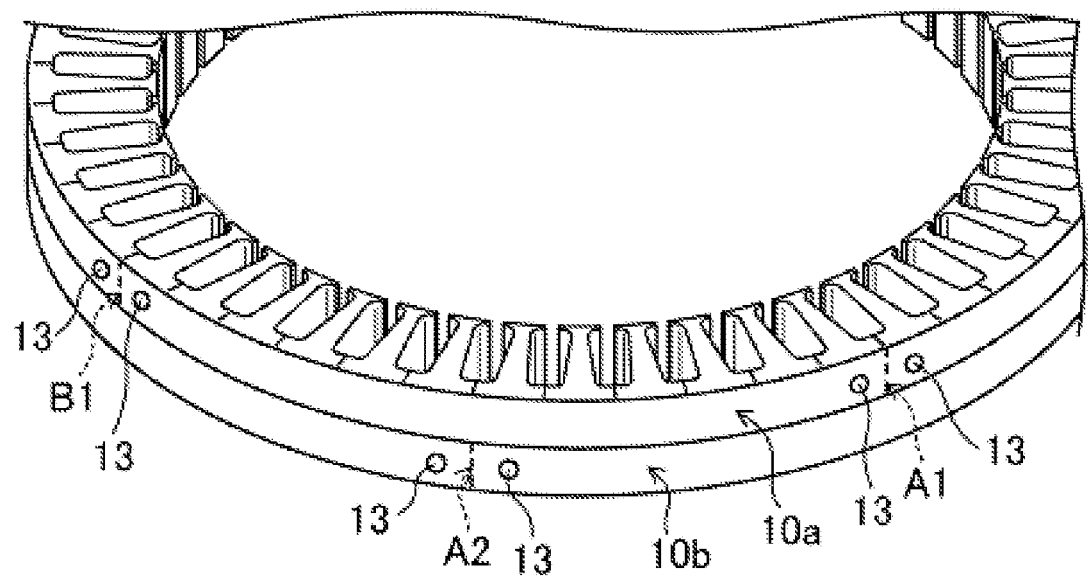
Figure 13:
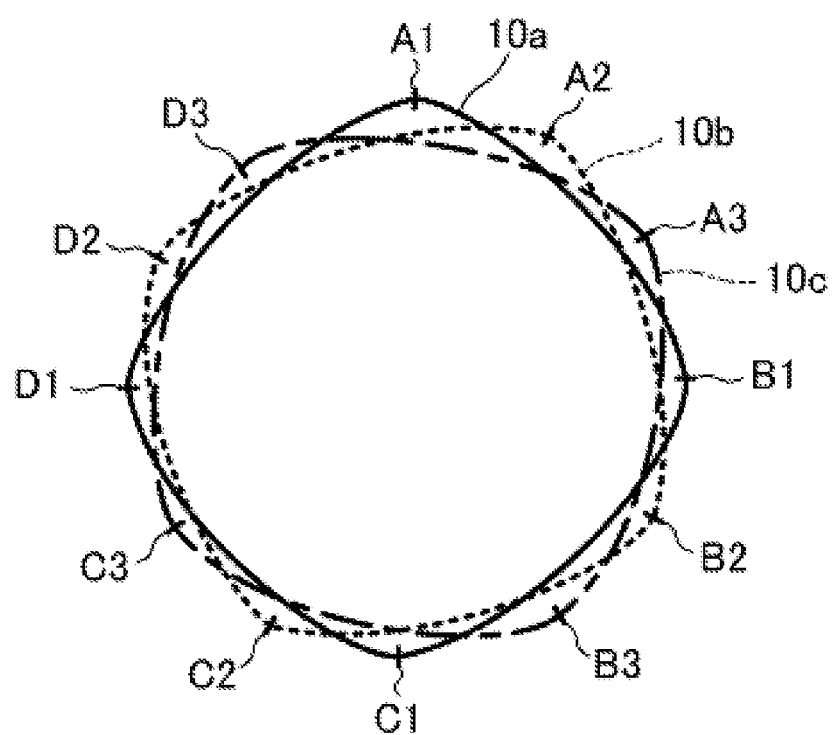

(a) and (b) of FIG. 13 are views illustrating yet another modified embodiment of the first embodiment.

Figure 14:
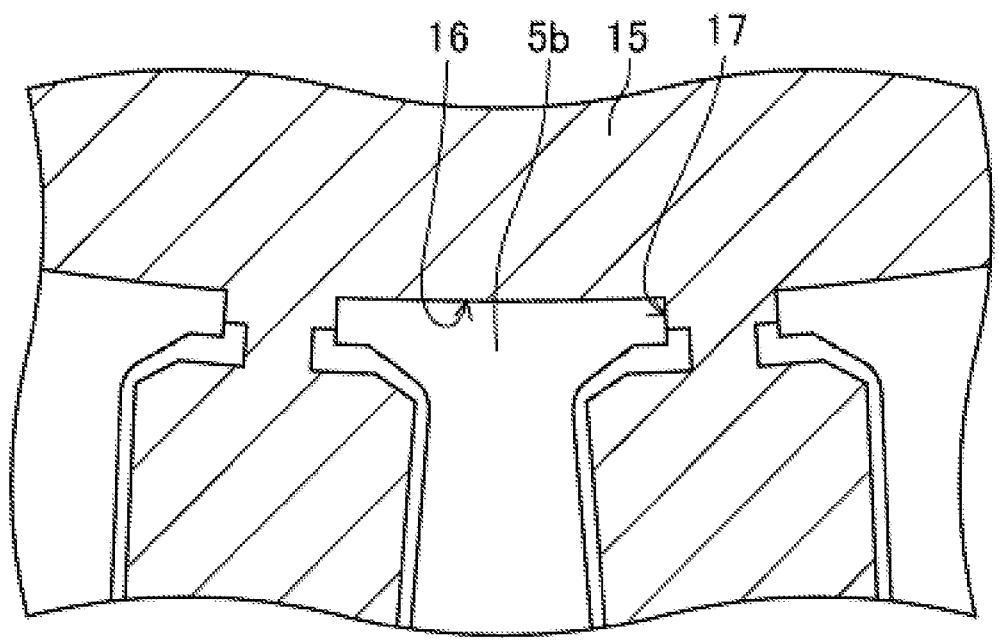

FIG. 14 is a view illustrating yet another modified embodiment of the first embodiment.

Figure 15:
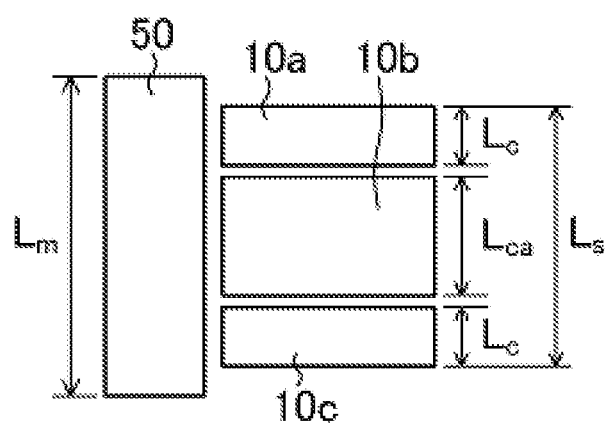
Figure 15:
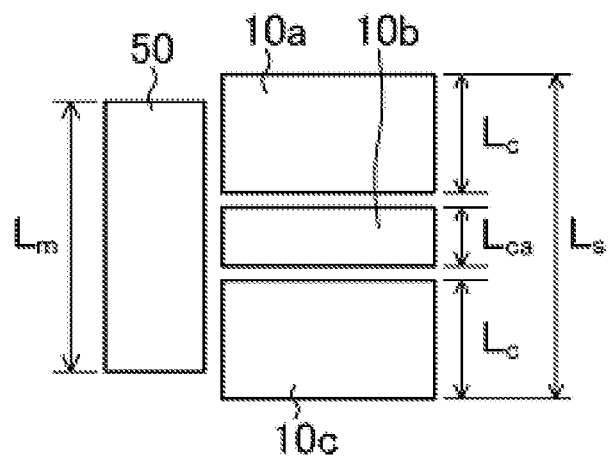

(a) and (b) of FIG. 15 are views illustrating yet another modified embodiment of the first embodiment.

Figure 16:
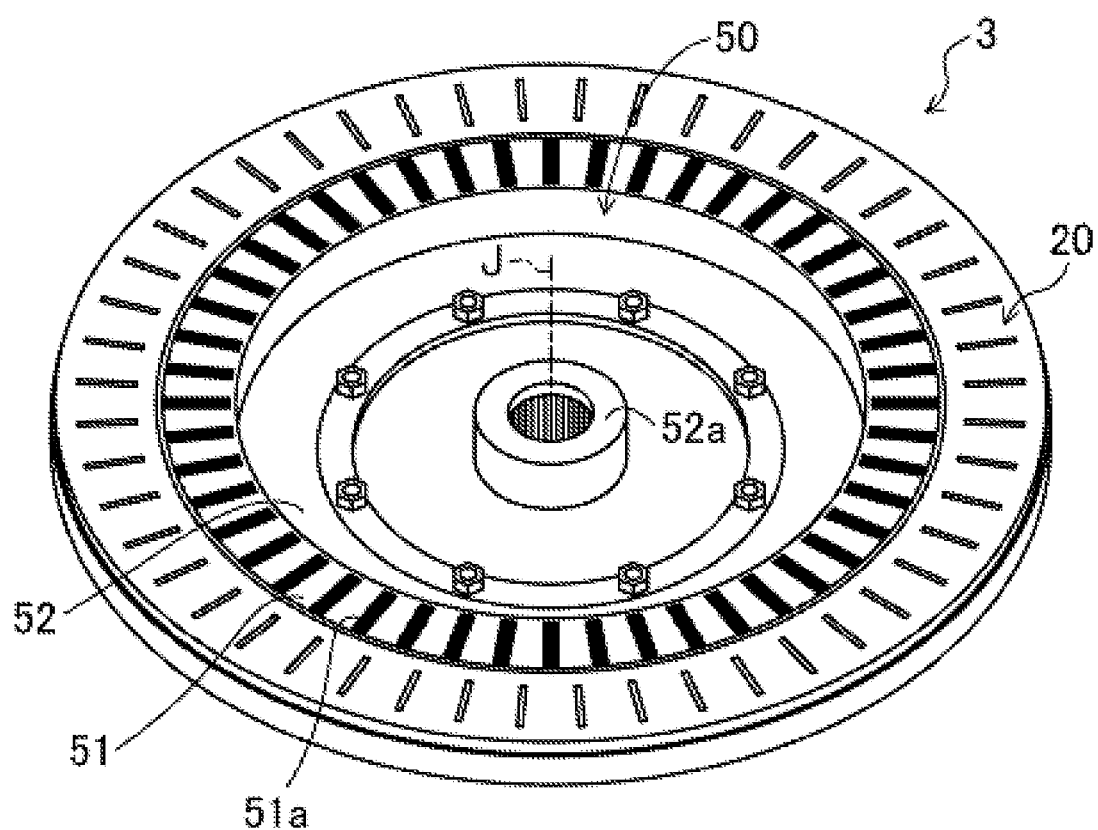

FIG. 16 is a schematic perspective view illustrating a motor of a second embodiment.

Figure 17:
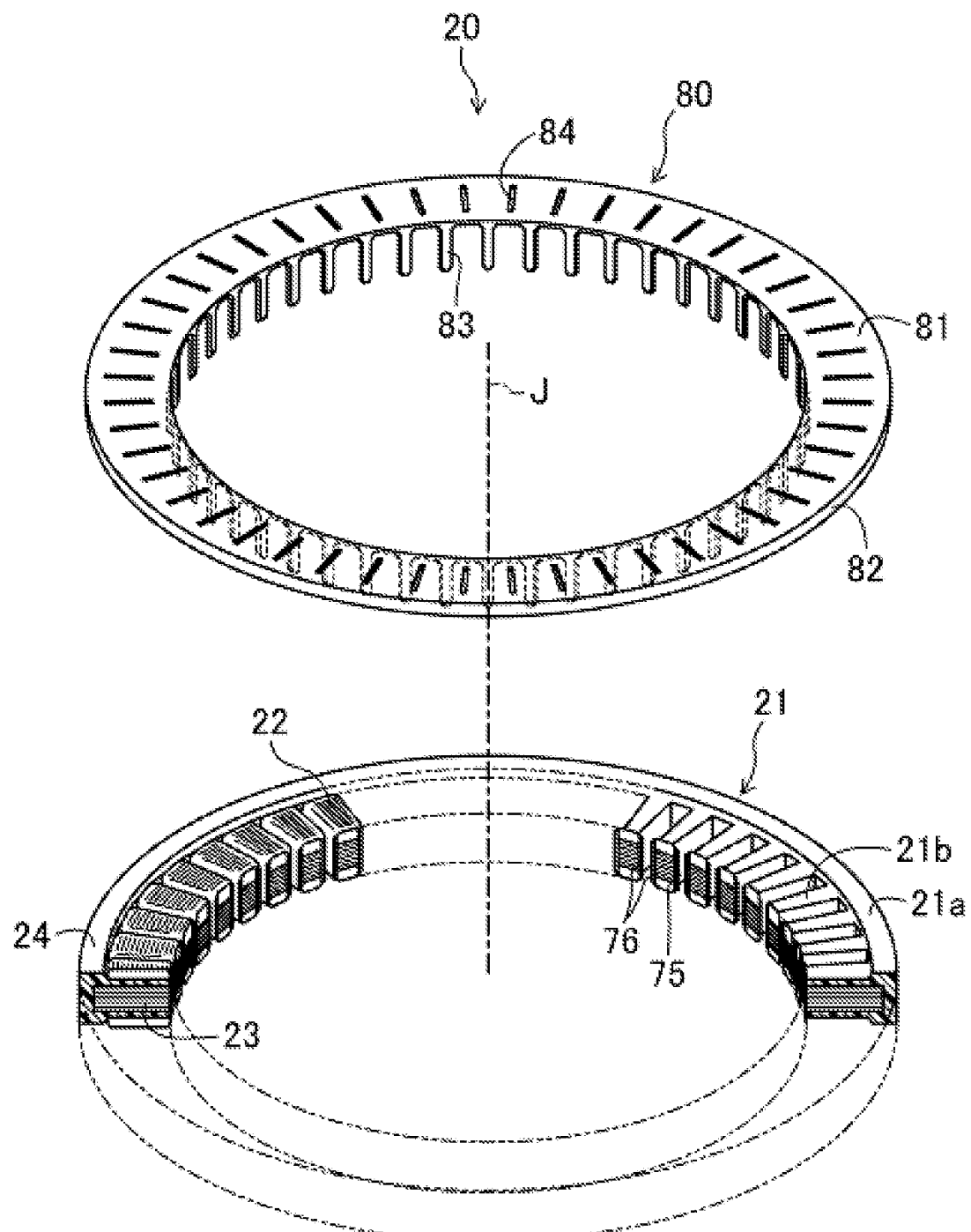

FIG. 17 is an exploded perspective view of a stator. The stator is displayed with some of the side portions omitted. A left side in the drawing illustrates a state in which coils are formed, and a right side in the drawing illustrates a state in which the coils are not formed.

Figure 18:
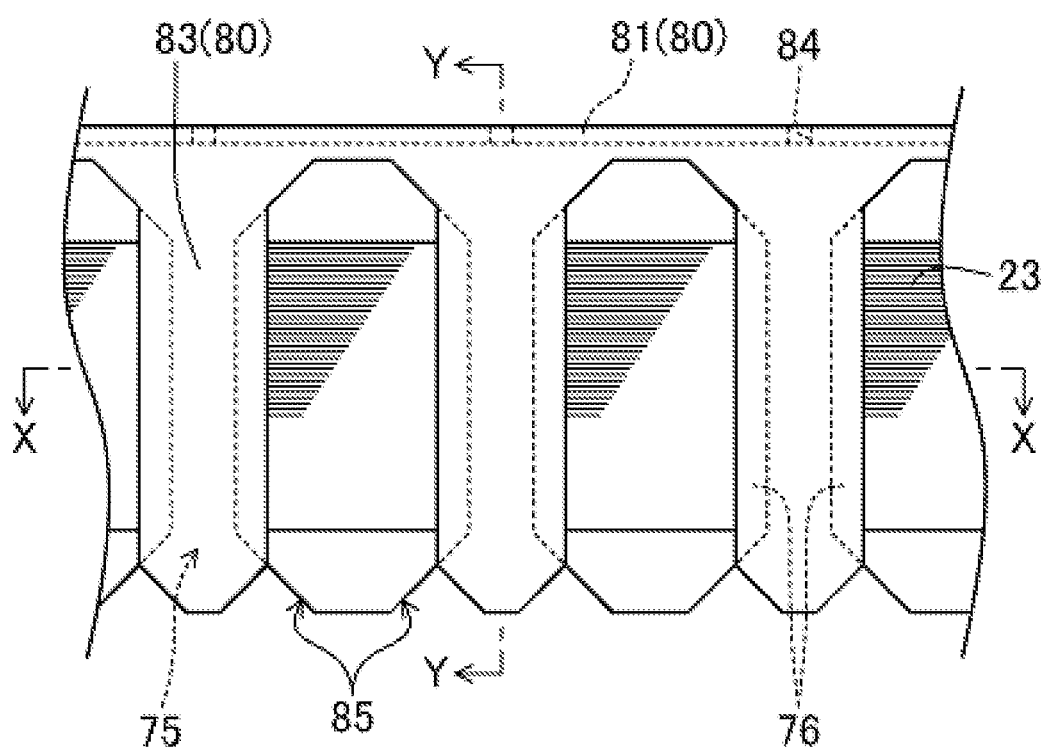

FIG. 18 is a schematic view of a portion of an inner circumferential surface of the stator viewed from the center.

Figure 19:
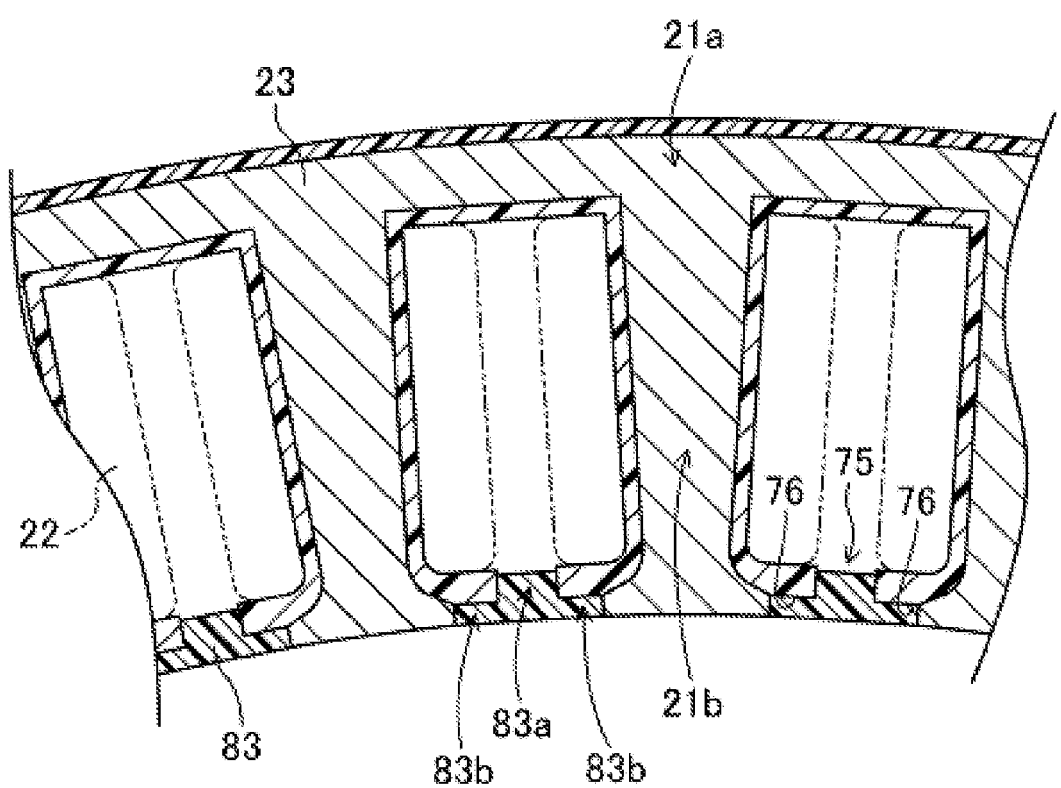

FIG. 19 is a schematic cross-sectional view taken along line X-X of FIG. 18.

Figure 20:
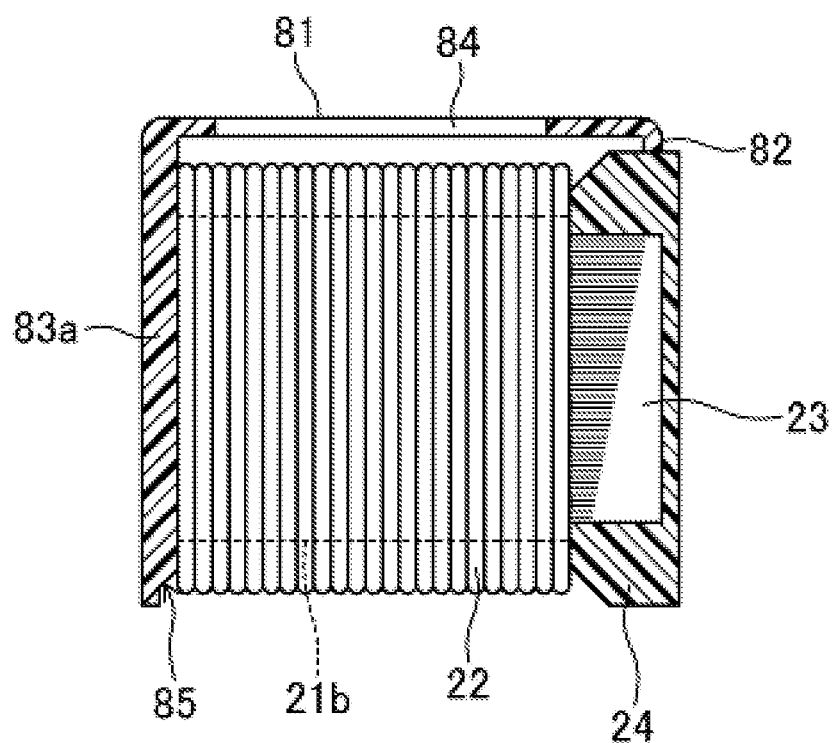

FIG. 20 is a schematic cross-sectional view taken along line Y-Y of FIG. 18.

Figure 21:
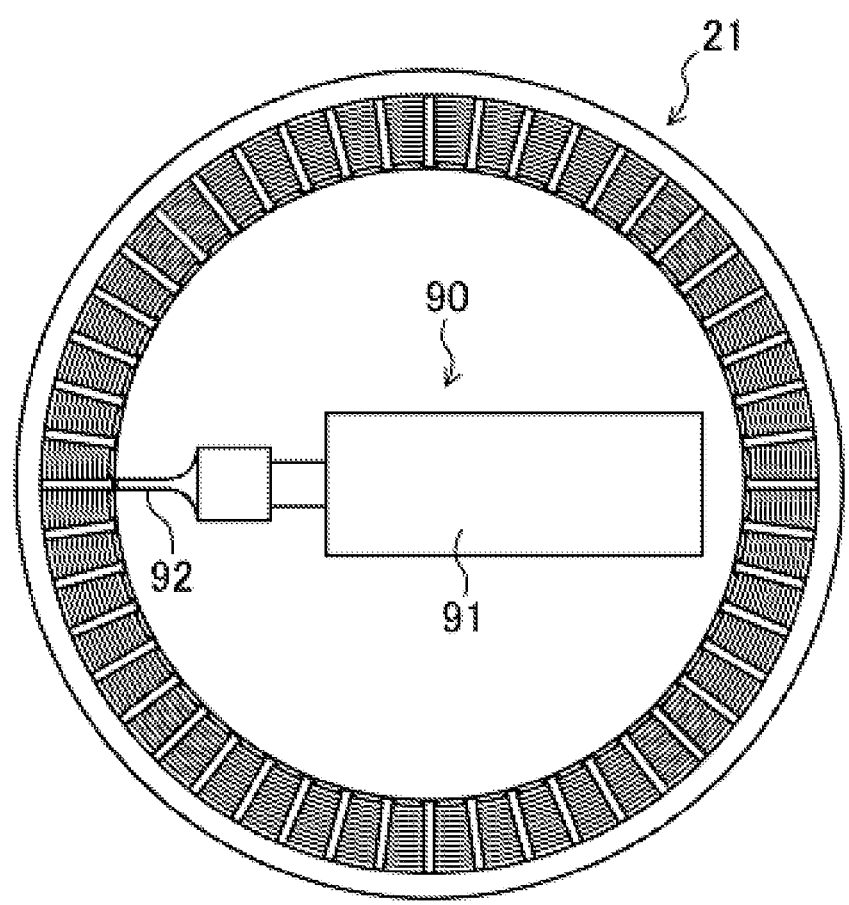

FIG. 21 is a schematic view illustrating a state when a deposition treatment has occurred.

Figure 22:
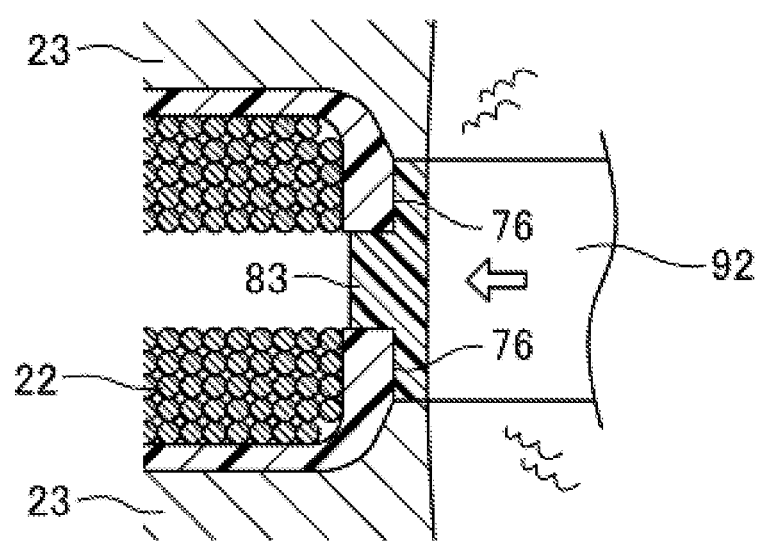

FIG. 22 is a schematic view illustrating a state when the deposition treatment has occurred.

Figure 23:
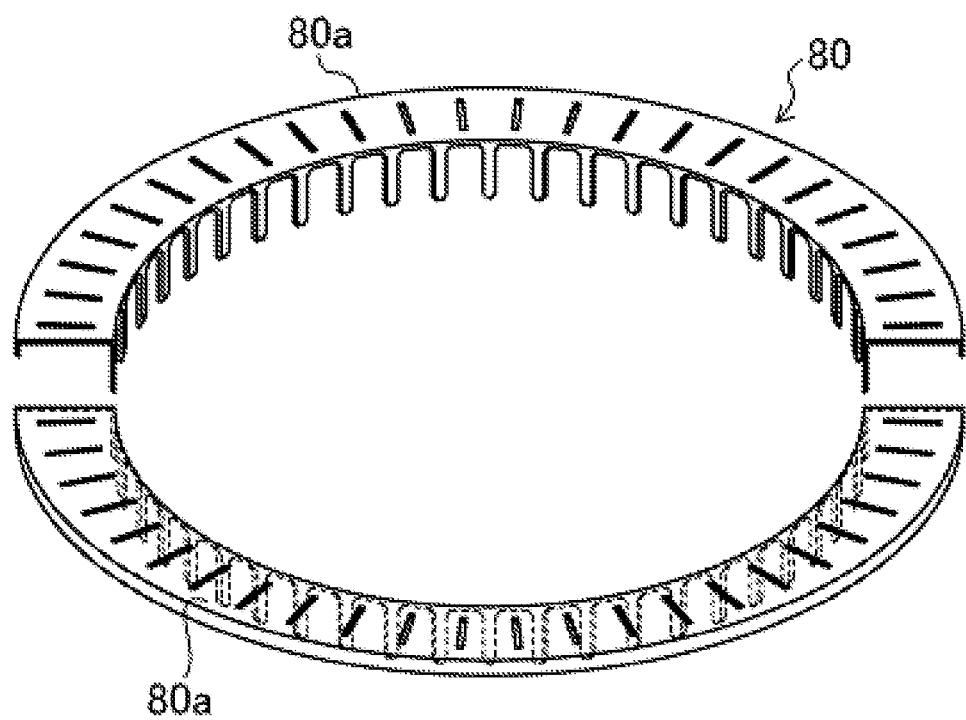

FIG. 23 a schematic perspective view illustrating a modified embodiment of the second embodiment.

Figure 24:
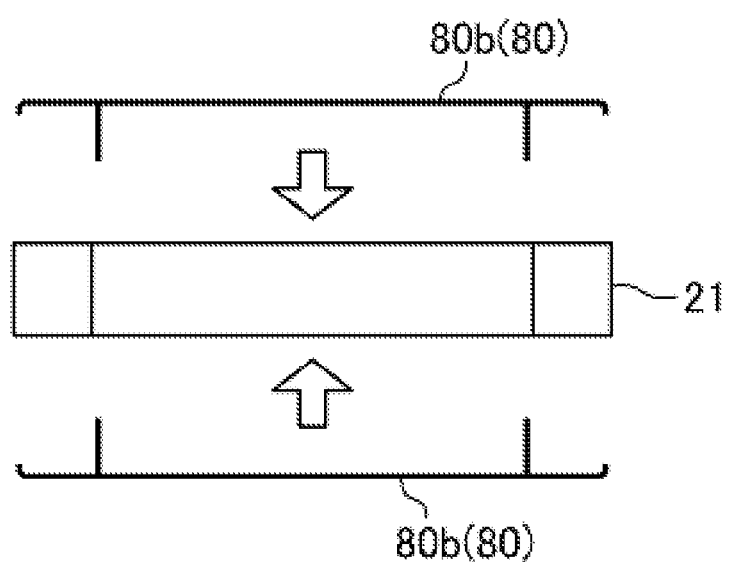

FIG. 24 is a schematic view illustrating the modified embodiment of the second embodiment.

Figure 25:
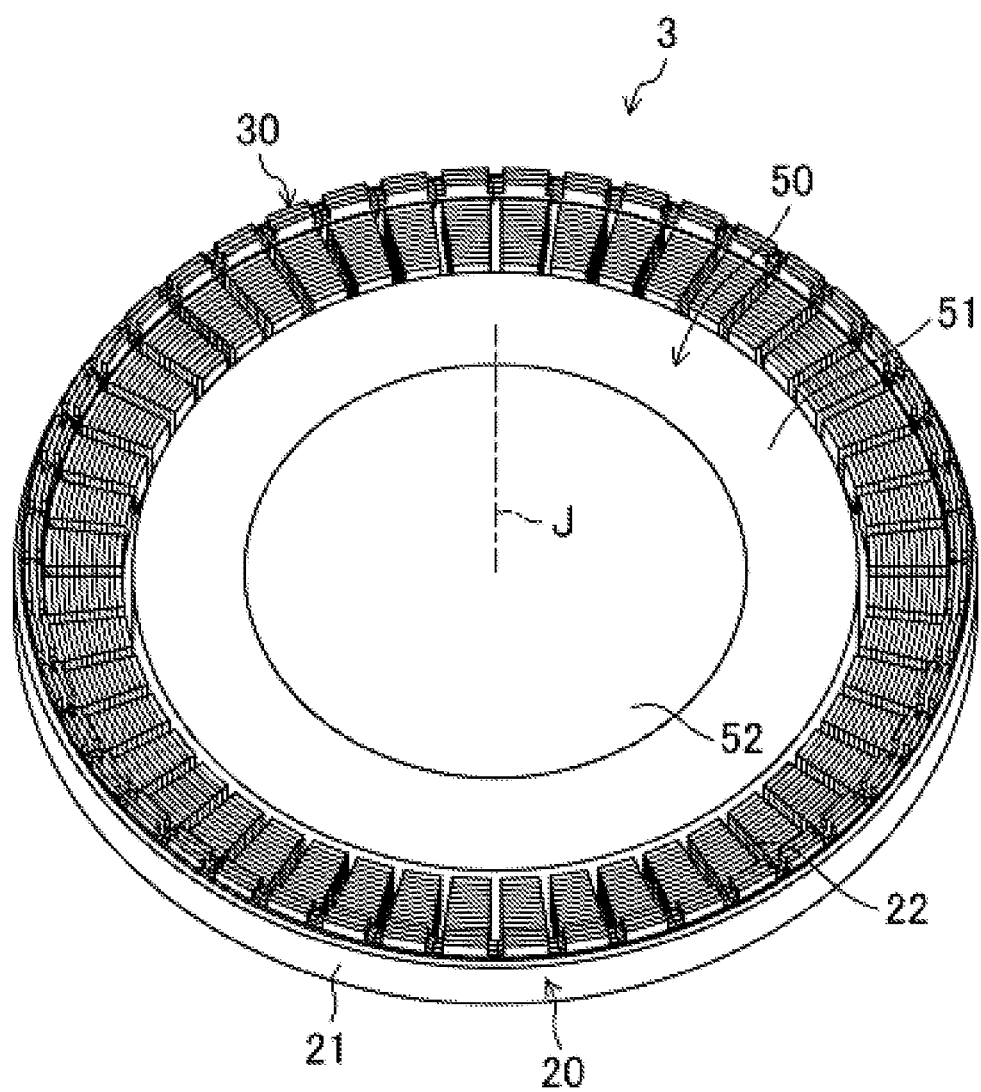

FIG. 25 is a schematic perspective view illustrating a main unit of a motor of a third embodiment.

Figure 26:
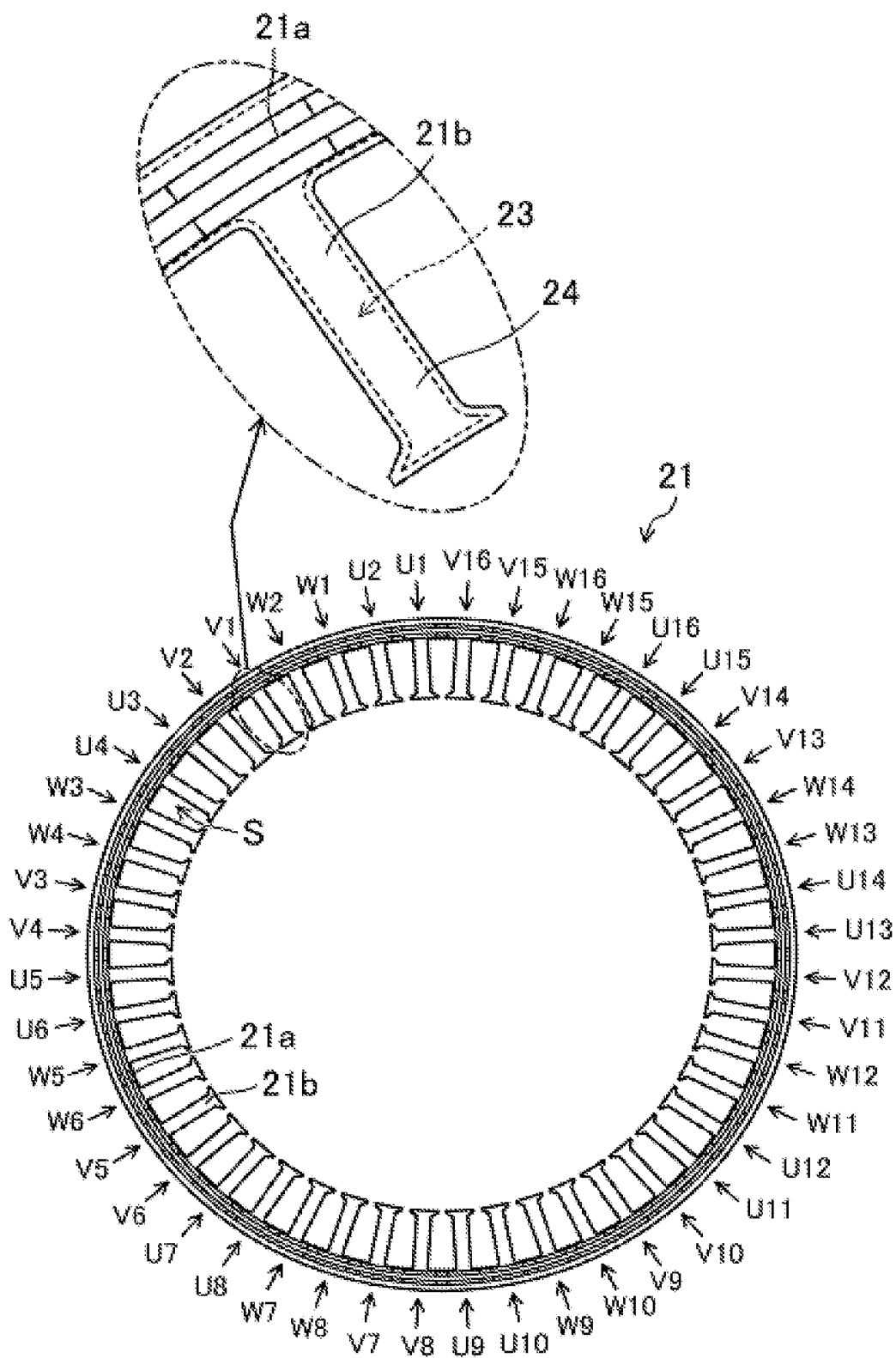

FIG. 26 is a schematic view illustrating a stator of the third embodiment.

Figure 27:
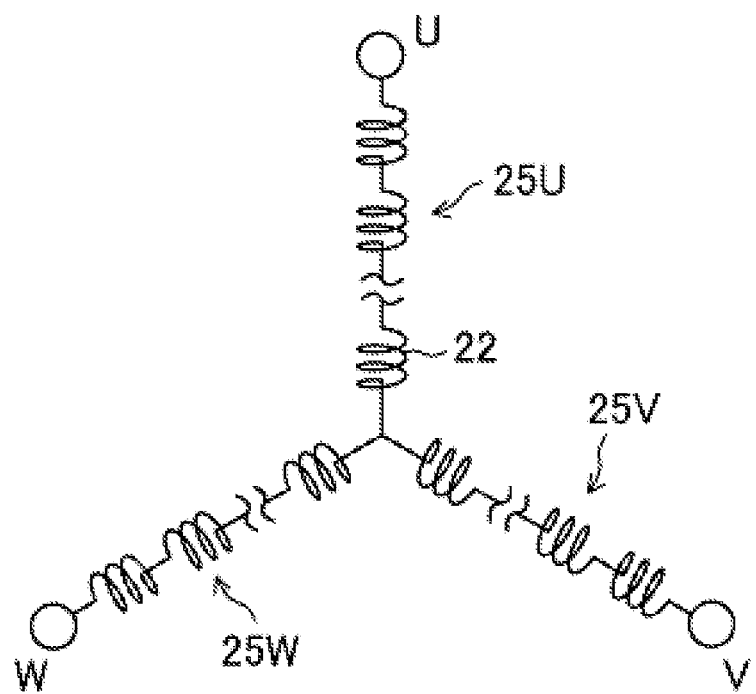

FIG. 27 is a connection diagram illustrating connections between coil groups of different phases.

Figure 28:
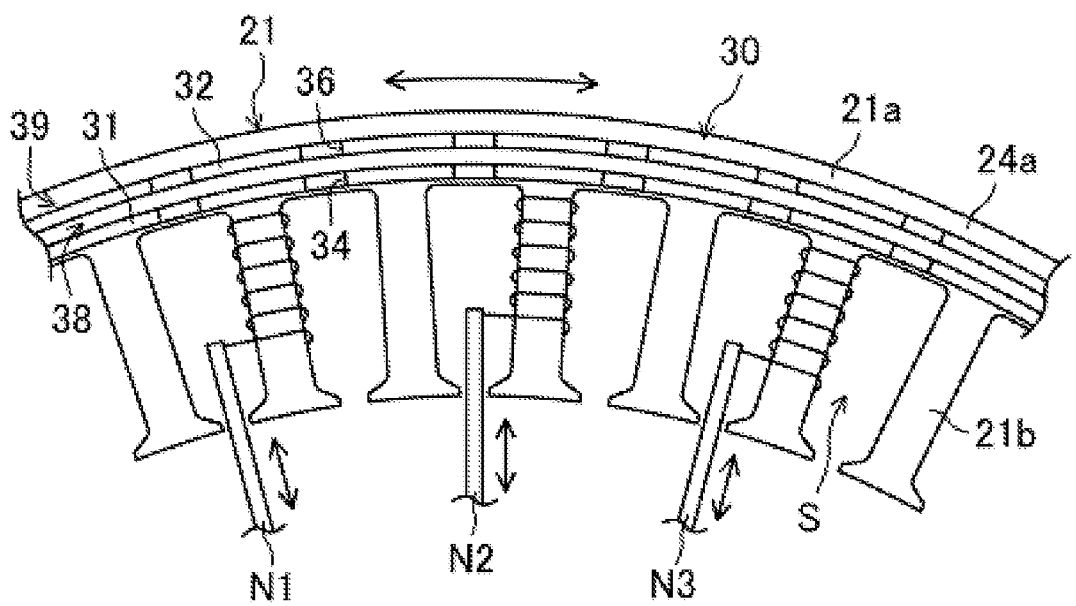
Figure 28:
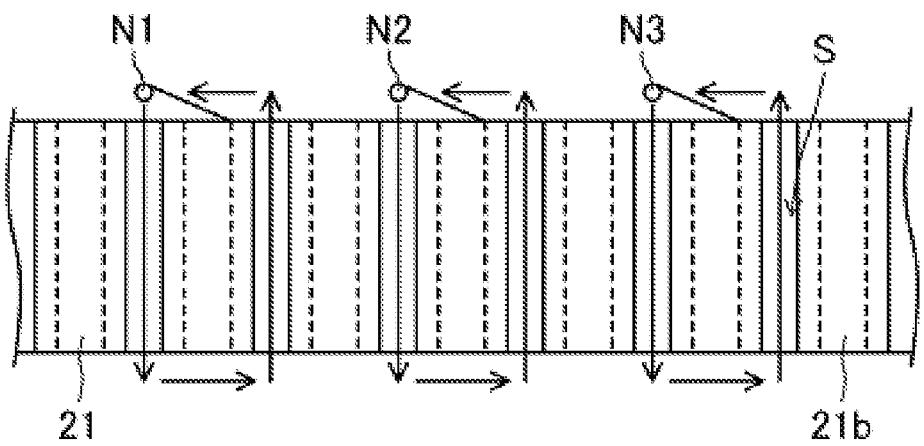

FIG. 28 illustrates views for describing a winding process by a nozzle winding method using three nozzles. (a) is a plan view and (b) is a side view viewed from the center.

Figure 29:
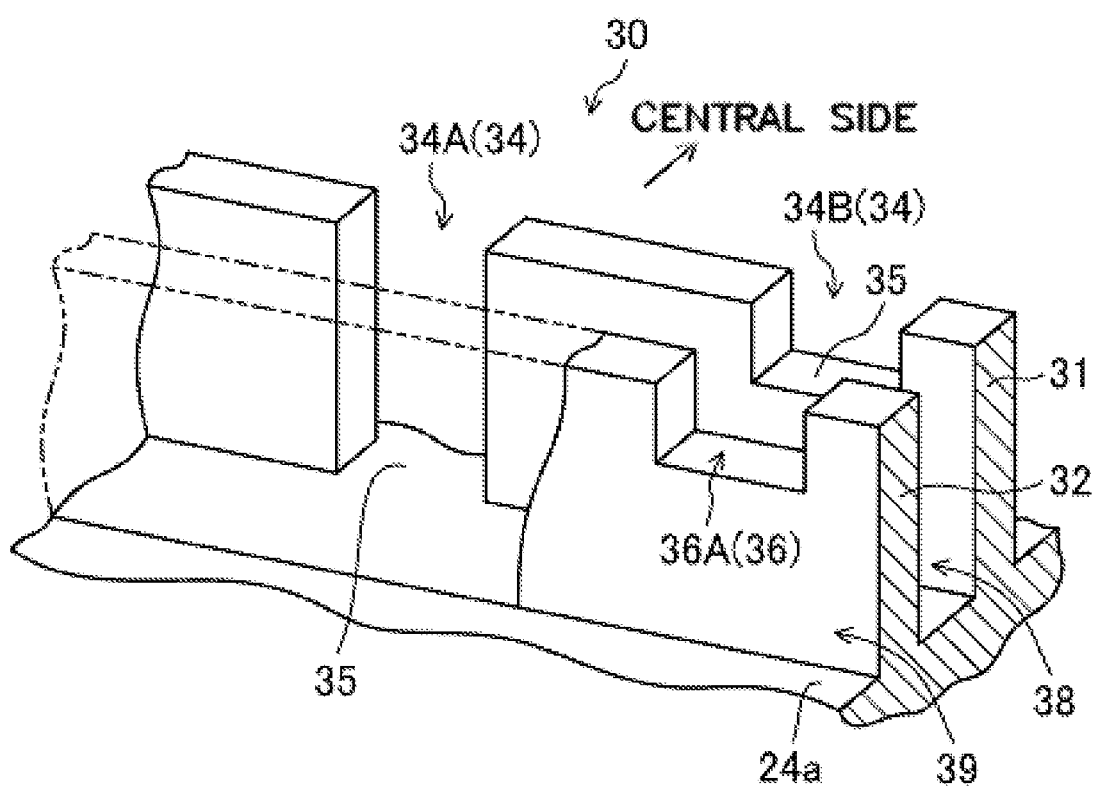

FIG. 29 is a schematic perspective view illustrating a main unit of a wiring structure.

Figure 30:
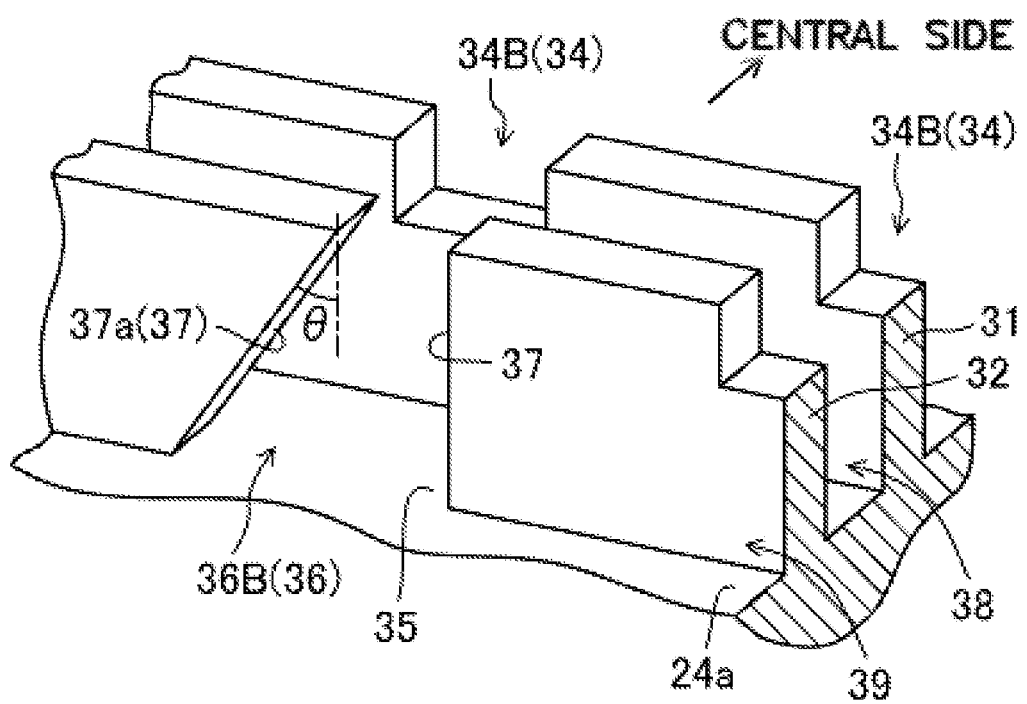

FIG. 30 is a schematic perspective view illustrating the main unit of the wiring structure.

Figure 31:
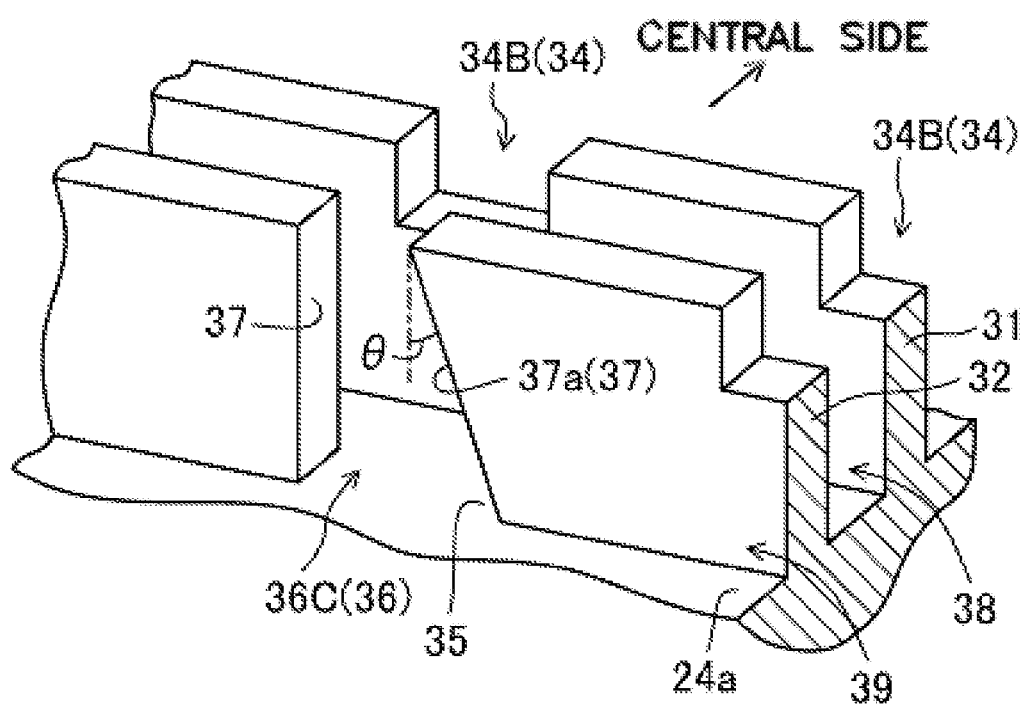

FIG. 31 is a schematic perspective view illustrating the main unit of the wiring structure.

Figure 32:
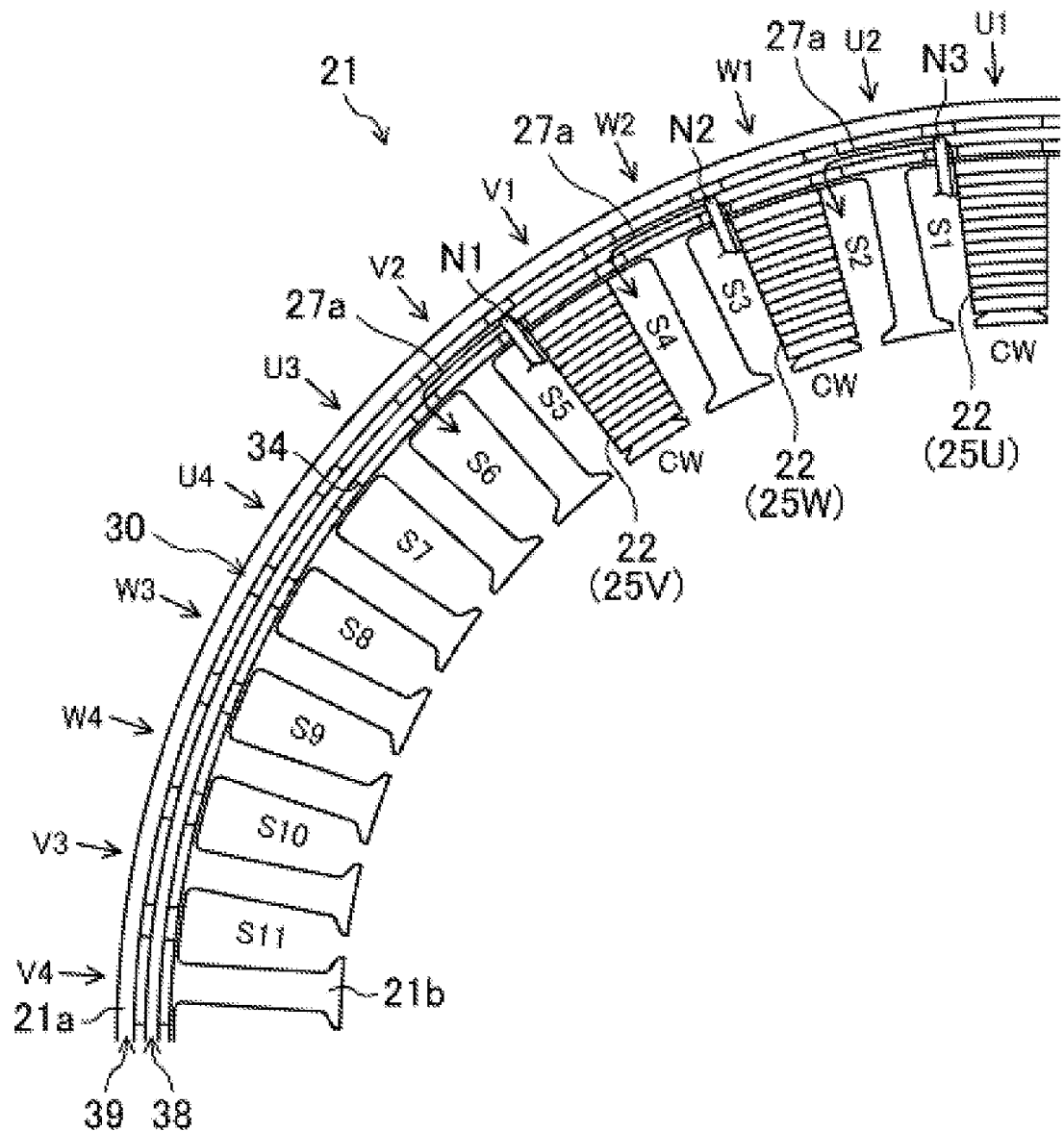

FIG. 32 is a view for describing a winding process and is a view of a portion of the stator viewed from an axial direction.

Figure 33:
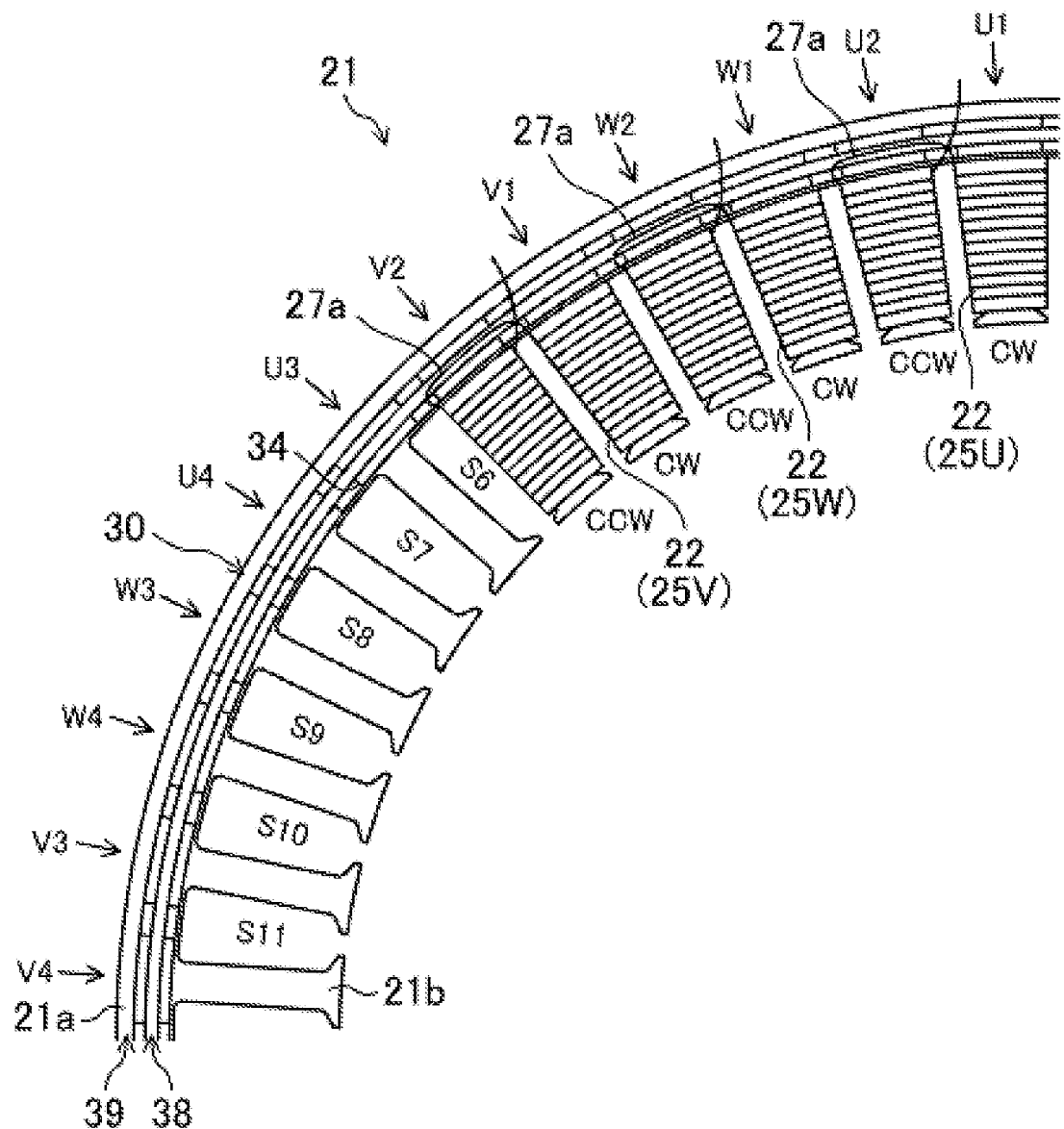

FIG. 33 is a view for describing the winding process and is a view corresponding to FIG. 32.

Figure 34:
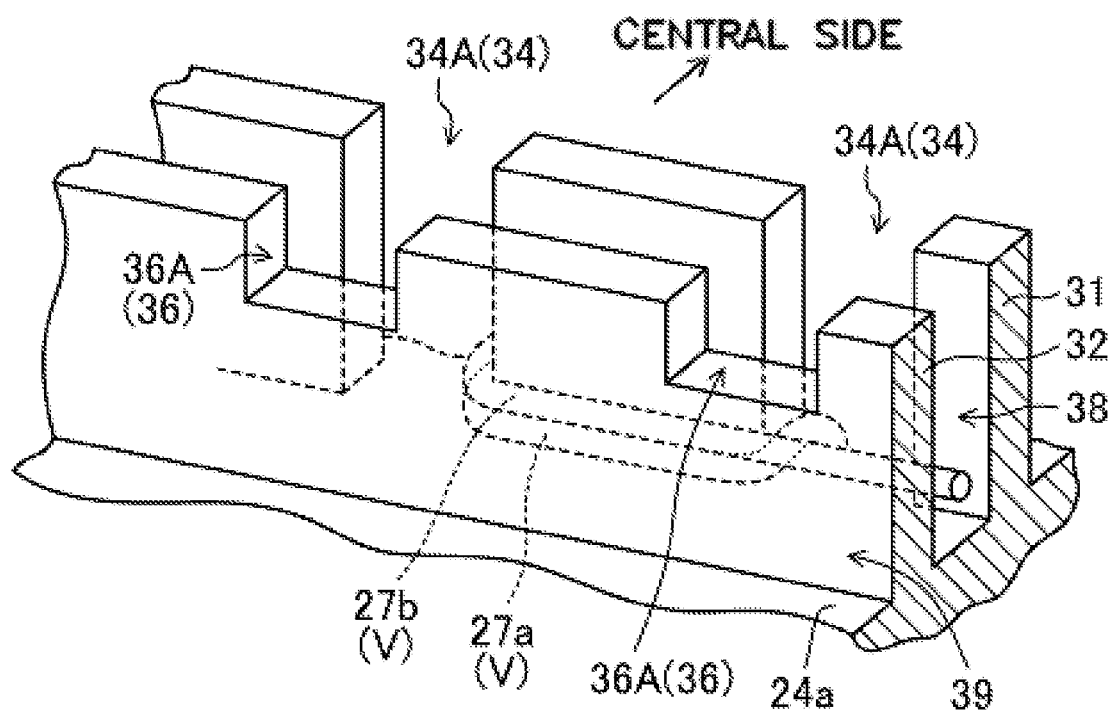
Figure 35:
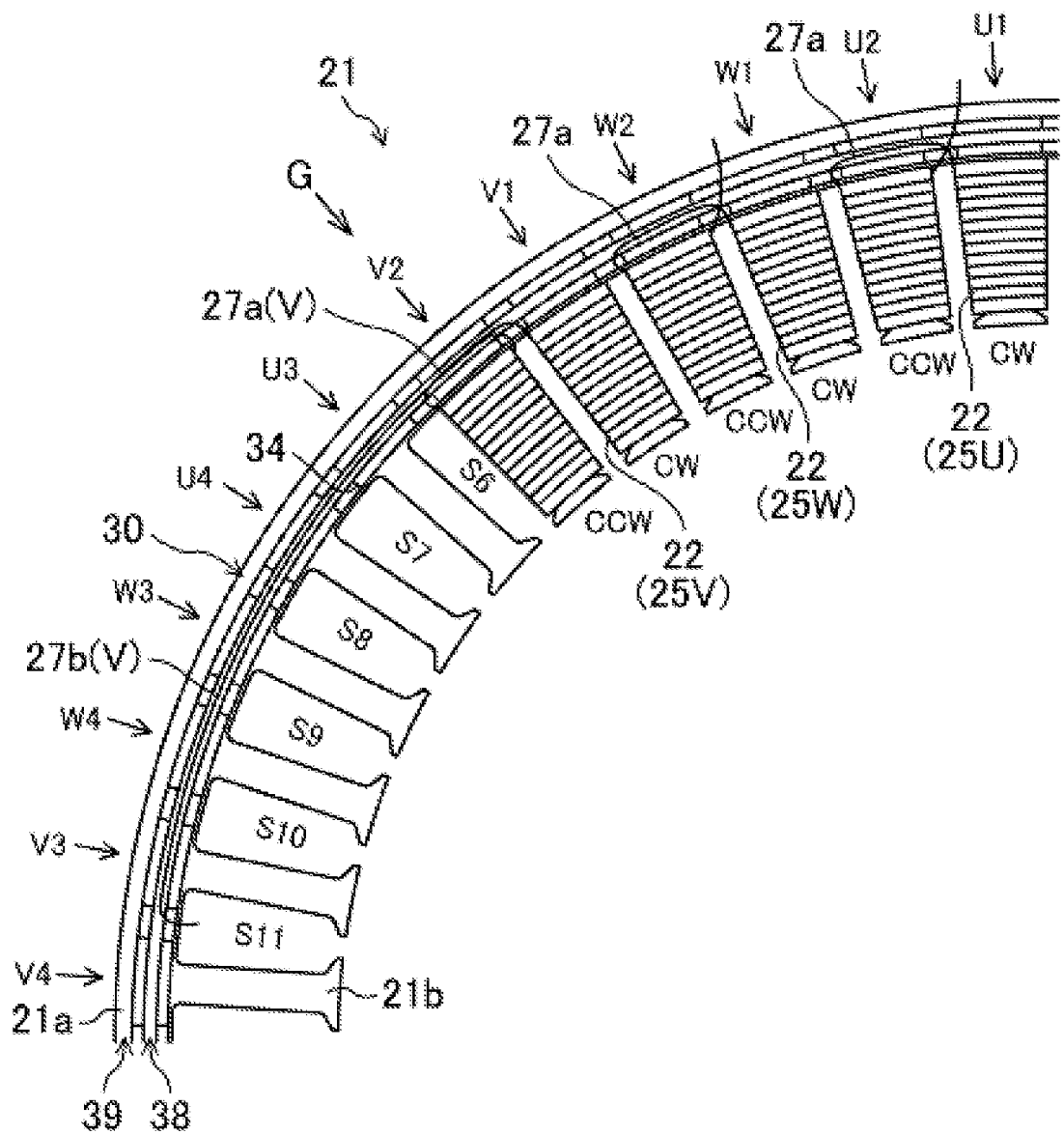

FIG. 34 is a schematic perspective view viewed from a direction of an arrow G of FIG. 35.

FIG. 35 is a view for describing the winding process and is a view corresponding to FIG. 32.

Figure 36A:
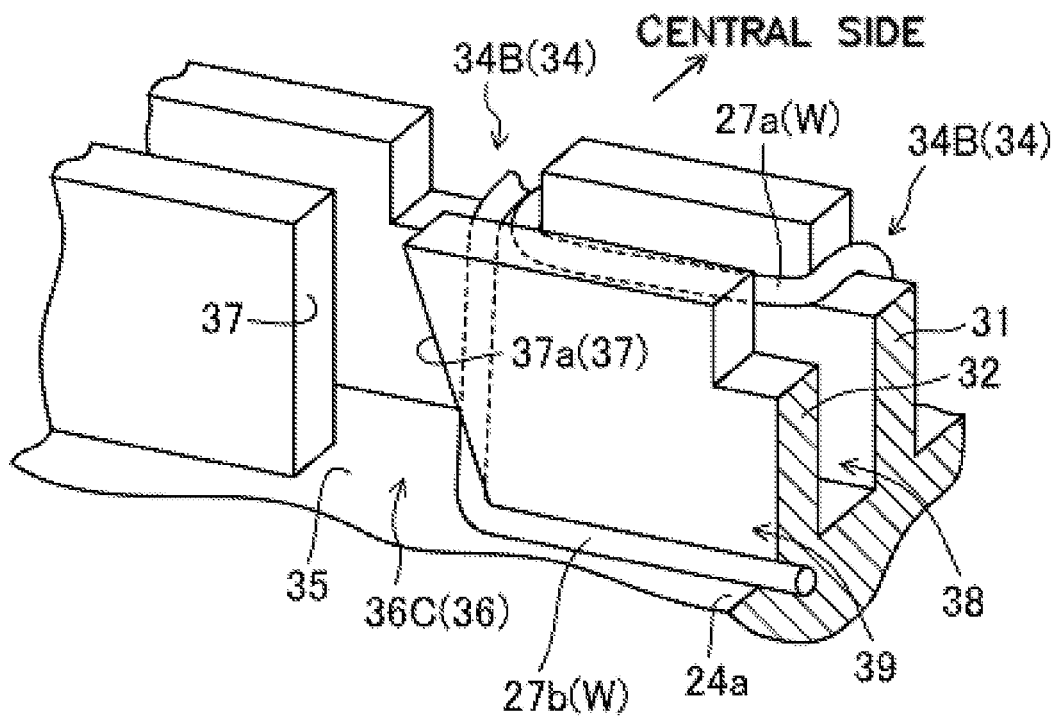
Figure 36B:
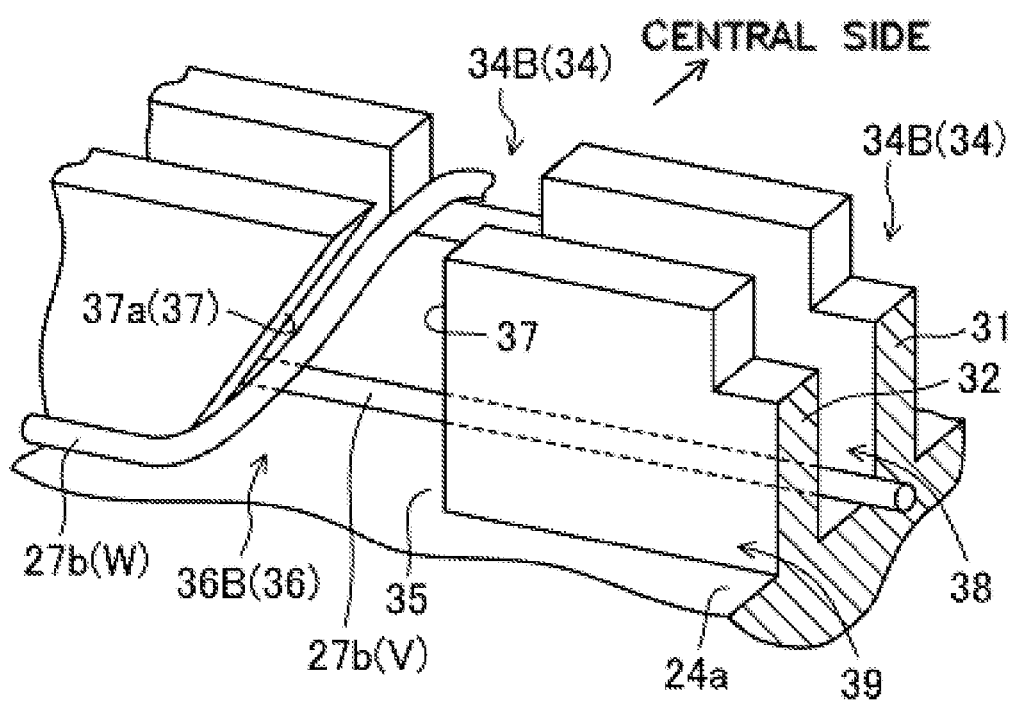
Figure 37:
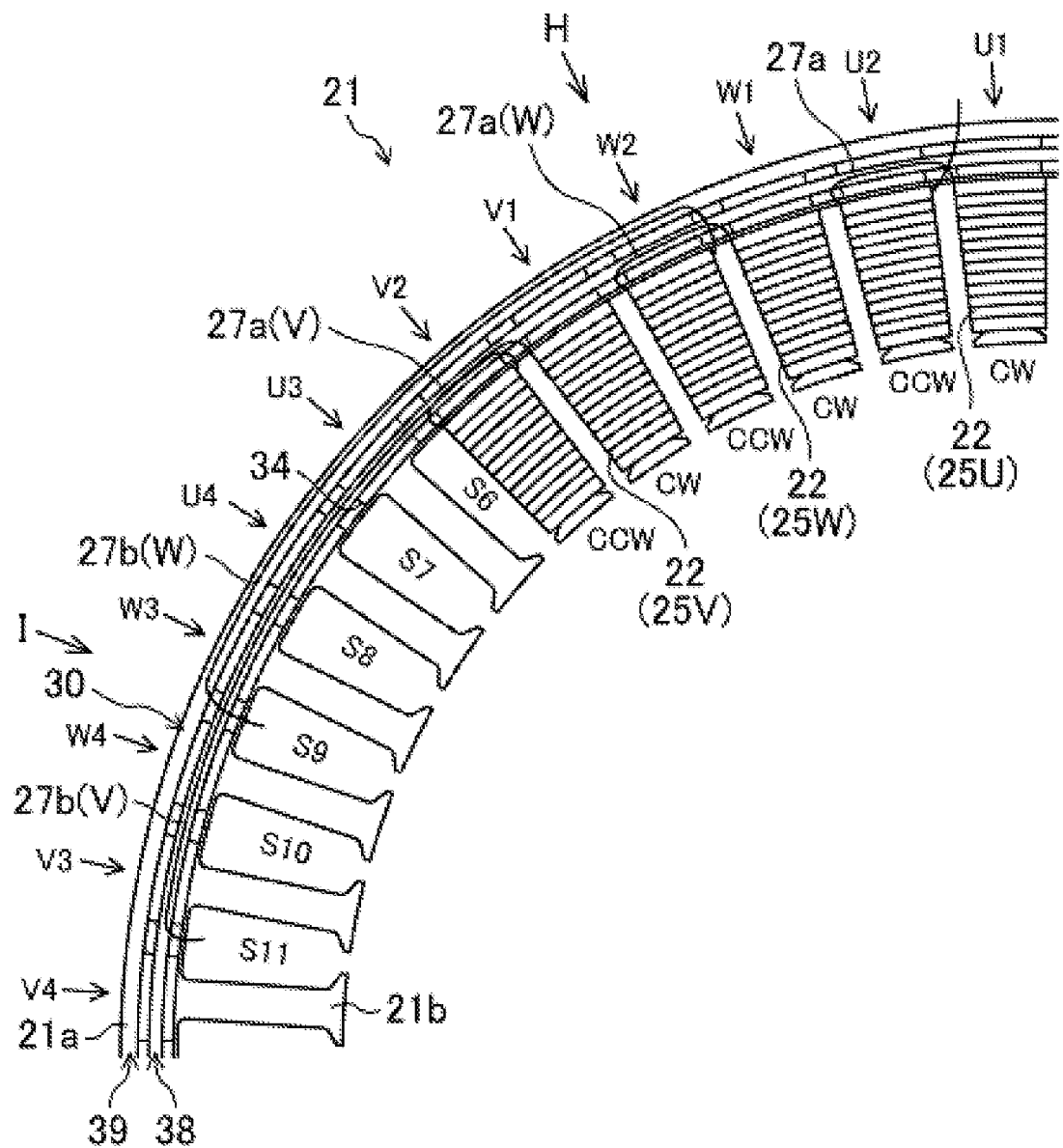

(a) of FIG. 36 is a schematic perspective view viewed from a direction of an arrow H of FIG. 37, and (b) is a schematic perspective view viewed from a direction of an arrow I of FIG. 37.

FIG. 37 is a view for describing the winding process and is a view corresponding to FIG. 32.

Figure 38A:
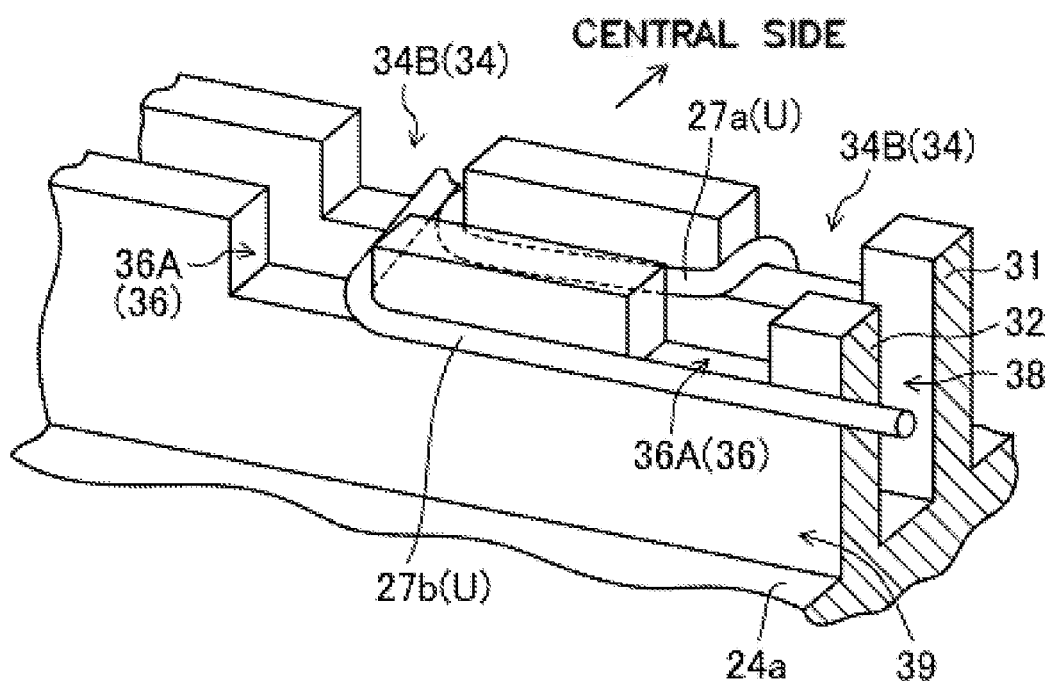
Figure 38B:
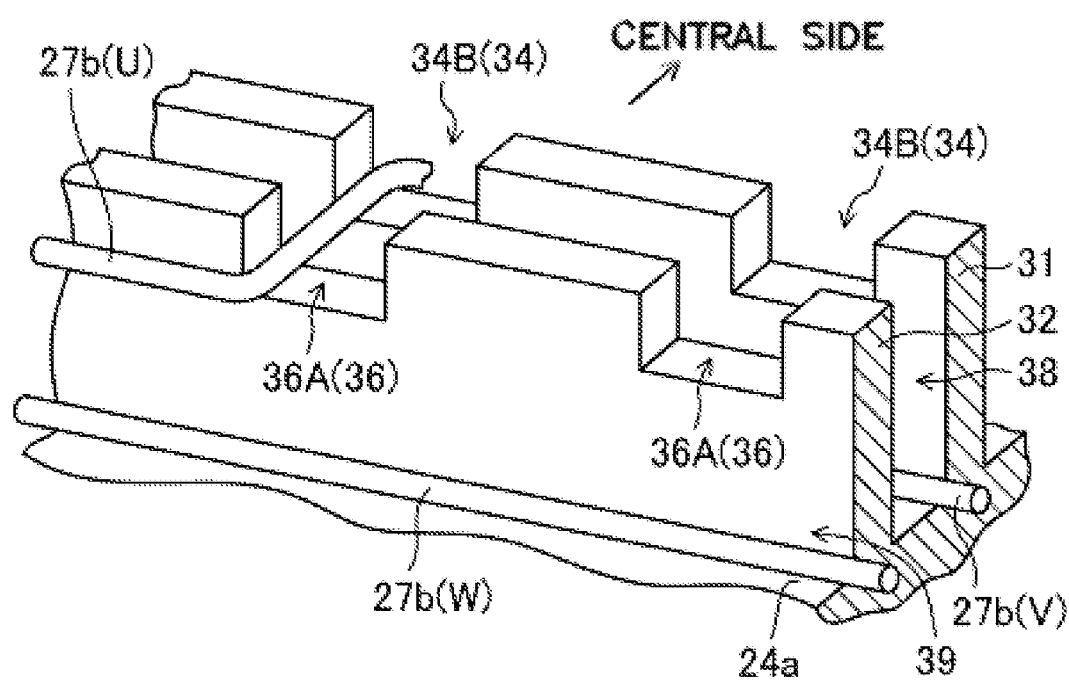
Figure 39:
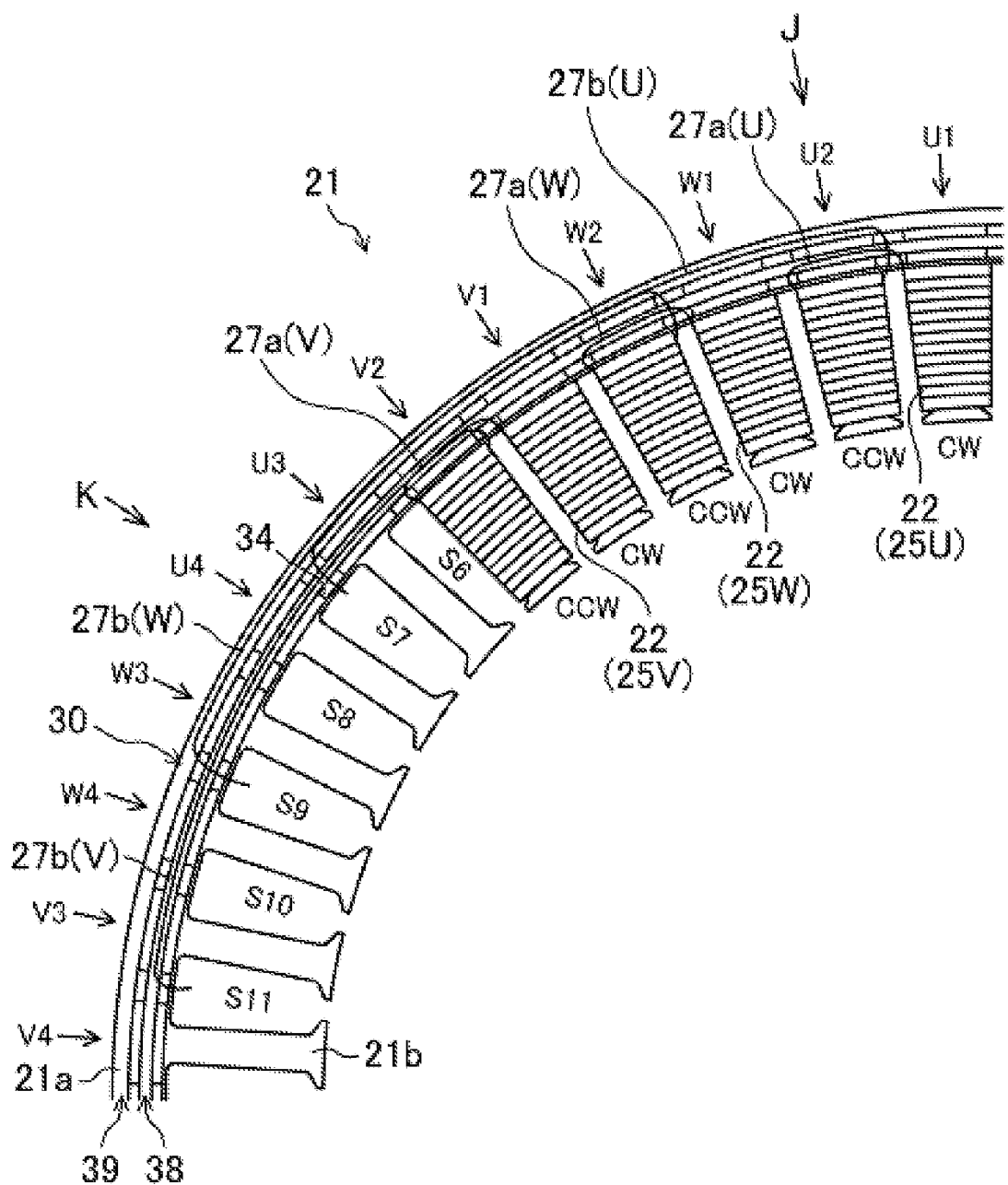

(a) of FIG. 38 is a schematic perspective view viewed from a direction of an arrow J of FIG. 39, and (b) is a schematic perspective view viewed from a direction of an arrow K of FIG. 39.

FIG. 39 is a view for describing the winding process and is a view corresponding to FIG. 32.

Figure 40:
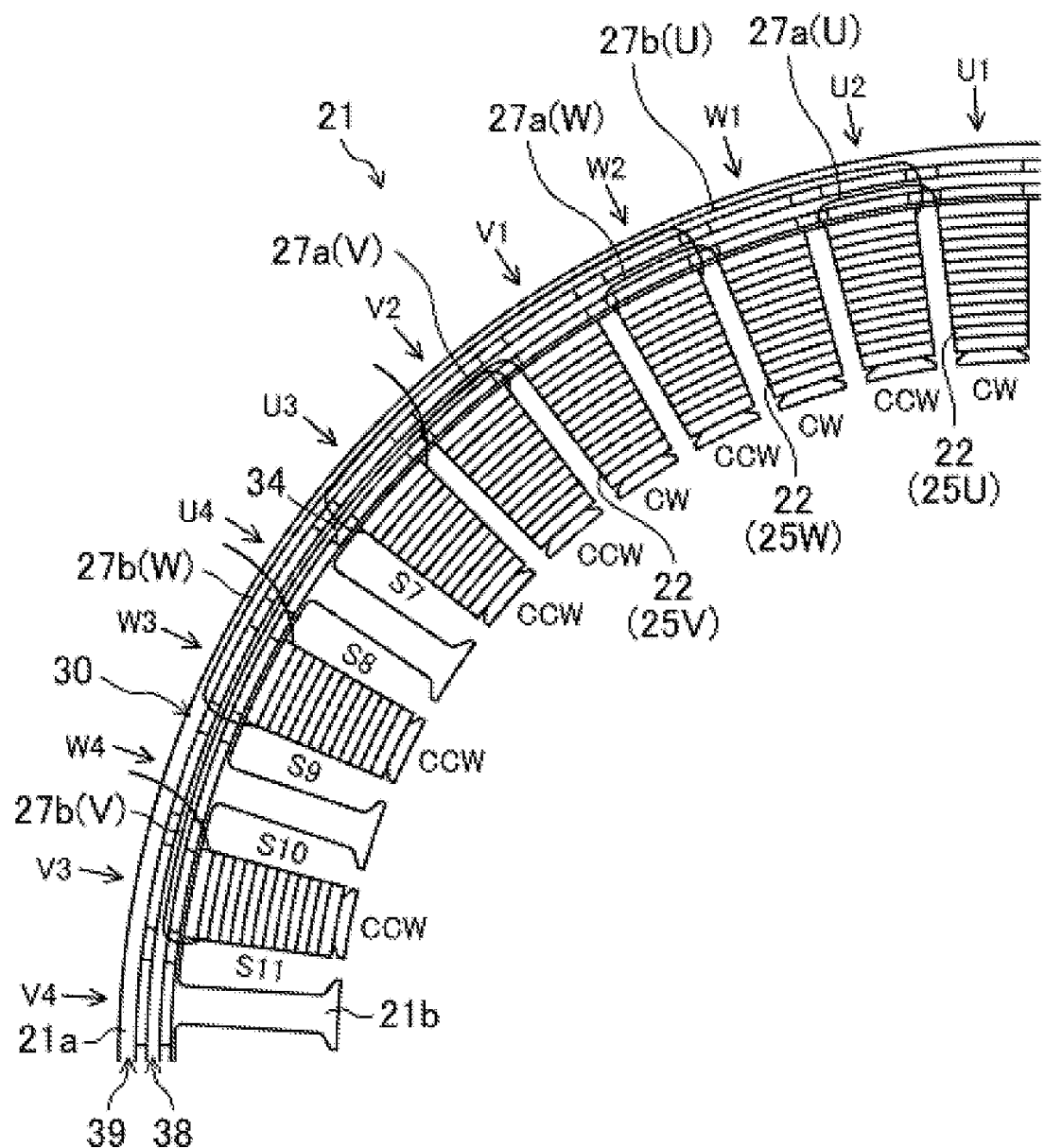

FIG. 40 is a view for describing the winding process and is a view corresponding to FIG. 32.

Figure 41:
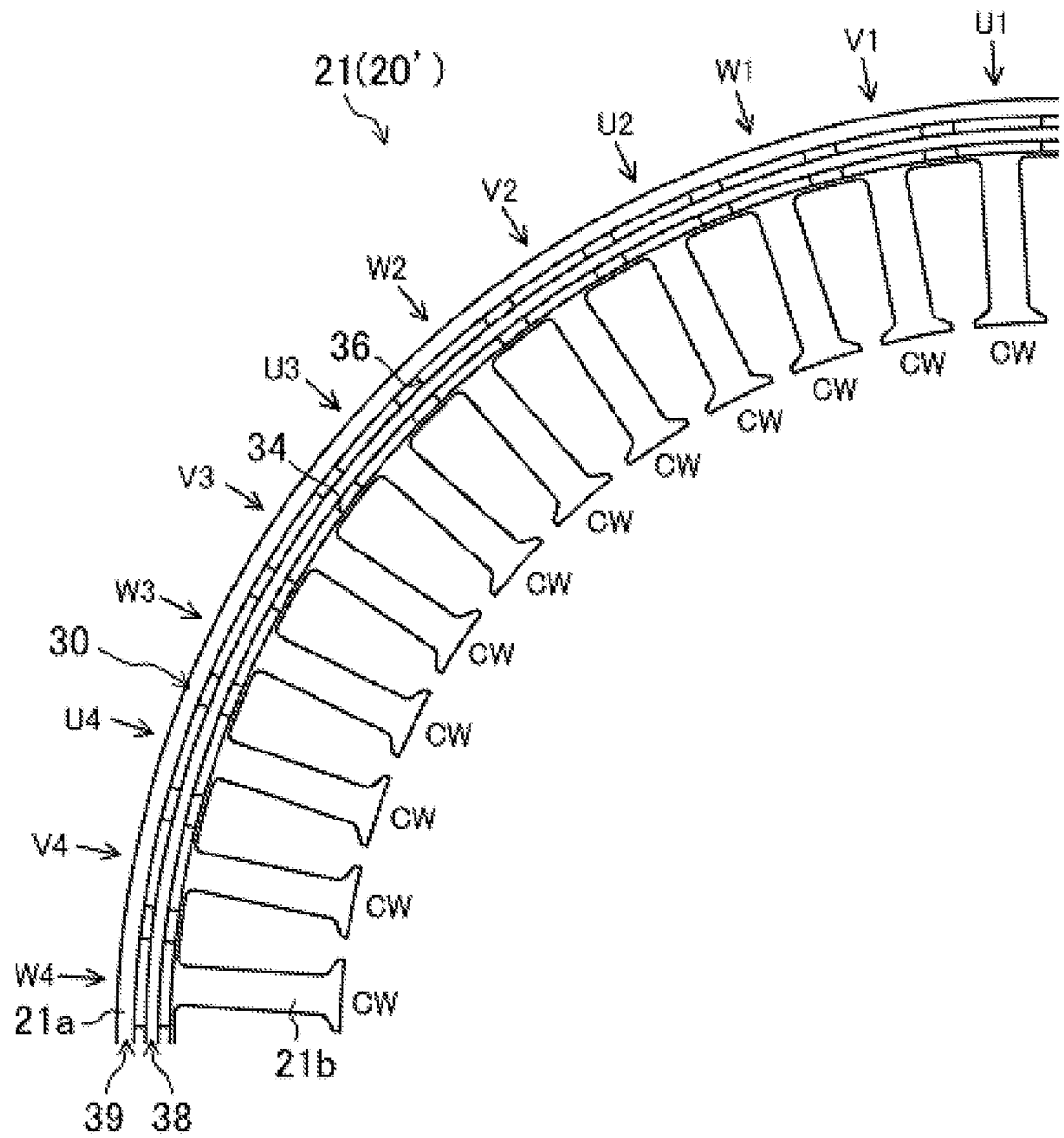

FIG. 41 is a view for describing a winding pattern of a modified embodiment and is a view corresponding to FIG. 32.

Figure 42:
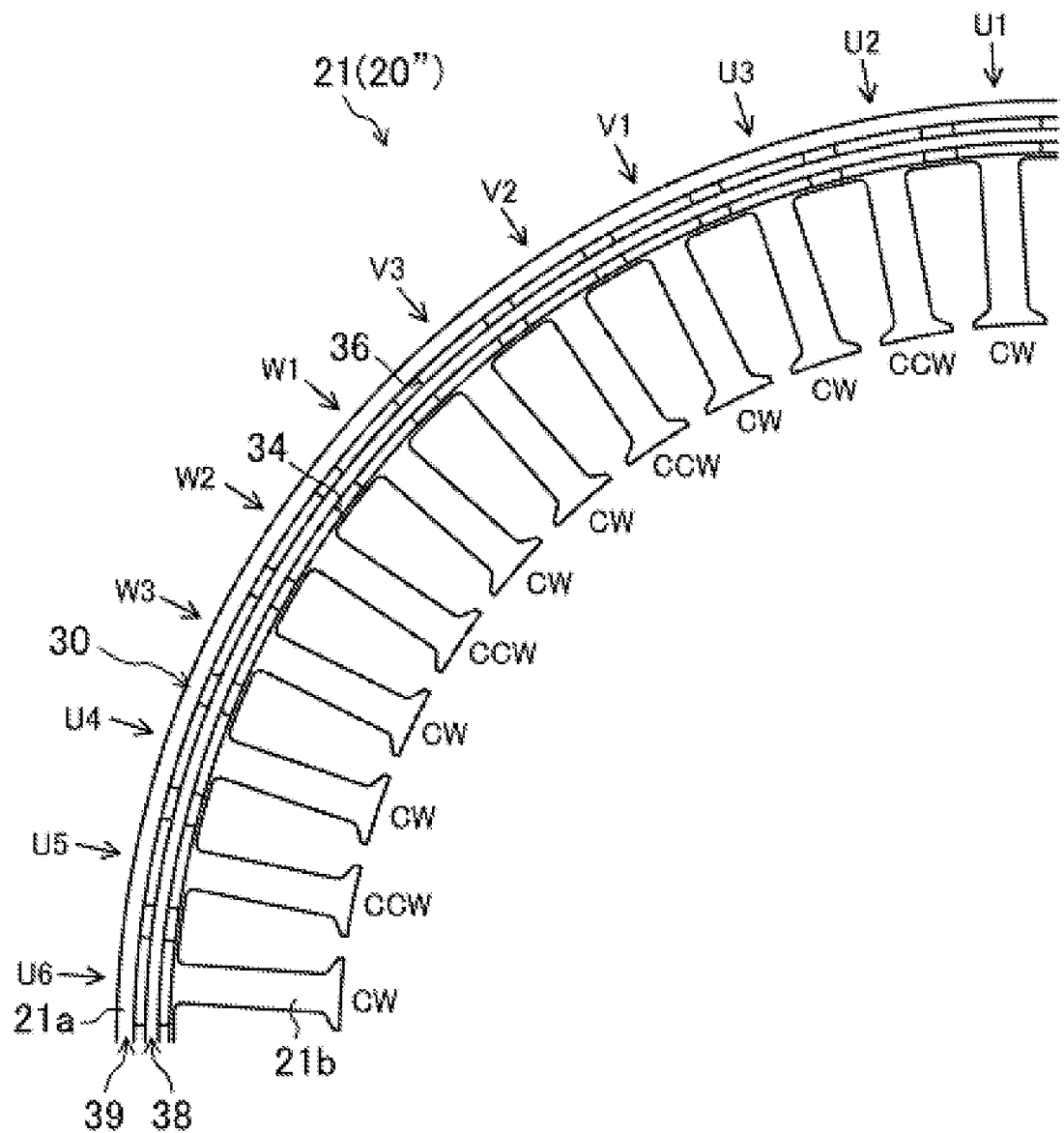

FIG. 42 is a view for describing a winding pattern of a modified embodiment and is a view corresponding to FIG. 32.

Figure 43:
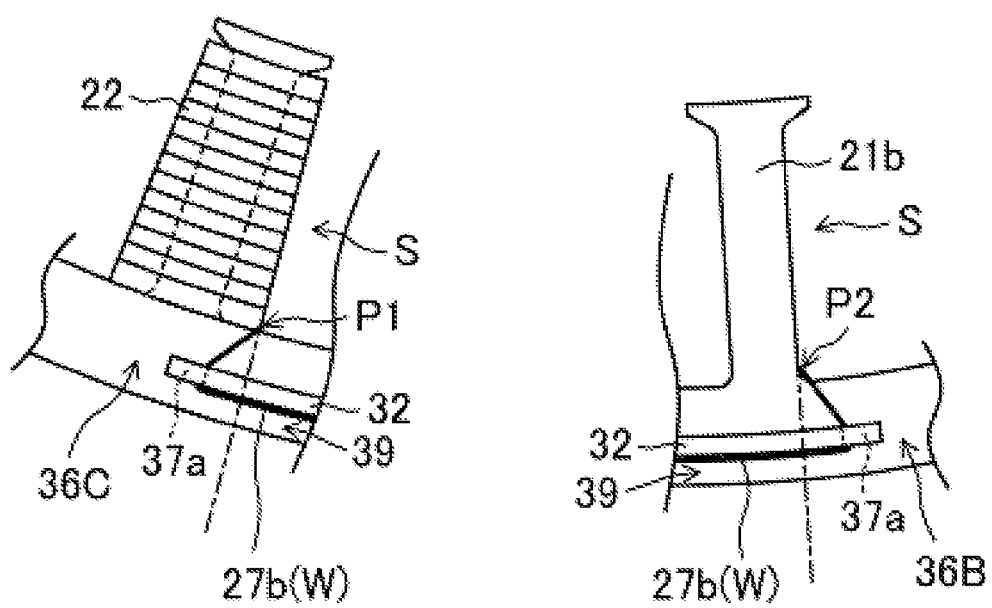

FIG. 43 is a schematic view for describing an example of arranging an inclined side surface portion.

(a) and (b) of FIG. 44 are schematic views for describing a modified embodiment of the motor of the third embodiment.

Figure 45:
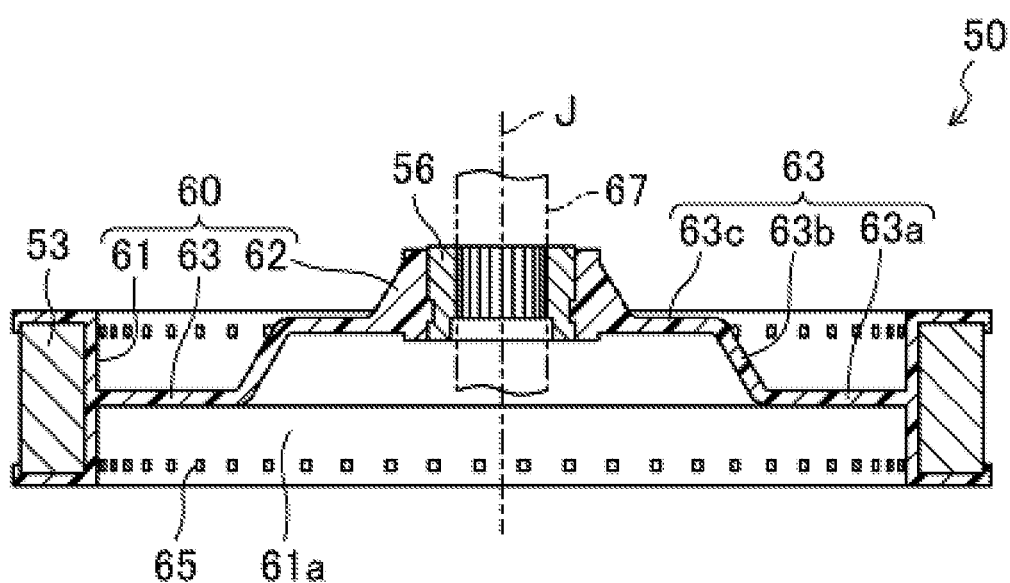

FIG. 45 is a schematic cross-sectional view illustrating a rotor in a motor of a fourth embodiment.

Figure 46:
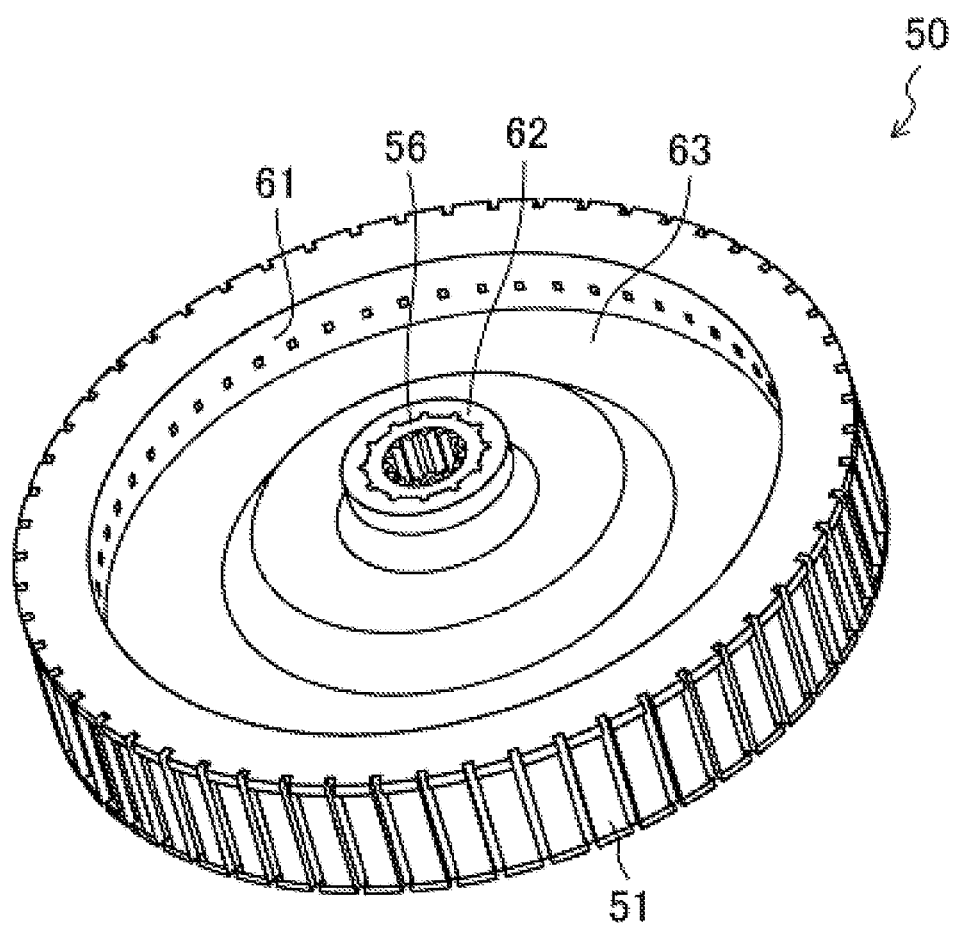

FIG. 46 is a schematic perspective view of the rotor.

Figure 47:
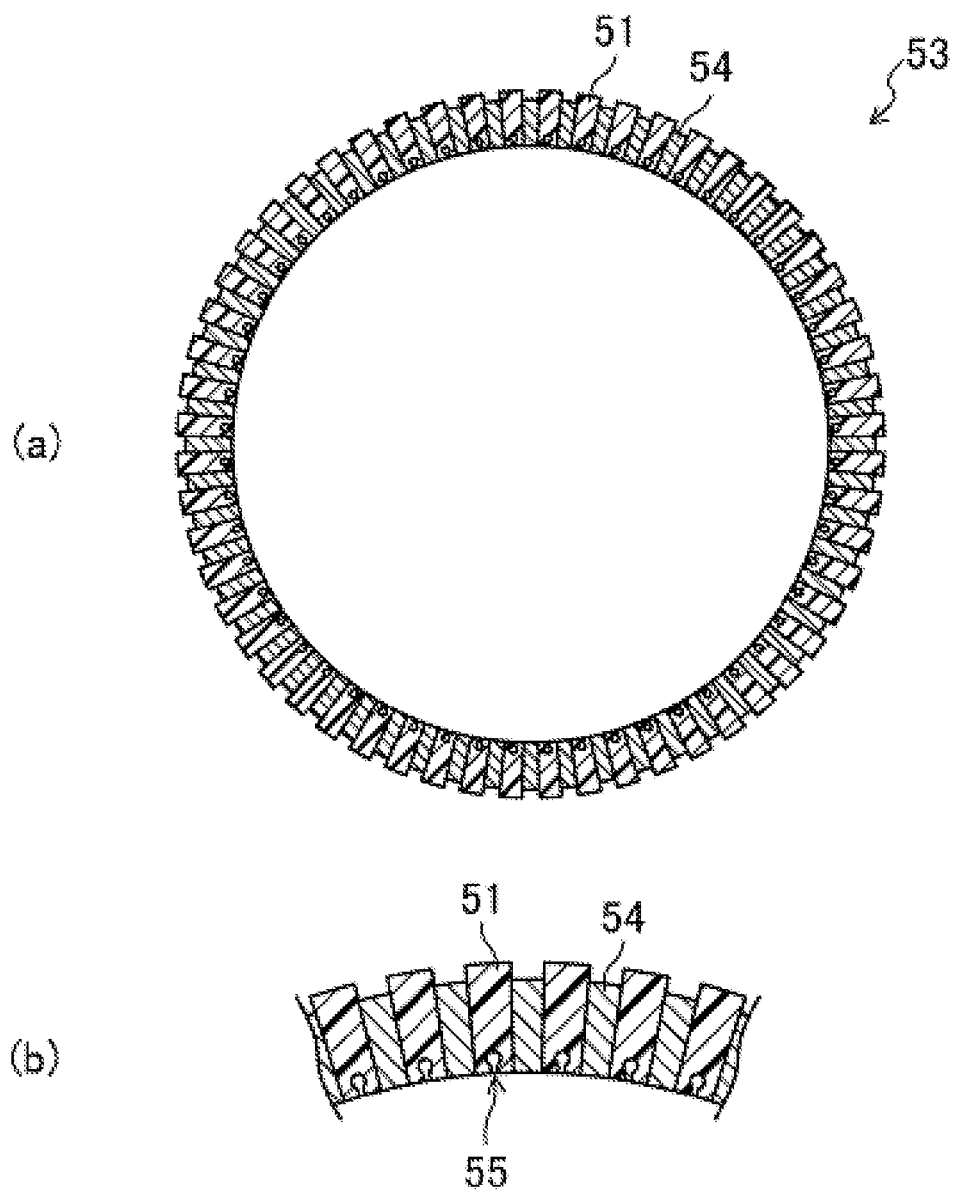

(a) of FIG. 47 is a plan view illustrating a configuration of a rotary body, and (b) is a partially enlarged view thereof.

Figure 48:
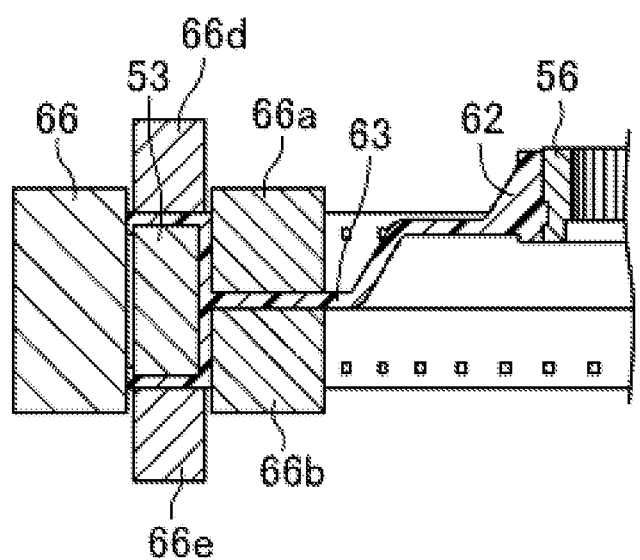

FIG. 48 is a view illustrating a method of magnetizing magnet pieces using a magnetizing yoke.

Figure 49:
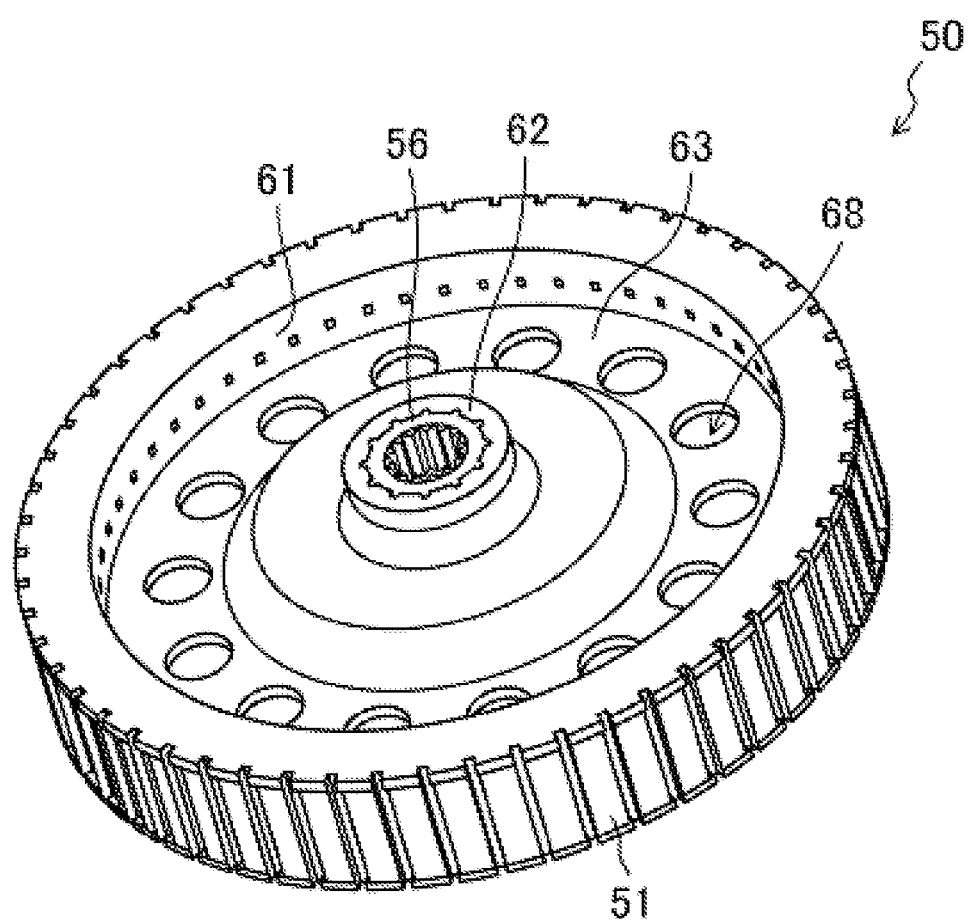

FIG. 49 is a schematic perspective view illustrating a modified embodiment of the motor of the fourth embodiment.

Figure 50:
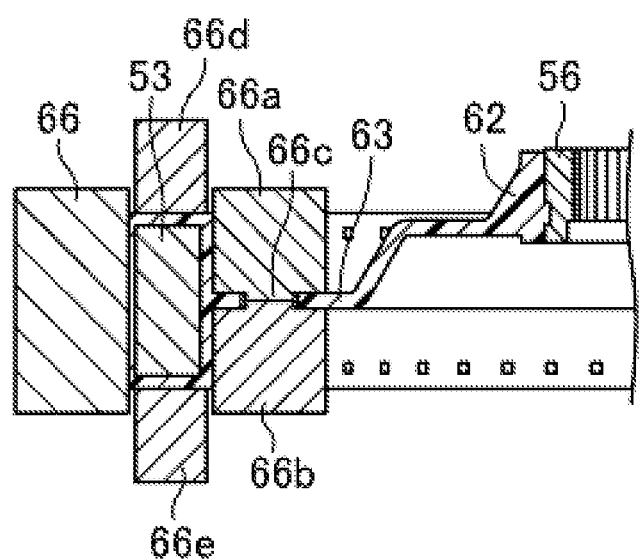

FIG. 50 is a view illustrating the method of magnetizing magnet pieces using the magnetizing yoke.

Figure 51:
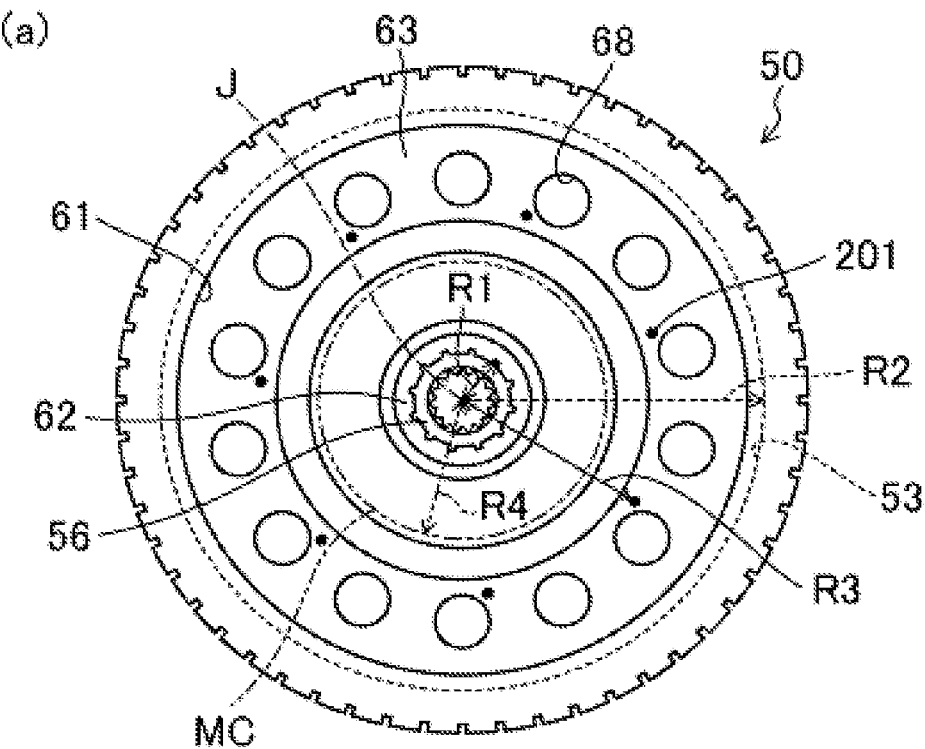
Figure 51:
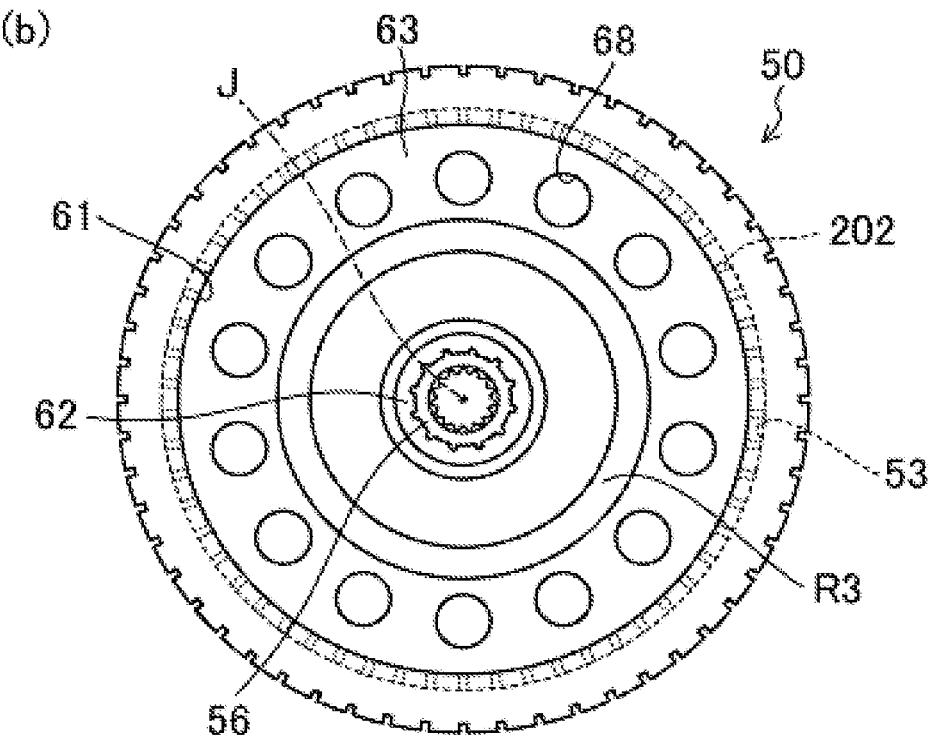

FIG. 51 is a schematic plan view illustrating a rotor in a motor of a fifth embodiment. (a) is a top view and (b) is a bottom view.

Figure 52:
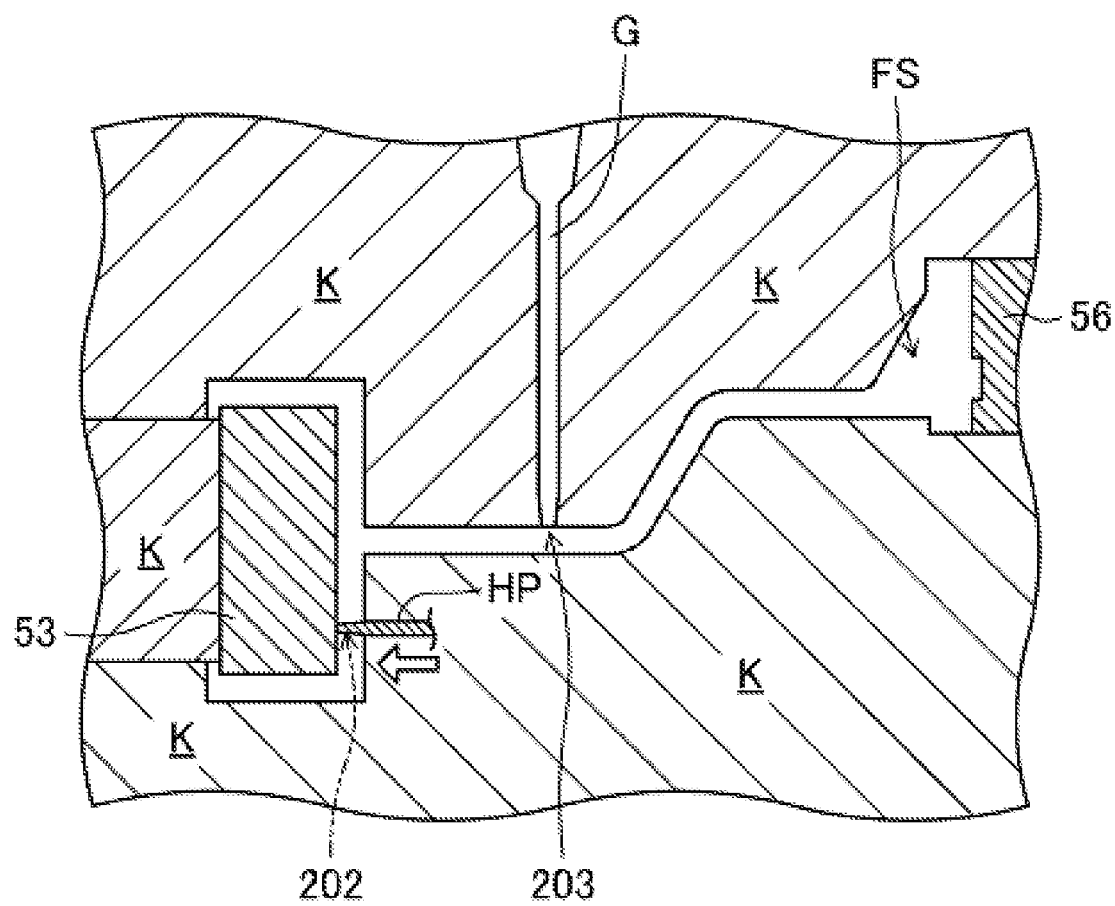

FIG. 52 is a schematic cross-sectional view illustrating a state when a rotor is formed in the motor of the fifth embodiment.

Figure 53:
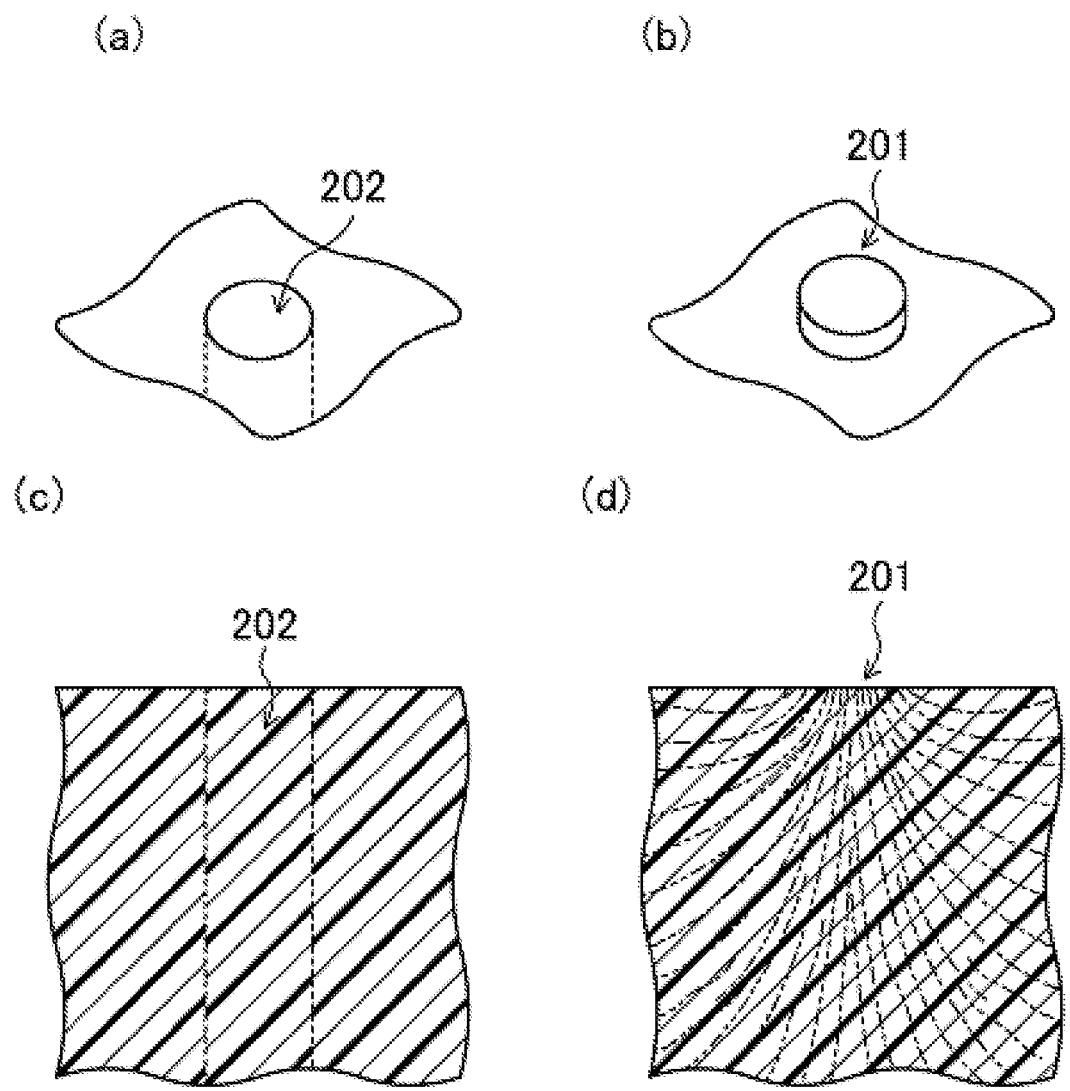

(a) to (d) of FIG. 53 are schematic views illustrating examples of a through-hole and a resin injection trace.

Figure 54:
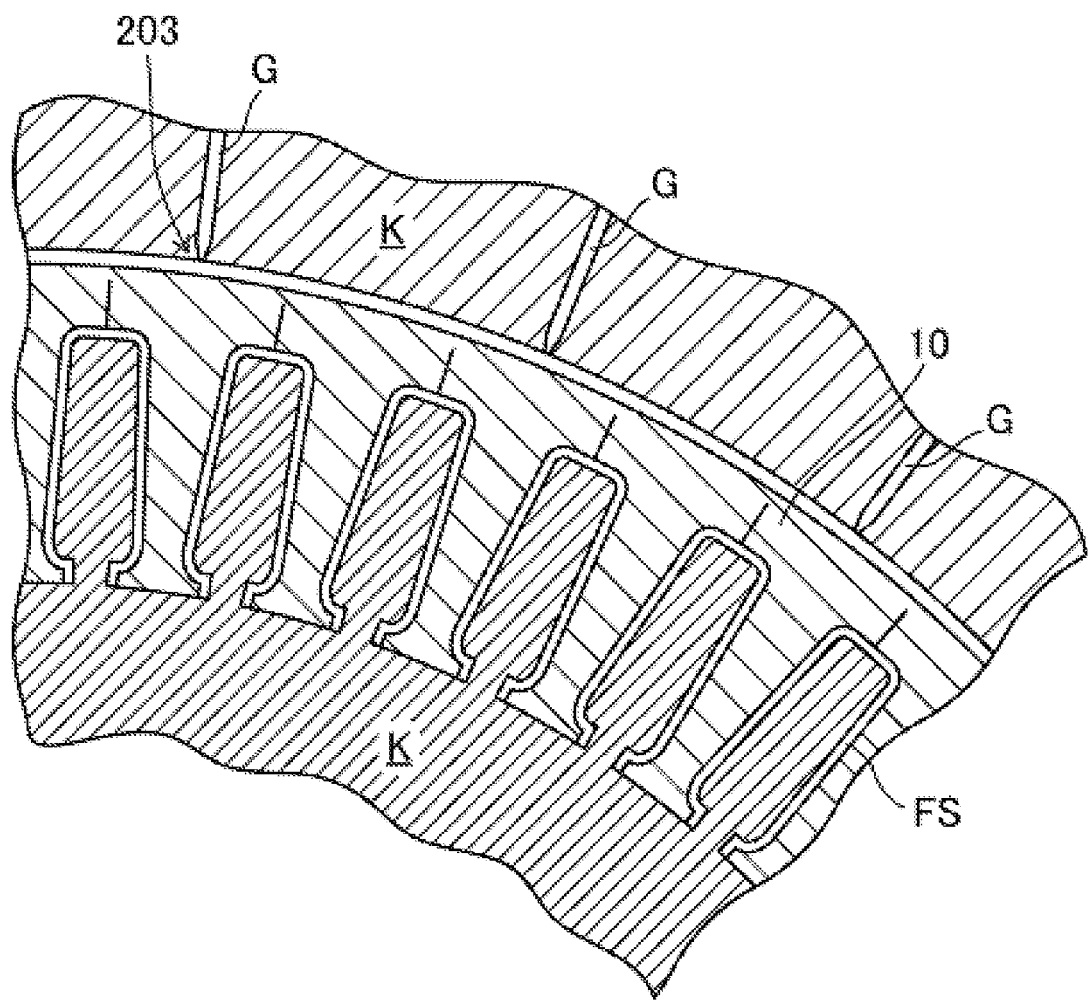

FIG. 54 is a schematic cross-sectional view illustrating a state when a stator is formed in the motor of the fifth embodiment.

DETAILED DESCRIPTION

Hereinafter, embodiments of the present invention will be described in detail based on the drawings. However, the present invention is not limited to the embodiments to be described below. Also, some changes within a scope not departing the effects of the present invention are possible.

Overview of a Motor in the Embodiment

Figure 3:
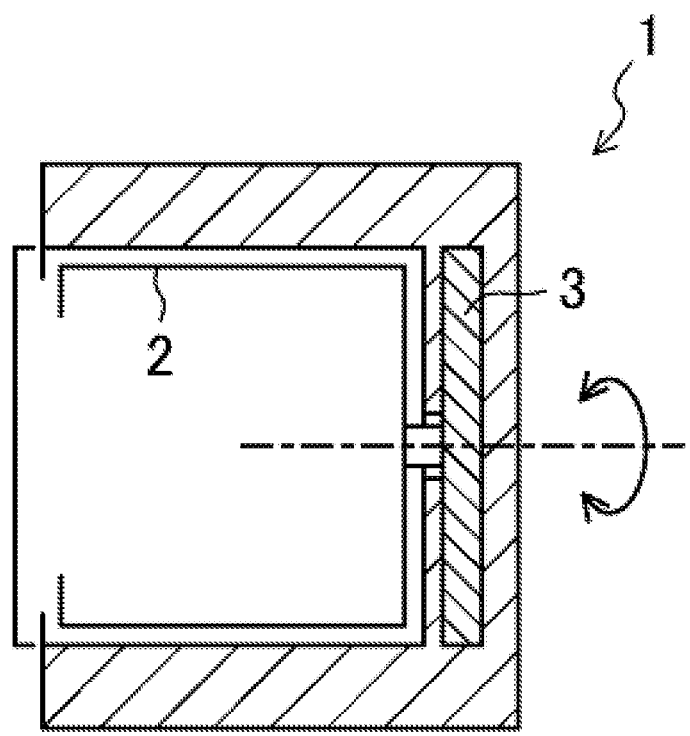
FIG. 3 is a schematic cross-sectional view illustrating a washing machine of the embodiment.

In FIG. 3, a fully automatic washing machine 1 is illustrated as an example of applying a motor of the embodiment. A drum 2 (washing tank) is vertically mounted inside the washing machine 1. A direct drive (DD) motor 3 that directly, i.e. without a deceleration means, rotates the drum 2 is disposed at a back surface of the drum 2, and the DD motor 3 is connected to the drum 2 while a center of rotation of the DD motor 3 coincides with a center of rotation of the drum 2 (the DD motor 3 corresponds to the motor of the embodiment).

The DD motor 3 may require a performance of displaying A high torque in a low speed range and a low profile may be required for the DD motor. Thus, the DD motor 3 is formed in a shape of a flat disk with a large diameter. The DD motor 3 is an inner rotor type motor and, in more detail, is formed of a rotor 50 or a stator 20 as will be described below.

The rotor 50 rotates about a rotation axis, and the stator 20 is disposed to face the rotor 50 in a diameter direction with a gap between the two. However, the washing machine 1 is only one example, and the motor of the embodiment may also be applied to other types of apparatuses in which the drum 2 is vertically mounted.

First Embodiment

In a first embodiment, a method of improving a stiffness of the stator 20 disposed at the DD motor 3 will be mainly described. FIGS. 4 to 8 schematically illustrate a method of manufacturing the stator 20.

First, as illustrated in FIG. 4(a), a band-shaped divided core 5 including a yoke core 5a and a plurality of teeth cores 5b is prepared. The band-shaped divided core 5 is formed by blanking steel plates in forms illustrated in (a) of FIG. 4 and stacking the blanked pieces as illustrated in FIG. 4(b).

However, the yoke core 5a includes groove portions 7 formed between the teeth cores 5b adjacent to each other. A shape of the groove portions 7 is not particularly limited, but the groove portions 7 may be, for example, formed in a V-shape.

Next, as illustrated in FIG. 5(a), the band-shaped divided core 5 is bent in an arc shape by having the plurality of teeth cores 5b placed inward. Here, the band-shaped divided core 5 is bent in the arc shape due to opened portions of the groove portions 7 formed between the teeth cores 5b adjacent to each other being closed as illustrated in FIG. 5(b).

In addition, the size of such an inner diameter of the divided core bent in the arc shape is set as R. Also, a concave portion 8 and a convex portion 9 that may be engaged with each other are formed at end portions of the divided core 5 as illustrated in FIG. 5(a).

Next, as illustrated in FIG. 6(a), a plurality of the divided cores 5 bent in the arc shape (four including 5A to 5D in the figure) are disposed in a ring shape, and the divided cores 5 adjacent to each other are coupled to form a ring-shaped connection core 10. Here, a size r of an inner diameter of the ring-shaped connection core 10 is set smaller than the size R of the inner diameter of the divided core 5 bent in the arc shape illustrated in FIG. 5(a) (r<R). By this, a spring-back force may be present within each of the divided cores 5.

Here, a fixture is used to form the ring-shaped connection core 10 having the predetermined inner diameter of the size r by coupling the plurality of divided cores 5. For example, a circular fixture having a radius r is placed at an inner circumferential side of the divided cores 5, and the divided cores 5 are moved in the axial direction to sequentially engage the concave portions 8 with the convex portions 9 of each of the divided cores 5, while a uniform force is used to press the inner circumferential side from an outer circumferential side of the divided cores 5.

In addition, the engaged portions are fixed by welding, etc. That is, coupling portions A to D of the divided cores 5A to 5D are coupled by the concave portions 8 and the convex portions 9 formed at the end portions of the divided cores 5 being engaged with each other. However, the coupling portions may be fixed only by welding by fixing the coupling portions using the fixture even when the concave portions 8 and the convex portions 9 are not formed. The concave portions 8 and the convex portions 9 facilitate handling and position determination of the divided cores 5.

In addition, although fixing the coupling portions A to D of the divided cores may be performed by welding at the outer circumferential side, the fixing may also be performed by other methods (for example, adhesion using an adhesive). Also, portions where the opened portions of the groove portions 7 are closed may be welded and fixed from the inner circumferential side.

Although the four divided cores 5A to 5D are coupled to form the connection core 10 in the embodiment, the number of the divided cores 5 being coupled is not particularly limited.

Next, as illustrated in FIG. 7(a), the ring-shaped connection core 10 is loaded in a mold (not shown), and the ring-shaped connection core 10 is resin-molded by an insertion forming. By this, surrounding portions of the yoke core 5a and the teeth cores 5b are covered by an insulator 24.

However, since the spring-back force does not act on each of the coupling portions A to D even though the spring back force is present within the divided cores 5A to 5D, a force of the connection core 10 attempting to be circular is not uniform at each of the coupling portions A to D and other remaining portions, causing a roundness precision to decrease as illustrated in an image of FIG. 8.

Here, to improve the roundness precision, the ring-shaped connection core 10 is resin-molded while pressing the coupling portions A to D of the divided cores adjacent to each other from the outer circumferential side toward the inner circumferential side using a slide pin P when an insertion forming is performed. By this, a loss of the roundness precision in each of the coupling portions A to D may be minimized, and thus the connection core 10 having a precise roundness may be formed.

Here, as illustrated in FIG. 7(b), a through-hole 13, which is a trace of removing the slide pin P that has pressed the coupling portions A to D of the divided cores 5A to 5D from the outer circumferential side toward the inner circumferential side, is formed at an outer circumferential surface of the insulator 24 surrounding the connection core 10.

However, positions pressed by the slide pins P are not limited to the coupling portions A to D of the divided cores and may be neighboring portions thereof. In this case, two spots having the coupling portions A to D therebetween may be pressed by the slide pins P to correct to gain a balance. Also, the slide pins P may be installed at all directions to maintain a balance of a contractile force of the resin after the molding.

In the embodiment, as illustrated in FIG. 7(a), a plurality of mounting parts 12 for mounting the stator may be integrally formed with a resin during the insertion forming.

As illustrated in FIG. 9, a reinforcement ring R may be mounted on the outer circumferential portion of the connection core 10 during the insertion forming. In this case, it is preferable that a penetration hole 18 through which the slide pin P penetrates be formed at the reinforcement ring R.

Since the stator manufactured by the manufacturing method of the embodiment configures the connection core 10 by the divided cores 5 within which the spring-back force is present, the stiffness of the stator may be improved. Also, the connection core is resin-molded while the coupling portions A to D or the neighboring portions thereof of the divided cores 5 are pressed by the slide pins P during the insertion forming, thereby not only realizing a stator with a high roundness precision ion 110, but also reducing vibration or noise.

Modified Embodiment of the First Embodiment

FIGS. 10(a) and 10(b) are views illustrating a modified embodiment of the first embodiment.

As illustrated in FIG. 10(a), the groove portions 7 formed at the band-shaped divided cores 5 have unclosed hole portions 7a when the band-shaped divided cores 5 are bent in ring shapes. By this, when the band-shaped divided cores 5 are bent in the arc shapes, the band-shaped divided cores 5 have the unclosed (opened) portions 7a in addition to the closed portions as illustrated in FIG. 10(b).

By this, a stable spring-back force may be obtained by reducing closed contact surfaces, and the stiffness of the connection core may be further improved since a resin is filled in the corresponding unclosed portions 7a during the insertion forming.

FIG. 11 is a view illustrating another modified embodiment of the first embodiment.

As illustrated in FIG. 11, a size R1 of an inner diameter at both end portions of the divided cores 5 bent in the arc shapes is set to be smaller than a size R2 of an inner diameter at central portions thereof (R1<R2). However, R1 and R2 are set to be greater than the size r of an inner diameter of the ring-shaped connection core 10 (refer to FIG. 3(a)).

By this, the spring-back force is present within the divided cores 5 and forces with the coupling portions A to D of the divided cores 5 in which the spring-back force is not present may be balanced, thereby further improving the roundness.

FIGS. 12(a) and 12(b) are views illustrating still another modified embodiment of the first embodiment.

As illustrated in (a) and (b) of FIG. 12, when a plurality of mounting parts 12a to 12d for mounting the stator are integrally formed with resin during the insertion forming, the mounting parts 12a to 12d are at least spaced apart from adjacent coupling portions A to D of the divided cores 5 and are disposed to be distributed along the circumferential direction of the ring-shaped connection core 10.

The stator of the embodiment improves the stiffness of the connection core 10 by making the spring-back force to be present within the divided cores 10. Meanwhile, since the coupling portions A to D of the divided cores 5 are fixed by welding, and the like, the stiffness of the coupling portions A to D is originally high.

Consequently, the stiffness of the divided cores 5 at portions spaced apart from the coupling portions A to D is lower than the stiffness at the coupling portions A to D. Here, the mounting parts 12a to 12d that are integrally formed with resin are formed at the corresponding portions to also serve as reinforcing members, thereby further improving the stiffness of the divided cores 5 after the divided cores 5 are installed.

The connection core 10 illustrated in FIG. 12(a) has four mounting parts 12a to 12d disposed with respect to the four divided cores 5. In this case, the mounting parts 12a to 12d are preferably disposed at midpoints of the coupling portions A to D of the divided cores 5. By this, the stiffness of the divided cores 5 may be most effectively improved.

The connection core 10 illustrated in FIG. 12(b) has six mounting parts 12a to 12f disposed with respect to the four divided cores 5. In this case, the mounting parts 12a to 12f are preferably disposed at points where distances L closest to the coupling portions A to D of the divided cores 5 become the maximum. By this, the stiffness of the divided cores 5 may be most effectively improved since the mounting parts 12a to 12f serving as the reinforcing members are disposed in equal intervals along the circumferential direction of the connection core 10.

(a) and (b) of FIG. 13 are views illustrating yet another modified embodiment of the first embodiment.

FIG. 13(a) is a view illustrating a state in which ring-shaped connection cores 10a and 10b formed by coupling adjacent divided cores 5 are stacked in an axial direction. As illustrated in FIG. 13(a), coupling portions A1 and B1 of the divided cores 5 of the connection core 10a and a coupling portion A2 of the divided cores 5 of the connection core 10b are disposed at misaligned positions in the circumferential direction when viewed from the axial direction.

In the embodiment, although the roundness at each of the coupling portions may be corrected by pressing the coupling portions or the neighboring portions thereof of the adjacent divided cores 5 from the outer circumferential side toward the inner circumferential side using the slide pins P when the insertion forming of the connection core 10 is performed, the correction may not always be sufficient due to a large magnitude of the spring-back force.

Consequently, when the stator is configured by stacking the connection cores 10a and 10b, the coupling portions of the divided cores 5 of each of the connection cores 10a and 10b are disposed to be misaligned in the circumferential direction, thereby making magnetic energy of air gap portions uniform and realizing an equivalent effect as that of the connection cores with a high roundness precision.

A number of connection cores 10 being stacked in the modified embodiment is not limited, but the coupling portions of each of the layers of the divided cores 5 are preferably disposed in equal intervals along the circumferential direction when viewed from the axial direction. By this, the magnetic energy at the air gap portions may be further made uniform and an effect equivalent to the connection cores having a high roundness precision may be efficiently improved.

Here, in FIG. 13(a), the through-holes 13 formed at outer circumferential surfaces of the resin surrounding the connection cores 10a and 10b represent traces of removing the slide pins P that have pressed the divided cores 5 from two spots having the coupling portions A1, B1, and A2 of the divided cores 5 therebetween during the insertion forming.

However, when the roundness at the coupling portions decreases, the coupling portions with the decreased roundness may become a cause of a magnetic change. As a result, there is a concern that a magnetic vibration may occur when a motor is rotated.

FIG. 13(b) is an image schematically illustrating a configuration of connection cores in which the magnetic vibration has been suppressed.

As illustrated in FIG. 13(b), three connection cores 10a to 10c each formed of four divided cores are stacked in the axial direction. Also, coupling portions A1 to D1, A2 to D2, and A3 to D3 of each of the connection cores 10a to 10c are disposed in equal intervals along the circumferential direction when viewed from the axial direction. That is, the twelve coupling portions A1 to D3 are disposed in equal intervals along the circumferential direction.

When a motor is configured by disposing, for example, a rotor having 56 magnetic poles to face the stator above, a magnetic change component in the coupling portions becomes very high-dimensional at 168 times per revolution (a least common multiple between 12 which is a total number of the coupling portions, and 56 which is a number of poles).

By this, the magnetic vibration is reduced when the motor is rotated. That is, by setting the number of poles of the rotor not to be a multiple of the total number of the coupling portions of the divided cores 5, a low-dimensional magnetic change component may be reduced such that the magnetic vibration may be reduced when the motor is rotated.

FIG. 14 is a view illustrating yet another modified embodiment of the first embodiment.

FIG. 14 is a view illustrating a state in which the front ends of the teeth cores 5b are disposed to come in contact with a mold 15 disposed at the inner circumferential side of the connection core 10. Here, contact surfaces 16 of the mold 15 coming in contact with the front ends of the teeth cores 5b become a portion (arc) of a perfect circle or straight-line shaped.

By this, the plurality of divided cores are molded with resin while the coupling portions or the neighboring portions thereof of the divided cores 5 are pressed from the outer circumferential side toward the inner circumferential side by the slide pins P such that the connection core 10 having high roundness may be realized.

In addition, as illustrated in FIG. 14, the mold 15 has guide surfaces 17 for guiding widths of the front ends of the teeth cores 5b. By this, positions of the teeth cores 5b within the mold 15 may be determined with a high precision such that the precision of the positions of the teeth cores 5b and the roundness of the connection core 10 may be improved.

(a) and (b) of FIG. 15 are views illustrating yet another modified embodiment of the first embodiment.

(a) and (b) of FIG. 15 are views schematically illustrating a motor that includes a rotor 50 disposed to face an inner circumferential surface of the stator in which the three connection cores 10a to 10c are stacked.

When an axial thickness of the rotor 50 is Lm, an axial thickness of the connection cores as a whole is Ls, axial thicknesses of both outer connection cores 10a and 10c among the connection cores are Lc, and an axial thickness of the inner connection core 10b is Lca, Lc<Lca is satisfied when Ls<Lm ((a) of FIG. 15), and Lc>Lca is satisfied when Ls>Lm ((b) of FIG. 15).

By this, a magnetic force may be balanced even when a difference exists between the thickness Lm of the rotor 50 and the total thickness Ls of the connection cores, and an effect caused by a decrease in roundness may be suppressed.

The first embodiment and the modified embodiments thereof may be changed. For example, although the band-shaped divided cores 5 have been bent in arc shapes while having the plurality of teeth cores 5b placed inward in the first embodiment, the band-shaped divided cores 5 may also be bent in the arc shapes while having the plurality of teeth cores 5b placed outward.

In this case, the ring-shaped connection core 10 is resin-molded while pressing the coupling portions or the neighboring portions thereof of the adjacent divided cores 5 from the inner circumferential side toward the outer circumferential side using the slide pins P during the insertion forming. That is, the stator of the embodiment may not only be applied to the inner rotor type motor but also to the outer rotor type motor.

Second Embodiment

In a motor of the second embodiment, a method of improving flame resistance or durability, manufacturability of a stator will be mostly described.

Overview of a Motor in the Second Embodiment

When a sub-core is mounted on a main core as in the above-mentioned Patent Document 2, the flame resistance is excellent since a leakage of flame may be blocked even when a coil ignites. However, an effect of suppressing vibrations (particularly, axial vibrations) of front ends of teeth cannot be obtained since gaps between the front ends of the teeth are not fixed to blocking units.

When the gaps between the front ends of the teeth are fixed as in Patent Document 3 or Patent Document 4, the vibrations of the front ends of the teeth may be suppressed such that a low noise may be promoted.

However, a difficulty exists in terms of durability since the gaps between the front ends of the teeth are fixed by adhering, and the like in Patent Document 3 or Patent Document 4, and a difficulty exists in terms of manufacturability in a case of a motor having many teeth since the number of work processes increases proportional to the number of teeth.

Here, the method of improving flame resistance or durability, manufacturability of the stator is embodied with the motor of the second embodiment.

The motor of the second embodiment is an inner rotor type motor. The stator has a cylindrical yoke part, a plurality of teeth parts extending from an inner circumferential surface of the corresponding yoke part toward a center to be radially disposed, a plurality of coils respectively wound around the plurality of teeth parts, and an enclosure integrally formed using a synthetic resin to be mounted on the stator from at least one direction of a rotation axis direction.

The enclosure includes a ring-shaped base portion covered by the coils, and a plurality of gap blocking parts drooping from an inner circumference of the ring-shaped base portion to block gaps between front ends of the teeth parts adjacent to each other.

Also, joining surfaces extending in the rotation axis direction to come in contact with the central side are each installed at both circumferential sides of the front end portions of the teeth parts, and both side portions of each of the gap blocking parts are each deposited on the joining surfaces.

Consequently, according to the motor, since the insulator of the stator is insertion-molded, the arrangement or size thereof may have a high precision even when the plurality of teeth parts are present. Since the enclosure is also integrally formed using the synthetic resin, the size thereof may have a high precision.

The ring-shaped base portion of the enclosure is surrounded by the coils, thereby having an excellent flame resistance.

In addition, the joining surfaces extending in the rotation axis direction to come in contact with the central side are respectively installed at both circumferential sides of the front end portions of the teeth parts, and both side portions of each of the plurality of gap blocking parts of the enclosure are respectively deposited on the joining surfaces.

Consequently, the manufacturability is excellent since the gap blocking parts may be disposed at the gaps between the front ends of the plurality of teeth parts by only mounting the enclosure on the stator.

The durability is excellent since each of the gap blocking parts are deposited on and integrally formed with the teeth parts. Also, since a shearing direction of the deposition portions are formed of the circumferential direction and the axial direction, the vibrations acting on the front end portions of the teeth parts may be effectively suppressed, thereby promoting low noise.

For example, it is preferable that thickness portions interlocked to the gaps between the teeth parts are provided between the both side portions of the gap blocking parts.

By this, the strengths and stiffness of the gap blocking parts are reinforced such that the vibrations may be more effectively suppressed, and the manufacturability may be further improved since the thickness portions serve as interlocking guides when the enclosure is being mounted on the stator core.

Particularly, it is preferable that the gap blocking parts are deposited on the joining surfaces by an ultrasonic deposition. By this, the deposition may occur more promptly and precisely. Also, the inner diameter of the stator is 200 mm or greater to enable the deposition by disposing an ultrasonic deposition device at an inside of the stator, thereby stably performing the ultrasonic deposition.

In addition, synthetic resins of the insulator and the enclosure are preferably of the same type.

By this, the integration may be facilitated such that a firmer deposition is possible.

In addition, inclined portions for guiding an interlock between the teeth parts may be respectively installed at front ends of the gap blocking parts.

By this, the manufacturability is further improved since each of the gap blocking parts may be easily guided to each opened slot by the inclined portions when the enclosure is being mounted on the stator.

In addition, a plurality of penetration holes facing gaps between the coils may be installed at the ring-shaped base portion.

By this, a heat of the coils radiating due to a current flow may be dissipated. Since the penetration holes are disposed not to face the coils, a leakage of flames from the enclosure may be suppressed.

In addition, the enclosure may be formed of a plurality of divided parts connected in the circumferential direction.

The parts become smaller, thereby being advantageous in terms of shipping, and the like and improving a level of freedom of an assembly work.

Detailed Embodiment of the Motor of the Second Embodiment

FIG. 16 illustrates a main portion of the motor in the second embodiment.

The rotor 50 of the motor of the embodiment is freely supported about a rotation axis J, and is formed of a rotor core 51, a connection plate 52, etc. The rotor 50 is a disk-shaped member, and a plurality (48 in the motor 3) of magnetic poles 51a formed of S-poles and N-poles are alternately installed in equal intervals in the circumferential direction at surrounding portions of the rotor 50. The connection plate 52 is installed at one side of the rotor core 51, and a connection part 52a to which the drum 2 is directly connected is installed at a central portion of the connection plate 52.

The stator 20 is a thin cylindrical or ring-shaped member that is disposed on the same axis around the rotor 50. An inner circumferential surface of the stator 20 faces an outer circumferential surface of the rotor 50 with a small gap therebetween.

As illustrated in FIG. 17, the stator 20 is formed of a stator core 21, a plurality (48 in the motor 3) of coils 22, an enclosure 80, etc. Here, the stator core 21 of the embodiment corresponds to the stator 20 of the first embodiment.

The stator core 21 is formed of a core main body 23 and the insulator 24 formed by stacking metal plates.

Specifically, the stator core 21 is formed by the insertion forming. As a result, most portions of the core main body 23 are buried in the insulator 24 formed of a synthetic resin and are integrated with the insulator 24. Polybutylene terephthalate (PBT) having an excellent stiffness is used as a material of the insulator 24.

The stator core 21 includes a cylindrical yoke part 21a and a plurality (48 in the motor 3) of teeth parts 21b extending from an inner circumferential surface of the yoke part 21a toward the center to be radially disposed in equal intervals in the circumferential direction. A front end surface of each of the teeth parts 21b is formed on a side of an arc as if facing the outer circumferential surface of the rotor 50.

Here, for reasons related to the size of the stator core 21, it is preferable that at least 24 teeth parts 21b are installed.

Slots through which wires are inserted to pass are formed between two adjacent teeth parts 21b and 21 b, and as many thereof as the number of the teeth parts 21b are formed. Narrow, long gaps (opened slots 75) extending in the direction of the rotation axis J are formed between the front end portions of the two adjacent teeth parts 21b and 21 b.

The stator core 21 may be formed with a high precision by the insertion forming. For example, a highly precise arrangement or size of each of the teeth parts 21*b* may be stably obtained even when the plurality of teeth parts 21*b* are present.

By this, joining surfaces 76 that are nearly flat are each installed at both circumferential sides of the front end portions of the teeth parts 21*b* with a high precision (refer to FIGS. 18 and 19).

Each of the joining surfaces 76 extends in the direction of the rotation axis J to follow edges of the front end portions of the teeth parts 21*b* and is formed within a range from one end portion to the other end portion with respect to the direction of the rotation axis J of the teeth parts 21*b*. Each of the joining surfaces 76 comes in contact with the central side of the stator core 21.

The inner diameter of the stator core 21 (an inner diameter of a circle formed by the front end surfaces of each of the teeth parts 21*b*) is designed to be 200 mm or greater to stably, highly precisely, and promptly perform the deposition of the enclosure 80 to be described below.

Each of the coils 22 is formed by an intensive winding. That is, the coils 22 are formed by winding (coiling) a wire (a covered wire) around each of the teeth parts 21*b*.

(Enclosure)

The enclosure 80 is a cover member mounted on one side of the stator core 21 in the direction of the rotation axis J, and is integrally formed by injection molding using PBT which is the same type of synthetic resin as the insulator 24.

The enclosure 80 includes a ring-shaped base portion 81, a cylindrical flange part 82 curved from an outer circumference of the ring-shaped base portion 81 and slightly protruded, and a plurality of gap blocking parts 83 extending while drooping from an inner circumference of the ring-shaped base portion 81 in a direction in which the flange part 82 protrudes. In the case of the DD motor 3, 48 gap blocking parts 83 are disposed in equal intervals in the circumferential direction.

Since the ring-shaped base portion 81 is surrounded by the coils 22 of the stator core 21 when the enclosure 80 is mounted on the stator core 21, the ring-shaped base portion 81 may block flames from being discharged to the outside of the enclosure 80 even when the coils 22 ignite.

A plurality of slit-shaped penetration holes 84 extending in a diameter direction are installed at the ring-shaped base portion 81. The penetration holes 84 are disposed to face gaps between adjacent coils 22 and 22 when the enclosure 80 is mounted on the stator core 21.

The heat of the coils radiating due to the current flow may be dissipated by the penetration holes 84. Also, since the penetration holes 84 are disposed not to face the coils 22, the penetration holes 84 may suppress the leakage of flames from the enclosure 80.

The enclosure 80 is mounted on the stator core 21 while interlocking the gap blocking parts 83 to each of the opened slots 75.

As illustrated in FIG. 18, the opened slots 75 become blocked by the gap blocking parts 83 due to the enclosure 80 suitably mounted on the stator core 21.

As illustrated in FIG. 19, each of the gap blocking parts 83 has a nearly convex surface formed between both side portions of the nearly convex surface and has a thickness portion 83*a* thickened due to an outer surface being bulged in a diameter direction. The strengths and stiffness of the gap blocking parts 83 are reinforced by the thickness portions 83*a*. Surfaces facing an outside in the diameter direction of the both side portions (narrow portions 83*b*) of the gap blocking parts 83 are formed of flat surfaces coming in contact with the joining surfaces 76, and the thickness portions 83*a* are interlocked to the opened slots 75.

Inclined portions 85 for guiding an interlock between the teeth parts 21*b* may be respectively installed at front ends of the gap blocking parts 83.

Specifically, as illustrated in FIG. 18, both circumferential sides of the front end portions of each of the gap blocking parts 83 are inclined to be closed. Also, as illustrated in FIG. 20, the front end surfaces of the gap blocking parts 83 are inclined to face the outside in the diameter direction. The inclined portions 85 are formed by the slopes.

Portions of the gap blocking parts 83 in which the inclined portions 85 are installed are disposed at portions (coil ends) where the coils 22 overflow in the direction of the rotation axis J from the teeth parts 21*b*, and are set to exist from the joining surfaces 76. By this, the narrow portions 83*b* come in contact with almost all portions of the joining surfaces 76.

The gap blocking parts 83 may each be easily guided to the opened slots 75 by the inclined portions 85 even when the plurality of gap blocking parts 83 are present when the enclosure 80 is being mounted on the stator core 21. Also, since the thickness portions 83*a* are interlocked to the opened slots 75 and slide once the front ends of the gap blocking parts 83 are each interlocked to the opened slots 75, the enclosure 80 may be mounted at a suitable position of the stator core 21 just by pushing in the gap blocking parts 83.

The enclosure 80 mounted on the stator core 21 is fixed to the stator core 21 by depositing each of both of the narrow portions 83*b* and 83*b* of the gap blocking parts 83 on the joining surfaces 76 of the teeth parts 21*b* by the ultrasonic deposition.

Specifically, as illustrated in FIG. 21, an ultrasonic deposition device 90 is disposed inside the stator core 21 for the deposition. The ultrasonic deposition device 90 is formed of a vibrator 91, a horn 92, etc. and deposits the deposition portions using a frictional heat generated by applying an ultrasonic vibration by welding the deposition portions with pressure using the horn 92.

Since a space inside the stator core 21 is limited, the deposition was initially performed while the vibrator 91 was disposed outside the stator core 21, and it was confirmed that the deposition was unstably performed.

Here, in the DD motor 3, the inner diameter of the stator core 21 is set to be 200 mm or greater, and the horn 92 and the vibrator 91 are disposed in series inside the stator core 21. By this, as illustrated in FIG. 22, the horn 92 may be suitably welded with pressure to the deposition portions (portions where the joining surface 76 come in contact with surfaces of the narrow portions 83*b*), and the ultrasonic deposition may be stably performed.

In addition, in the case of the ultrasonic deposition, since it is possible to take one second or less to perform deposition at one spot is possible, and e.g. a plurality of deposition portions may be sequentially deposited while rotating the stator core 21, a task of installing the enclosure 80 on the stator core 21 may be highly precisely and promptly performed.

The durability is excellent since each of the gap blocking parts 83 are integrated with each of the teeth parts 21*b* by the deposition. Since the shearing directions of the deposition portions are in the circumferential direction and the axial direction, the circumferential and axial vibrations acting on the front end portions of the teeth parts 21*b* may be effectively suppressed, thereby promoting low noise.

Particularly, since the same type of synthetic resin is used for the enclosure 80 and the insulator 24 in the DD motor 3, the integration by the deposition is facilitated, and the enclosure 80 may be more firmly fixed to the stator core 21.

Modified Embodiment of the Second Embodiment

For example, as illustrated in FIG. 23, the enclosure 80 may be formed of a plurality of divided parts 80a and 80a. Although an example of dividing the enclosure 80 into two parts is illustrated in FIG. 23, the enclosure 80 may also be divided into three or more parts.

In addition, as illustrated in FIG. 24, the enclosure 80 may also be formed of a pair of halved divided parts 80b and 80b facing each other from both sides of the direction of the rotation axis J. In this case, both end portions of the stator core 21 in the direction of the rotation axis J are covered by the enclosure 80.

The penetration holes 84 installed at the enclosure 80 are not limited to slit shapes and may be formed of a plurality of holes.

Third Embodiment

In the motor of the third embodiment, a structure of a connection line of a coil will be mainly described.

Overview of the Motor of the Third Embodiment

The stators of the above-mentioned Patent Document 5 and Patent Document 6 both have coils of each phase separately formed. That is, after first-phase coils are completely formed, all of second-phase coils and all of third-phase coils are sequentially formed.

In this case, since a coil work has to be repeated for three times, a number of processes increases and the manufacturability decreases.

Here, the motor of the third embodiment has a structure that is capable of forming coils of each of the phases with a small number of processes and making the motor lower in profile.

A stator of the motor of the third embodiment includes a cylindrical yoke part and a plurality of teeth parts radially extending from the yoke part in equal intervals in the circumferential direction. First-phase to third-phase coil groups are each installed at the teeth parts by an intensive winding that forms a coil by winding a wire.

The coil group of each phase is formed using one wire and has a connection line for connecting two coils disposed by having one or more coils fitted therebetween. The insulator is inserted at a ring-shaped one end portion coming in contact with the rotation axis direction, and has an inside guide wall unit and an outside guide wall unit disposed in a concentric form while having a gap therebetween. A plurality of crossing routes through which the connection lines pass are formed at an upper end edge of each of the inside guide wall unit and the outside guide wall unit as the corresponding upper end edge is concave. An inside route that enables the connection lines to be wired is installed between the inside guide wall unit and the outside guide wall unit. An outside route that enables the connection lines to be wired is installed at an outside of the outside guide wall unit.

In addition, the connection line of the first-phase coil group is wired to the inside route, the connection line of the second-phase coil group is wired to the outside route, and the connection line of the third-phase coil group passes through an upper portion of the connection line of the first-phase or second-phase coil group to be wired to the inside route or the outside route.

In the stator, each coil of the three-phase coil groups is formed by the intensive winding using one wire, the connection line of the first-phase coil group is wired to the inside route, the connection line of the second-phase coil group is wired to the outside route, and the connection line of the third-phase coil group passes through the upper portion of the connection line of the first-phase or second-phase coil group to be wired to the inside route or the outside route.

Consequently, since a height of the inside guide wall unit and the outside guide wall unit is sufficient when at least two wires can be disposed by emptying a gap, an axial height of the stator may be suppressed, and making the motor low in profile may be promoted.

Since the nozzle winding method using three nozzles may be used, the coils of each of the phases may be formed with a small number of processes.

Specifically, it is preferable that, among the crossing routes of the inside guide wall unit and the outside guide wall unit through which the connection line of the second-phase coil group passes, the crossing route of the corresponding outside guide wall unit is formed to have a bottom portion disposed lower than that of the crossing route of the corresponding inside guide wall unit and has an inclined side edge portion that guides the corresponding connection line toward the corresponding bottom portion.

By this, a contact may be avoided even when connection lines of different phases cross each other.

Detailed Embodiment of the Motor of the Third Embodiment

FIG. 25 illustrates a main portion of the motor of the embodiment.

The rotor 50 rotates about the rotation axis J, the rotation thereof is freely supported, and is formed of the rotor core 51, the connection plate 52, etc. The rotor 50 is a disk-shaped member. A plurality of magnetic poles (not shown) formed of S-poles and N-poles are alternately installed at surrounding portions of the rotor 50 in equal intervals in the circumferential direction, and the connection plate 52 to which the drum 2 is directly connected is installed at a central portion of the rotor core 51.

The stator 20 is a thin cylindrical member that is disposed around the rotor 50 on the same axis. The inner circumferential surface of the stator 20 faces the outer circumferential surface of the rotor 50 while having a small gap therebetween. The stator is formed of the stator core 21, the plurality (48 in the motor 3) of coils 22, etc.

Here, same as in the second embodiment, the stator core 21 of the embodiment corresponds to the stator 20 of the first embodiment.

As illustrated in FIG. 26, the stator core 21 is formed of the core main body 23 formed by stacking metal plates covered by the insulating insulator 24. The stator core 21 includes the cylindrical yoke part 21a and the plurality (48 in the motor 3) of teeth parts 21b radially extending from an inner circumferential surface of the yoke part 21a in equal intervals in the circumferential direction. As many slots S as the number of the teeth parts 21b through which wires are inserted to pass are formed between two adjacent teeth parts 21b and 21 b.

Most of the portions of the yoke part 21a and the teeth parts 21b besides the protruding end portions of the teeth parts 21b are covered by the insulator 24. In the DD motor 3, the stator core 21 is integrally formed using a synthetic resin formed by an insertion forming as if surrounding the core main body 23. Here, the stator core 21 may be formed by covering an insulator member separately formed at the core main body 23.

Each of the coils 22 are formed by intensive winding. That is, the coils 22 are formed by wires (covered wires) wound around each of the teeth parts 21b. Three-phase coil groups 25U, 25V, and 25W formed of U-phase, V-phase, and W-phase are installed at a wall unit 32 of the stator 20, and the three-phase coil groups 25U, 25V, and 25W are connected by a star connection (may be a delta connection).

Specifically, as illustrated in FIG. 27, each of the coil groups 25U, 25V, and 25W is formed of 16 coils 22 connected in series, and one end thereof is connected to a neutral point. The other end of each of the coil groups 25U, 25V, and 25W is withdrawn from the stator 20 to be connected to a terminal of power of each phase.

Each of the coil groups 25U, 25V, and 25W is formed with one wire in the stator 20, and the coil groups 25U, 25V, and 25W are simultaneously formed using a winder that includes three nozzles N1, N2, and N3 and employs the nozzle winding method. Consequently, the manufacturability is excellent since the coils 22 of each of the phases may be formed with a small number of processes.

Specifically, as illustrated in FIG. 28, the nozzles N1, N2, and N3 that each synchronize and wind the wires for each of the phases is disposed at the winder. The wires are each withdrawn from the front end portions of the nozzles N1, N2, and N3, and the nozzles N1, N2, and N3 may be displaced in the axial direction and the diameter direction with respect to the stator core 21. Also, a rotation of the stator core 21 set by the winder may be controlled by the winder.

The winder is controlled such that the coil groups 25U, 25V, and 25W are automatically formed in predetermined winding patterns by the wires being wound around predetermined teeth parts 21b corresponding to each of the phases when a winding operation begins.

In more detail, the winding of the wires begins after each position of the nozzles N1, N2, and N3 with respect to the predetermined teeth parts 21b of each of the phases are determined. The nozzles N1, N2, and N3 are displaced in the diameter direction while alternately repeating axial displacements of the nozzles N1, N2, and N3 and the rotation of the stator core 21 in a predetermined order such that the wires drawn out of the nozzles N1, N2, and N3 are wound around the teeth parts 21b.

As illustrated in FIG. 26, in the embodiment, the teeth parts 21b of each of the phases are formed of three teeth parts 21b, 21 b, and 21b consecutively formed in the circumferential direction while skipping one teeth part 21b. "U1" and the like illustrated in FIG. 26 illustrate winding patterns thereof, where "U" in the "U1" represents the U-phase, and "1" represents a winding order.

For example, U1, W1, and V1 represent the teeth parts 21b of each of the phases simultaneously wound first, and U2, W2, and V2 represent the teeth parts 21b of each of the phases simultaneously wound second. Sixteen times of the winding operation are sequentially performed in the stator 20, and all of the coils 22 of the coil groups 25U, 25V, and 25W of each of the phases are formed.

Here, although a direction of each winding of the wires around the teeth parts 21b during the winding operation includes a clockwise direction CW and a counterclockwise direction CCW, it will be described later.

In the coil groups 25U, 25V, and 25W of each of the phases, a connection line 27 for connecting two consecutive coils 22 and 22 exists therebetween. Although a length of the connection line 27 varies in accordance with the winding patterns, a short connection line 27 (a first connection line 27a) for connecting the two adjacent coils 22 and 22 and a long connection line 27 (a second connection line 27b) for connecting the two coils 22 and 22 disposed while having four coils 22 therebetween exist in the stator 20.

In the stator 20, a wiring structure 30 is formed such that automatic wiring of the connection lines 27a and 27b is facilitated and the stator 20 may become thin while avoiding twisting of wires between different phases.

Specifically, as illustrated in (a) of FIG. 28, the wiring structure 30 is installed at one end portion of the yoke part 21a coming in contact with the axial direction in the stator 20. In more detail, the end portion of the yoke part 21a is covered by a ring-shaped end surface portion 24a of the insulator 24, and a pair of ring-shaped guide wall units 31 and 32 disposed in a concentric form while having a gap therebetween is installed on the end surface portion 24a (the inside guide wall unit may be referred to as the inside guide wall unit 31, and the outside guide wall unit may be referred to as the outside guide wall unit 32).

By this, a ring-shaped inside route 38 that enables the first connection line 27a and the second connection line 27b to be wired is installed between the inside guide wall unit 31 and the outside guide wall unit 32, and a ring-shaped outside route 39 that enables the second connection line 27b to be wired is installed at an outside of the outside guide wall unit 32.

As illustrated in FIGS. 29 to 31, a plurality of crossing routes 34 and 36 enabling the connection line 27 to be wired in the diameter direction because each of the upper end edges is concave are formed at each of the upper end edges of the inside guide wall unit 31 and the outside guide wall unit 32.

Each of the crossing routes (inside crossing routes 34) formed at the inside guide wall unit 31 and each of the crossing routes (outside crossing routes 36) formed at the outside guide wall unit 32 are each formed between each of the teeth parts 21b, i.e. at a position facing each of the slots S. Consequently, the outside crossing routes 36 and the inside crossing routes 34 face each other in the diameter direction.

As illustrated in FIG. 29, the inside crossing routes 34 include first and second inside crossing routes 34A and 34B having rectangular cross sections of different depths. A bottom surface 35 (bottom portion) of the first inside crossing route 34A is formed of an upper surface of the end surface portion 24a. With respect to this, the bottom surface 35 (bottom portion) of the second inside crossing route 34B is at a middle portion of the inside guide wall unit 31 and is disposed higher than the end surface portion 24a.

Specifically, a depth of the second inside crossing route 34B is formed to be at least two times or greater than outer diameters of the wires, and a height from the bottom surface 35 of the second inside crossing route 34B to the upper surface of the end surface portion 24a is formed to be at least a multiple of the outer diameters of the wires.

The first inside crossing route 34A is disposed corresponding to a withdrawal position and an insertion position of the second connection line 27b in the first-phase coil group 25V to be described later. The second inside crossing route 34B is disposed corresponding to a withdrawal position and an insertion position of the second connection line 27b in the third-phase coil group 25U to be described later In addition, the first inside crossing route 34A and the second inside crossing route 34B are also disposed as pairs at a withdrawal position and an insertion position of the first connection line 27a.

The outside crossing routes 36 include first to third outside crossing routes 36A, 36B, and 36C which are in different forms. The first outside crossing route 36A has the same form as the second inside crossing route 34B as illustrated in FIG. 29.

The second outside crossing route 36B has a form that is as if the outside guide wall unit 32 is divided, and one side surface portion 37 thereof is inclined in a reverse bank shape as illustrated in FIG. 30. The second outside crossing route 36B is disposed to face the second inside crossing route 34B.

Specifically, the bottom surface 35 (bottom portion) of the second outside crossing route 36B becomes an upper surface of the end surface portion 24a and is disposed lower than the bottom surface 35 of the second inside crossing route 34B. Also, the one side surface portion 37 of the second outside crossing route 36B is inclined in a direction toward where contact is made with a side of the bottom surface 35 and is formed of an inclined side surface portion 37a that is deeply cutout toward the side of the bottom surface 35.

The third outside crossing route 36C has the inclined side surface portion 37a installed at the other side surface portion 37 with respect to the second outside crossing route 36B as illustrated in FIG. 31. That is, the inclined side surface portions 37a of the second outside crossing route 36B and the third outside crossing route 36C are formed in opposite directions of the circumferential direction.

Each of the inclined side surface portion 37a of the second outside crossing route 36B and the third outside crossing route 36C is inclined at a predetermined angle.

Specifically, as illustrated in FIGS. 30 and 31, an inclined angle θ of each of the inclined side surface portions 37a with respect to a reference line orthogonal to the bottom surface 35 is set to be 10° or greater. By setting the inclined angle θ to be in the above range, the wires may stably enter lower portions.

The first outside crossing route 36A is disposed corresponding to a withdrawal position and an insertion position of the second connection line 27b in the third-phase coil group 25U to be described later. The second outside crossing route 36B and the third outside crossing route 36C are disposed corresponding to a withdrawal position and an insertion position of the second connection line 27b in the second-phase coil group 25W to be described later.

(Flow of Coils)

Next, a detailed process of winding operation of the stator 20 will be sequentially described with reference to FIGS. 32 to 40.

As illustrated in FIG. 32, forming the coils 22 starts by beginning to wind the coil groups 25U, 25V, and 25W of each of the phases from each of the teeth parts 21b of U1, W1, and V1, and the coils 22 are sequentially formed by controlling counterclockwise displacements of the three nozzles N1, N2, and N3 (may also be clockwise) with respect to the stator core 21. Here, CW and CCW at each degree represents the clockwise direction and the counterclockwise direction, which are directions of winding the wires, and S1, and the like represent a slot number.

The coil group 25V of the first-phase (V-phase in the stator 20) is formed by the first nozzle N1 disposed in front with respect to a displacement direction of the nozzle group N1, N2, and N3. Likewise, the coil group 25W of the second-phase (W-phase in the stator 20) is formed by the second nozzle N2 disposed nearby the first nozzle N1, and the coil group 25U of the third-phase (U-phase in the stator 20) is formed by the third nozzle N3 disposed at the rear.

As illustrated in FIG. 32, after the coils 22 of each of the phases are formed at each of the teeth parts 21b of U1, W1, and V1, the coils 22 of each of the phases are formed at each of the teeth parts 21b of U2, W2, and V2. Here, the wires are first withdrawn to the inside route 38 via the inside crossing routes 34 corresponding to slots S1, S3, and S5 and hung on the inside guide wall unit 31, and are then inserted into the inside via the inside crossing routes 34 corresponding to slots S2, S4, and S6. As a result, three first connection lines 27a are formed.

In addition, as illustrated in FIG. 33, after the coils 22 of each of the phases are formed at each of the teeth parts 21b of U2, W2, and V2, the coils 22 of each of the phases are formed at each of the teeth parts 21b of U3, W3, and V3. Consequently, since each of the wires has to be covered up to distant slots S7, S9, and S11, the second connection line 27b is wired using the wiring structure 30.

Here, the second connection lines 27b are wired in a different manner for each of the phases. The wiring structure 30 is configured such that different wiring is possible by only changing a displacement magnitude of each of the nozzles N1, N2, and N3 in the diameter direction.

As illustrated in FIGS. 34 and 35, the second connection line 27b of the first-phase (V) that leads the displacement direction may be drawn out to the inside route 38 via the first inside crossing route 34A corresponding to the slot S5, may be hung on the inside guide wall unit 31 to be wired along the bottom portion of the inside route 38, and may be inserted into the slot S11 via the first inside crossing route 34A.

As illustrated in FIGS. 36 and 37, the second connection line 27b of the second-phase (W) may be drawn out via the second inside crossing route 34B corresponding to the slot S3, may be hung on the inclined side surface portion 37a of the third outside crossing route 36C to be wired along the bottom portion of the outside route 39, may be hung on the inclined side surface portion 37a of the second outside crossing route 36B, and may be inserted into the slot S9 via the second inside crossing route 34B.

Since the bottom portions of the second outside crossing route 36B and the third outside crossing route 36C are disposed lower than that of the second inside crossing route 34B, the second connection line 27b of the second-phase (W) is wired to pass an upper portion of the second connection line 27b of the first-phase (V) wired toward a floor of the inside route 38 even when the second connection line 27b of the second-phase (W) is guided toward a floor of the outside route 39. Consequently, the second connection line 27b of the second-phase (W) and the second connection line 27b of the first-phase (V) may be prevented from coming in contact with each other even when the two cross each other.

The second connection line 27b of the third-phase (U), as shown in FIGS. 38 and 39, may be drawn out to the outside route 39 via the second inside crossing route 34B and the first outside crossing route 36A corresponding to the slot 51, may be hung on the outside guide wall unit 32 to be wired to pass an upper portion of the outside route 39 and an upper portion of the second connection line 27b of the second-phase (W), and may be inserted into the slot S7 via the first outside crossing route 36A and the second inside crossing route 34B.

Since the second connection line 27b of the second-phase (W) is disposed toward the floor of the outside route 39 by being hung on the inclined side surface portion 37a, coming in contact with the second connection line 27b of the third-phase (U) may be prevented even when the second connection line 27b of the second-phase (W) is vertically disposed.

In the case of the nozzle winding method using the three nozzles N1, N2, and N3, although the wires of each of the phases are generally wired by being divided into three stages of top, middle, and bottom, the height of the wiring structure 30 is sufficient when at least two wires are disposed by emptying a gap such that the DD motor 3 may become lower in profile by suppressing the axial height of the stator 20.

By this, after the wires are introduced into the slots S7, S9, and S11, the coils 22 of each of the phases are formed at each of the teeth parts 21b of U3, W3, and V3 as illustrated in FIG. 40. Then, the winding operation is repeated from the above-mentioned teeth parts 21b of U1, W1, and V1 up to the teeth parts 21b of U3, W3, and V3 such that the coil groups 25U, 25V, and 25W of each of the phases are formed.

Modified Embodiment of the Third Embodiment

For example, a form of the crossing route is one example and may be suitably changed in accordance with specifications within a range in which an original function is not affected.

The winding pattern may also be suitably changed in accordance with specifications of motors. An example thereof is illustrated in FIGS. 41 and 42. Here, since a basic wiring structure 30 is the same as the embodiment and a method of wiring the connection lines is the same as the embodiment, the same traces are given to the same members and the description thereof is omitted.

In a stator 20' of FIG. 41, the teeth parts 21b of each of the phases that are simultaneously formed are consecutively disposed in the circumferential direction. In the stator 20', one type of the connection lines 27 exists, and the stator 20' is formed of the connection lines 27 for connecting two coils 22 disposed by having two coils 22 and 22 disposed therebetween. The connection lines 27 are wired in the same way as the second connection lines 27b of the embodiment.

In a stator 20" of FIG. 42, the teeth parts 21b of each of the phases that are simultaneously formed are consecutively disposed in the circumferential direction while skipping two teeth parts 21b. In the stator 20", for example, the connection lines 27 between each of the coils 22 formed at the teeth parts 21b of U3, W3, and V3 and each of the coils 22 formed at the teeth parts 21b of U4, W4, and V4 are wired in the same way as the second connection lines 27b of the embodiment.

A lower end of each of the inclined side surface portions 37a of the second outside crossing route 36B and the third outside crossing route 36C are preferably disposed to deviate from the wire exiting positions toward a circumferential outside.

Specifically, as illustrated in FIG. 43, a lower end of the inclined side surface portion 37a of the third outside crossing route 36C disposed at a winding ending side of the coils 22 to have the drawn out wires locked thereto is disposed to deviate further back with respect to a direction in which the second connection lines 27b advance along the outside route 39 (direction of winding treatment) when the winding operation is performed than a position P1 from which the wires are drawn out from the coils 22 in the circumferential direction.

Likewise, a lower end of the inclined side surface portion 37a of the second outside crossing route 36B disposed at a winding starting side of the coils 22 to have the inserted wires hang thereon is disposed to deviate further forward with respect to the direction of the winding operation than a position P2 at which winding the wires around the teeth parts 21b starts in the circumferential direction.

By this, the wires may be stably hung at predetermined positions, and the second connection lines 27b of the second-phase (W) may be more stably wired in a proper manner.

Figure 44A:
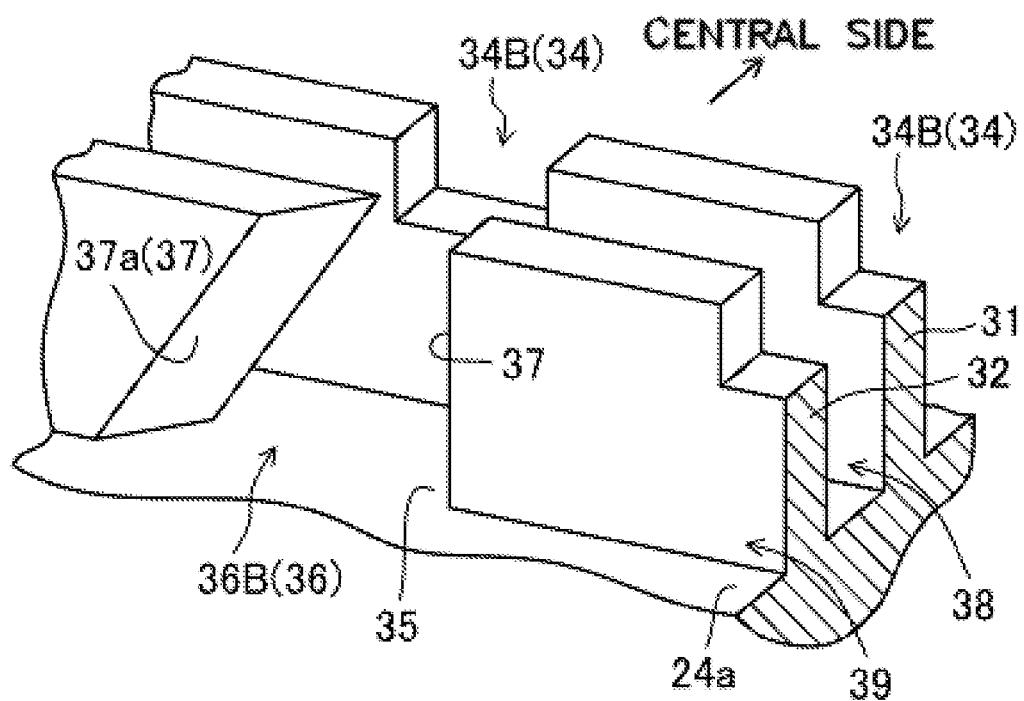

As illustrated in FIG. 44(a), each of the inclined side surface portions 37a of the second outside crossing route 36B and the third outside crossing route 36C may be further inclined toward the outside in the diameter direction. Then, the wires may more stably enter the lower portions.

Figure 44B:
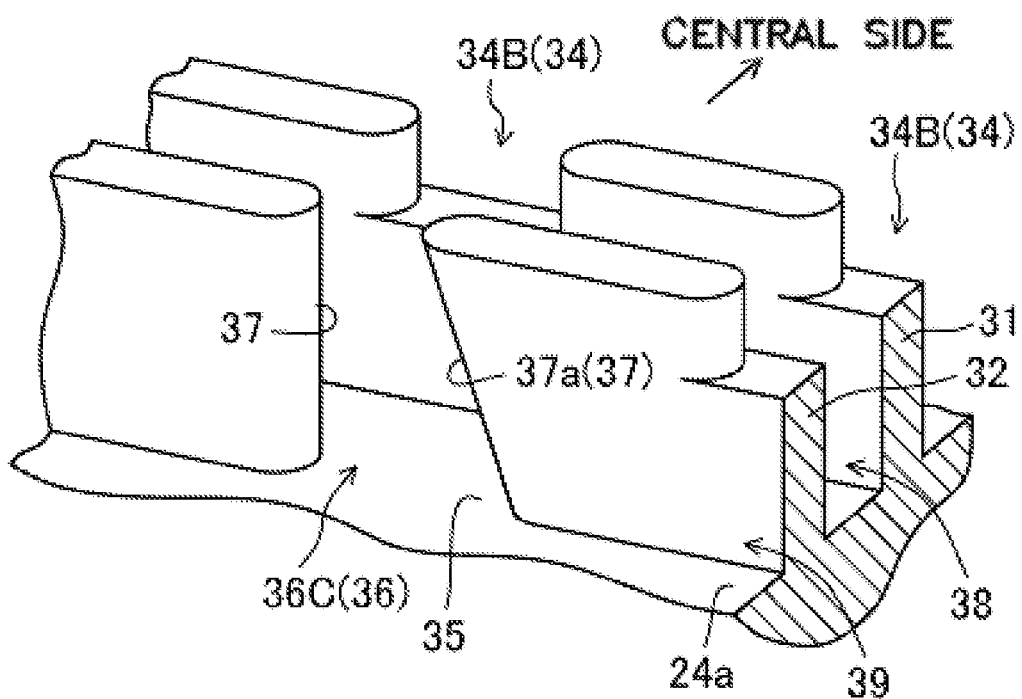

In addition, as illustrated in FIG. 44(b), side surfaces respectively dividing the outside crossing route 36 and the inside crossing route 34 are preferably curved surfaces with arc-shaped end surfaces. By this, a contact resistance of the wires may be mitigated and the wiring may be more stably performed.

Fourth Embodiment

In a motor of the fourth embodiment, a configuration of a rotor will be mainly described.

Overview of the Motor of the Fourth Embodiment

Figure 1:
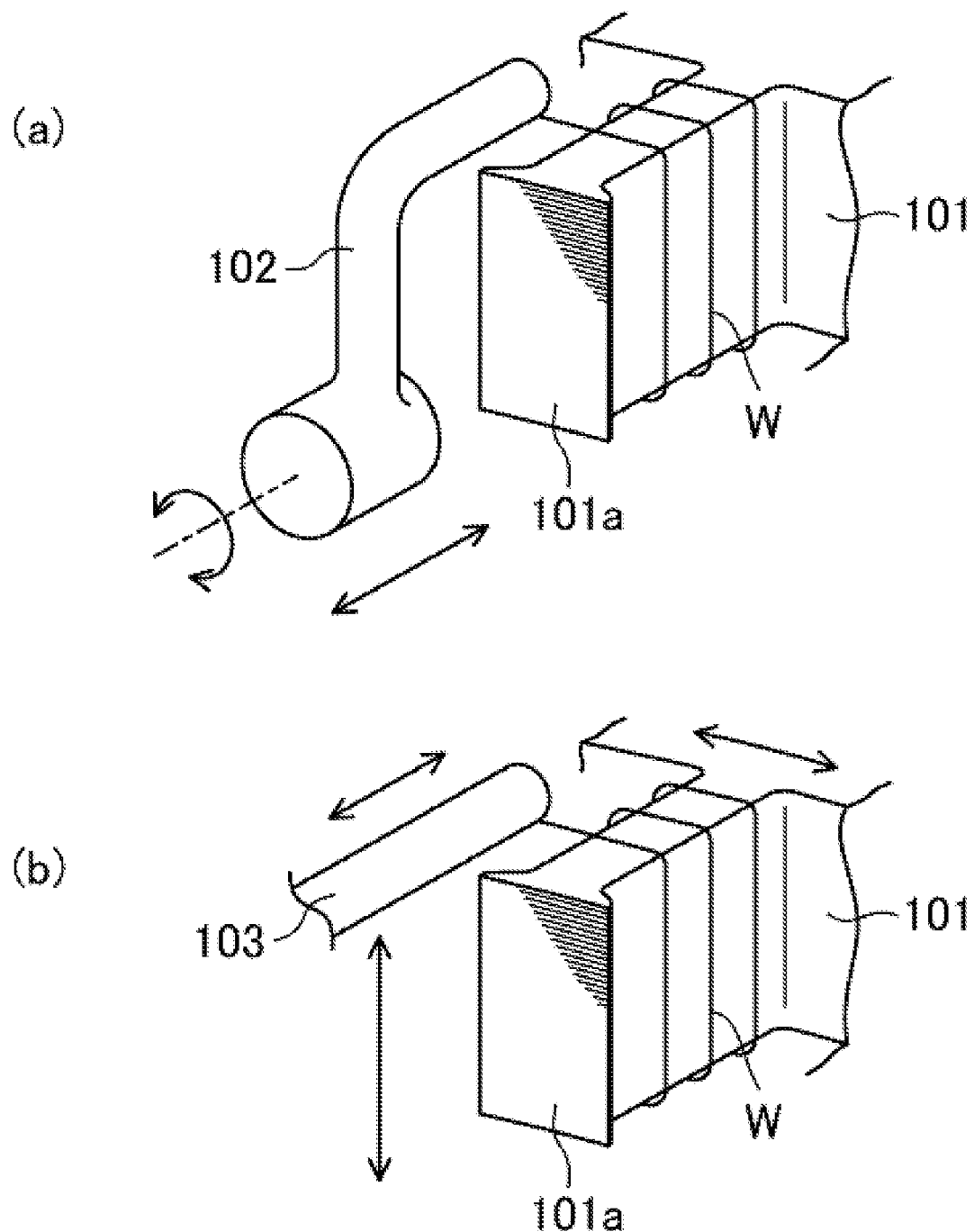
FIG. 1 is a schematic illustrating coiling methods. (a) illustrates a flyer method, and (b) illustrates a nozzle winding method.
Figure 2:
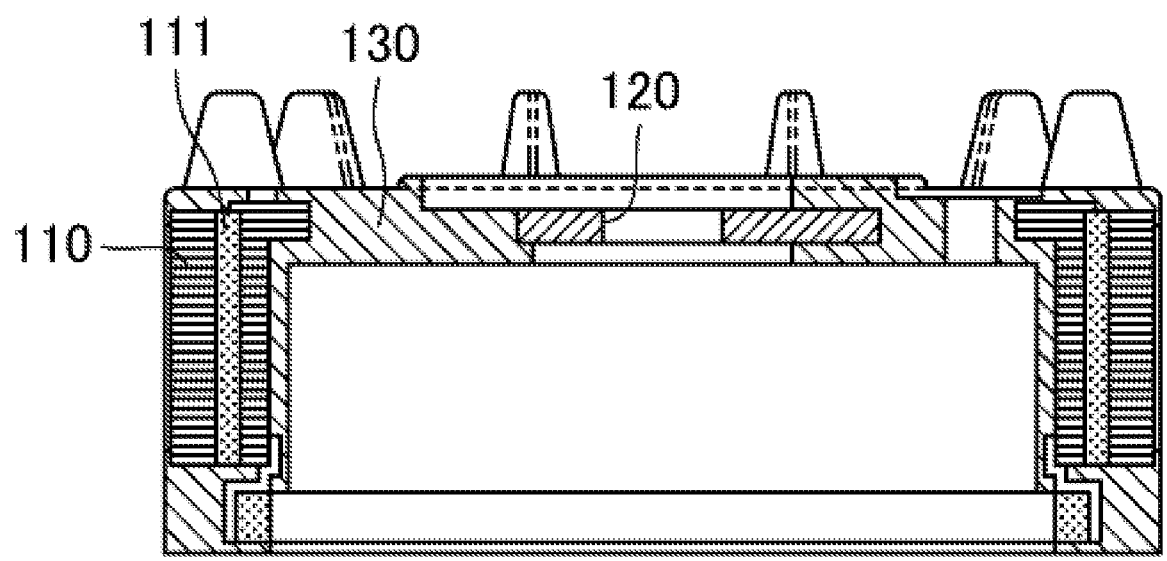
FIG. 2 is a cross-sectional view illustrating a configuration of a rotor of a conventional motor.

As illustrated in FIG. 2, a predetermined space is secured inside the rotor core 110 formed in the shape of a ring in a rotor of a motor used in a washing machine and the like to arrange and install a rotation shaft of the washing machine.

Consequently, the support plate 120 is disposed at an end portion of a rotation axis direction, and the resin portion 130 for connecting the rotor core 110 to the support plate 120 is also formed at the end portion at the same time. Thus, the rotor core 110 is supported by the resin portion 130 for connecting the rotor core 110 to the support plate 120 at the end portion.

As a result, there is a concern that the axial direction of the rotor core 110 may be tilted with respect to the rotation axis by a contraction of the resin 130 when the rotor core 110 is integrally formed with the resin 130 by the insertion forming. When the axial direction of the rotor core 110 is tilted, a rotation speed of a rotor is not constant since an interval between a rotor and a stator facing each other changes in the axial direction, and as a result, a vibration of the motor increases, or characteristics are degraded.

Here, in the motor of the fourth embodiment, a device is installed in the rotor to prevent the axial direction of the rotor core from tilting.

That is, a rotor of the motor of the fourth embodiment includes a ring-shaped rotary body having a rotor core as well as a plurality of magnet pieces, and a support body installed at an inside of the rotary body in a diameter direction to interlock and support a shaft rotating about a rotation axis. The rotary body and the support body are integrally formed with a resin by an insertion forming and are connected to the inner circumferential surface of the first resin portion that surrounds the rotary body and the outer circumferential surface of the second resin portion that surrounds the support body by a connection part formed of the third resin portion, and the third resin portion forming the connection part is connected to an axial central portion of the inner circumferential surface of the first resin portion.

Consequently, according to the rotor of the motor, axial tilting of the rotary body may be prevented.

Detailed Embodiment of the Motor of the Fourth Embodiment

FIGS. 45 and 46 illustrate the rotor 50 of the embodiment. The rotor 50 includes a ring-shaped rotary body 53 and a hollow cylindrical support body 56 installed at an inside of the rotary body 53 in the diameter direction to interlock and support a shaft 67 that rotates about the rotation axis J.

Here, the support body 56 of the embodiment corresponds to the connection part 52a of the rotor 50 of the second embodiment, and a connection part to be described below corresponds to the connection plate 52 of the second embodiment.

Here, as illustrated in FIG. 47(a), the rotary body 53 is formed by a plurality of rotor cores 51 and a plurality of magnetic pieces 54 alternately arranged with each other in the shape of a ring. Yet, as illustrated in FIG. 47(b), a groove 55 for determining positions during the insertion forming is installed at an inner surface of each of the rotor cores 51. Here, the rotor cores 51 may be a configuration formed by stacking a plurality of metal plates.

The rotary body 53 and the support body 56 are integrally formed with a resin 60 by the insertion forming. The insertion forming may be performed using a well-known method. Specifically, the insertion forming may be performed by loading the plurality of rotor cores 51, the plurality of magnetic pieces 54, and the support body 56 in a mold, injecting the resin in the mold, and fixing the rotor cores 51, the magnetic pieces 54, and the support body 56 by the resin.

The rotor 50 formed by the insertion forming is connected to an inner circumferential surface of a first resin portion 61 that surrounds the rotary body 53 and an outer circumferential surface of the second resin portion 62 that surrounds the support body 56 by a connection part formed of a third resin portion 63. Also, the third resin portion 63 forming the connection part is connected to an axial central portion of the inner circumferential surface of the first resin portion 61.

That is, the rotary body 53 is supported by the third resin portion 63 that connects the rotary body 53 to the support body 56 at the axial central portion. As a result, since an axial distance that supports the rotary body 53 by the third resin portion 63 shortens (½ compared to a case of supporting the rotary body 53 by an axial end portion), the axial tilting of the rotary body 53 may be suppressed even when the contraction of the resin 60 occurs after the insertion forming.

In addition, for the connection between the third resin portion 63 and the rotary body 53, since a centrifugal force during rotation acts on the connection part proportional to an axial distance between the corresponding connection part and an end surface of the rotary body 53, a support strength of the connection part between the third resin portion 63 and the rotary body 53 is required. Conversely, when the connection between the third resin portion 63 and the rotary body 53 is at the center, the required support strength becomes the smallest.

Since the rotor 50 forms a motor by a combination in which a stator is disposed to face an outer circumferential surface of the rotor 50, a gap between the rotor 50 and the stator changes when the rotary body 53 is axially tilted by the centrifugal force at the time of rotation. Thus, the rotary speed of the rotor 50 is not constant, and problems such as an increase in the vibration or noise of the motor, degradation in the characteristics of the motor, a noise caused by the rotor 50 coming in contact with the stator occur.

Therefore, the connection between the third resin portion 63 and the rotary body 53 is in a range of 2 mm to 8 mm and preferably 2 mm to 5 mm from the axial center of the rotary body 53.

Although the plurality of rotor cores 51 and the plurality of magnetic pieces 54 are alternately arranged in the shape of a ring and loaded in the mold, it is preferable that the groove 55 traced in FIG. 47(b) is pressed by a pin from an inner circumferential side to an outer circumferential side. Since the positions of the rotor cores 51 are determined to be at an outer circumferential mold by this, the roundness of an outer diameter of the rotor cores 51 fixed by the resin may be improved.

Yet, as illustrated in FIGS. 45 and 46, through-holes 65, which are traces of removing the pins that have pressed the grooves 55 from the inner circumferential side to the outer circumferential side during the insertion forming, are formed at positions corresponding to the grooves 55 at the inner circumferential surface of the first resin portion 61 that surrounds the rotary body 53.

Here, the grooves 55 provided at the inner surfaces of the rotor cores 51 are preferably installed at each of the rotor cores 51. By this, the roundness of the outer diameter of the rotor cores 51 fixed by the resin may be further improved.

The third resin portion 63 that connects the rotary body 53 to the support body 56 is a ring-shaped plate. In this case, as illustrated in FIGS. 45 and 46, an outer circumferential portion 63a of the third resin portion 63 is connected to the inner circumferential surface of the first resin portion 61, and an inner circumferential portion 63c of the third resin portion 63 is connected to the outer circumferential surface of the second resin portion 62. By this, the strength within which the third resin portion 63 supports the rotary body 53 and the support body 56 may be increased.

In addition, the support body 56 is disposed at the axial end portion side with respect to the rotary body 53. By this, for example, a space in which a shaft and the like of a washing machine that is interlocked to the support body 56 is arranged and installed may be secured inside the rotary body 53 in the diameter direction when the motor is used in the washing machine.

Here, the third resin portion 63 is curved toward the axial end portion from the portion 63a connected to the inner circumferential surface of the first resin portion 61 to be connected to the outer circumferential surface of the second resin portion 62. By this, a sufficient space may be secured inside the rotary body 53 in the diameter direction even when the third resin portion 63 is connected to the axial central portion of the inner circumferential surface of the first resin portion 61.

Here, the portion 63b in which the third resin portion 63 is curved may be suitably determined in consideration of a size of a space that needs to be secured or the strength of the third resin portion 63. A distance between the curved portion 63b and the portion 63c connected to the outer circumferential surface of the second resin portion 62 is preferably 30 mm or less due to position relations of joining parts of the motor, or the curved portion 63b may not have a slope.

The plurality of magnetic pieces 54 that forms the rotary body 53 may be magnetized before the insertion forming or may be magnetized by the magnetizing yoke after the insertion forming. However, in the former case, magnetization directions of the magnetic pieces may be erroneously disposed when the plurality of pre-magnetized magnetic pieces are alternately arranged with the plurality of rotor cores 51 in the mold.

Here, to prevent an error in the disposition, it is preferable that the magnetic pieces 54 are magnetized by the magnetizing yoke after the insertion forming.

FIG. 48 is a view illustrating a method of magnetizing the magnetic pieces 54 by the magnetizing yoke after an insertion forming.

As illustrated in FIG. 45, an inner space of the rotary body 53 in the diameter direction is divided into two spaces while having the third resin portion 63 therebetween. Here, as illustrated in FIG. 48, a magnetizing yoke 66 is disposed at an outside of the rotary body 53 in the diameter direction, and magnetizing yokes 66a and 66b are respectively arranged and installed in the two divided spaces of the inside of the rotary body 53 in the diameter direction. By this, the plurality of magnetic pieces 54 forming the rotary body 53 may be magnetized.

In addition, as illustrated in FIG. 48, layers of magnetizing yokes 66d and 66e may be further arranged and installed at axial outer portions of the rotary body 53 to magnetize the magnetic pieces 54. Here, the magnetizing yokes 66a, 66b, 66d, and 66e are formed of a configurations in which a coil is wound around a core portion.

In addition, the third resin portion 63 is preferably a flat shape that is perpendicular to the axial direction at least at portions where the magnetizing yokes 66a and 66b are arranged and installed. By this, the magnetizing yokes 66a and 66b may be disposed at stable positions with respect to the rotary body 53.

In addition, a thickness of the third resin portion 63 at the portions where the magnetizing yokes 66a and 66b are arranged and installed is preferably thin for a magnetic flux to flow up to central portions of the magnetic pieces 54 in a range in which a strength of supporting the rotary body 53 may be maintained and is more preferably in a range of 2-5 mm. By this, the magnetization may be performed while sufficiently securing performances of the magnetic pieces 54 and securing the support strength.

However, when the thickness of the third resin portion 63 cannot be sufficiently thin, a plurality of penetration holes 68 may be formed at the third resin portion 63 along the circumferential direction as illustrated in FIG. 49. By this, as illustrated in FIG. 50, the magnetizing yokes 66a and 66b arranged and installed one in each of the two spaces may be connected by a magnetizing yoke 66c arranged and installed at the penetration holes 68.

As a result, a magnetic field generated by the magnetizing yokes may be increased, and the magnetization of the magnetic pieces 54 may be efficiently performed. Here, to uniformly magnetize the magnetic pieces 54, the plurality of penetration holes 64 are preferably formed in equal intervals along the circumferential direction.

Here, a shape of the penetration holes 68 is not particularly limited, and may be, for example, circular or rectangular. Also, the penetration holes 68 may be formed in the shape of a slit that is opened up to the inner circumferential surface of the first resin portion 61.

Modified Embodiment of the Fourth Embodiment

For example, although the rotary body 53 is formed by the plurality of rotor cores 51 and the plurality of magnetic pieces 54 alternately arranged with each other in the shape of a ring in the fourth embodiment, embodiments are not limited thereto. For example, a plurality of grooves may be installed at ring-shaped rotor cores along the circumferential direction, and each of the plurality of magnetic pieces may be buried in the grooves.

In addition, although the support body 56 is disposed at the axial end portion side with respect to the rotary body 53 in the fourth embodiment, embodiments are not limited thereto, and the support body 56 may be, for example, disposed at an axial central portion with respect to the rotary body 53.

In addition, although the third resin portion 63 is a ring-shaped plate in the fourth embodiment, embodiments are not limited thereto. For example, to improve the strength of the third resin portion 63, a reinforcement rib may be installed at the ring-shaped plate portion. Also, the third resin portion 63 may not be formed in the shape of a ring and may be formed of a plurality of connection parts radially extending from the outer circumferential surface of the second resin portion 62 toward the inner circumferential surface of the first resin portion 61.

Fifth Embodiment

A motor of the fifth embodiment includes a device to suppress a vibration or noise of the motor in a resin molding step.

Overview of the Motor of the Fifth Embodiment

In the motor of the embodiment, resin injection traces of injecting the resin during the insertion forming are formed at an outer region in the diameter direction from a middle circle that halves a portion between the outer circumferential surface of the support body and the inner circumferential surface of the rotary body in the third resin portion 63.

That is, the resin is injected from the outer region in the diameter direction of the middle circle during the insertion forming. By this, a resin pressure applied toward the rotary body disposed at an outside in the diameter direction when the resin is injected may be relatively rapidly and strongly acted.

An outer circumferential surface of the rotary body presses the rotary body toward the outside in the diameter direction by the resin pressure in order to be supported by an inner surface of a highly precise mold such that the rotary body stably comes in close contact with the mold during the molding. As a result, a rotor with a position with a high precision and therefore having an excellent vibrational precision may be formed.

In more detail, traces of removing pins that have exited in the diameter direction to be pressed toward the inner circumferential surface of the rotary body during the insertion forming are formed at an inside of the first resin portion in the diameter direction that is disposed at an axial opposite side of the resin injection traces.

That is, the pins are discharged from the axial opposite side in the diameter direction with respect to resin injection positions, and the pins are pressed to the inner circumferential surface of the rotary body to support the rotary body during the insertion forming. By this, the rotary body may come in closer contact with the mold.

Since the pins are discharged from the axial opposite side of the resin injection directions, there is also an advantage of being able to dispose the resin and the pins without an interference between the two.

In addition, the rotor includes a ring-shaped rotary body having a rotor core and a plurality of magnet pieces and a support body installed at an inside of the rotary body in a diameter direction to interlock and support a shaft rotating about a rotation axis wherein the rotary body and the support body are integrally formed with a resin by resin molding by an insertion forming, stator-side resin injection traces which are a plurality of resin injection traces are formed approximately in equal intervals in the circumferential direction at the insulator of the stator, rotor-side resin injection traces which are a plurality of resin injection traces are formed approximately in equal intervals in the circumferential direction at the rotor, and a number of the stator-side resin injection traces and a number of the rotor-side resin injection traces may be set not to have a common factor other than 1.

In addition, a least common multiple between the number of stator-side resin injection traces and the number of rotor-side resin injection traces may be greater than the number of slots of the stator and the number of magnetic poles of the rotor.

A slight deformation of resin may occur corresponding to resin injection spots when the resin hardens. When the spots of injecting resin to the rotor and the stator are disposed approximately in equal intervals in the circumferential direction, deformations of the resin are also generated approximately in equal intervals in the circumferential direction corresponding to the resin injection spots.

In this case, a vibration or noise may be periodically generated between the relatively rotating rotor and the stator due to the deformations of the resin when the motor is rotated.

That is, a mechanical precision of a gap between the rotor and the stator may change in approximately equal intervals in the circumferential direction, and as a result, a vibration or noise is generated due to a periodical magnetic change caused during rotation.

For this, since the changes of the mechanical precision caused by the deformations of resin may be scattered when the motor is set in the above relations, a vibration of the motor may be suppressed.

Detailed Embodiment of the Motor of the Fifth Embodiment

FIGS. 51 and 52 illustrate the rotor 50 of the embodiment. The rotor 50 illustrated in the present embodiment is substantially the same as the rotor 50 illustrated in FIG. 49 in the fourth embodiment. Consequently, like reference numerals will be used for like members and the description thereof will be omitted.

As illustrated in FIG. 51(a), a plurality of traces of injecting resin during the insertion forming are formed at a side of one surface of the third resin portion 63 (rotor-side resin injection traces 201).

The resin injection traces 201 are formed in approximately equal intervals in the circumferential direction at an outer region in the diameter direction of a virtual middle circle MC that halves a portion between the outer circumferential surface of the support body 56 and the inner circumferential surface of the rotary body 53.

Specifically, when a distance from a center through which the rotation axis J passes to the outer circumferential surface of the support body 56 is R1, a distance from the center through which the rotation axis J passes to the inner circumferential surface of the rotary body 53 is R2, and a radius of the middle circle MC is R4, R2+R1=2R4. Also, when the resin injection traces 201 are formed at positions spaced apart from the center by a distance R3, R3>R4.

In addition, as illustrated in FIG. 51(b), a plurality of through-holes 202, which are traces of removing support pins HP that has supported the rotary body 53 from the inside during the insertion forming, are formed at a side of the other surface of the third resin portion 63.

Specifically, the through-holes 202 which radially extend are formed in approximately equal intervals in the circumferential direction at an inner circumferential surface coming in contact with an inside of the first resin portion 61 in the diameter direction. The through-holes 202 correspond to the through-holes 65 of the fourth embodiment (refer to FIG. 45).

FIG. 52 illustrates a state of the rotor 50 during the insertion forming. The support body 56 and the rotary body 53 are supported at predetermined positions inside a mold K. During the molding, a forming space FS for forming the first to third resin portions 61 to 63 is formed inside the mold.

A plurality of gates G are installed in the mold K, and resin is injected into the forming space FS via the gates G. Also, the plurality of support pins HP exiting in the diameter direction to be pressed to the inner circumferential surface of the rotary body 53 from the inside in the diameter direction are installed in approximately equal intervals in the circumferential direction.

The rotary body 53 is pressed by the mold K due to the support pins HP during the insertion forming. Since the position of the rotary body 53 may be determined with high precision by this, the rotor 50 with an excellent roundness may be formed.

The support pins HP are disposed at an axial opposite side of the gates G such that the gates G and the support pins HP may be disposed without interfering with each other and may each be installed in pluralities in proper locations.

By injecting the resin from a portion near the outside of the third resin portion 63 in the diameter direction, the resin pressure more rapidly acts toward the rotary body 53 disposed at the outside in the diameter direction than toward the support body 56 disposed at the inner circumference. Thus, since the rotary body 53 may be pressed to the mold K by the resin pressure and the molding may be performed while the rotary body 53 comes in close contact with the mold, the rotor 50 having an excellent roundness may be formed.

After the insertion forming, the resin injection traces 201 are formed at portions where inlets 203 of the gates G facing the forming space FS are located, and the through-holes 202 are formed at portions where the support pins HP are located.

FIG. 53 illustrates an example of the resin injection traces 201 and the through-holes 202. FIG. 53(a) is an example of the through-holes 202, and a narrow, long hole is concavely formed at a surface of resin. FIG. 53(b) is an example of the resin injection traces 201, and a small convex portion is formed at a surface of resin.

The through-holes 202 may be buried later by filling a resin and the like in the through-holes 202. In this case, as illustrated in FIG. 53(c), traces of the through-holes 202 may be found when a cross-section is closely examined due to different states of the resin.

In addition, the resin injection traces 201 may be flatly post-treated by abrading the traces. In this case, as illustrated in FIG. 53(d), the resin injection traces 201 may be found in the traces of movements of the resin when a cross-section is closely examined.

The through-holes of the first embodiment are the same as the above.

FIG. 54 illustrates a state of the stator 20 in the embodiment during the insertion forming. The stator 20 of the embodiment is substantially the same as the stator 20 of the first embodiment. Consequently, like reference numerals are used for like members, and the description thereof will be omitted.

The case of the stator 20 is also the same as the case of the rotor 50, and the connection core 10 is supported at a predetermined position in the mold K. During the molding, the forming space FS for forming the insulator 24 is formed inside the mold K.

The plurality of gates G extending toward the center from the outside in the diameter direction are radially installed in approximately equal intervals in the mold K. The resin is injected into the forming space FS via the gates G.

Consequently, a plurality of resin injection traces are formed at portions where the inlets 203 of the gates G facing the forming space FS are located after the insertion forming also at the insulator 24 of the stator 20 (stator-side resin injection traces).

In the motor of the embodiment, a particular relation may be set between a number of the portions where the resin is injected at the rotor 50 (portions where the rotor-side resin injection traces 201 are formed) and a number of the portions where the resin is injected at the stator 20 (portions where the stator-side resin injection traces are formed) to suppress vibration or noise of the motor.

Specifically, the number of the stator-side resin injection traces and the number of the rotor-side resin injection traces may be set not to have a common factor other than 1.

For example, when the number of the stator-side resin injection traces is 16 and the number of the rotor-side resin injection traces is 8, the numbers have 2, 4, and 8 as common factors other than 1. On the other hand, when the number of the stator-side resin injection traces is 16 and the number of the rotor-side resin injection traces is 7, the numbers do not have a common factor other than 1.

In the former case, two or more of the stator-side resin injection traces and the rotor-side resin injection traces may overlap in the diameter direction when the rotor 50 rotates with respect to the stator 20 such that a magnetic change may occur periodically and a vibration or noise may be caused.

In the latter case, there is no case in which the two or more of the stator-side resin injection traces and the rotor-side resin injection traces overlap in the diameter direction even when the rotor 50 rotates with respect to the stator 20 such that a likelihood for the magnetic change to occur periodically decreases and the vibration or noise may be suppressed.

In addition, the least common multiple between the number of the stator-side resin injection traces and the number of the rotor-side resin injection traces may be greater than the number of slots of the stator or the number of magnetic poles of the rotor.

For example, when the number of the stator-side resin injection traces is 8 and the number of the rotor-side resin injection traces is 4, the least common multiple between the numbers is 8. Consequently, a change in the mechanical precision occurs every eighth time.

In addition, when the number of slots of the stator 20 and the number of magnetic poles of the rotor 50 are respectively 48 and 32 which are greater than the least common multiple between the above numbers, the stator 20 and the rotor 50 are prone to be affected by the change in the mechanical precision since both 48 and 32 are multiples of 8. The same tendency may be present even when the number of slots of the stator 20 and the number of magnetic poles of the rotor 50 are not multiples of the least common multiple between the number of the stator-side resin injection traces and the number of the rotor-side resin injection traces.

For this, since the stator 20 and the rotor 50 are not prone to be affected by the change in the mechanical precision when the least common multiple between the number of the stator-side resin injection traces and the number of the rotor-side resin injection traces is greater than the number of slots of the stator 20 and the number of magnetic poles of the rotor 50, generation of a vibration or noise may be suppressed.

The invention claimed is:

1. A washing machine comprising a motor, wherein the motor comprises:
   a rotor that rotates around a rotation axis; and
   a stator facing the rotor while having a gap from the rotor,
   wherein the stator comprises:
      a ring-shaped connection core formed by connecting a plurality of divided cores;
      a reinforcement ring integrally formed with an outer circumferential portion of the connection core;
      a penetration hole configured to receive a slide pin and formed in a radial direction through the reinforcement ring at least at a coupling portion or a neighboring portion thereof of the divided cores; and
      an insulator formed by resin molding by an insertion forming and surrounding the connection core,
   wherein a radius of curvature of a divided core of the plurality of divided cores in the connection core in an assembled state is smaller than a radius of curvature of the divided core of the plurality of the divided cores that is bent from a substantially straight line shape into a half moon shape in an unassembled state of the connection core, so that a spring-back force is present within each of the plurality of divided cores in the connection core in the assembled state, and
   wherein the divided core in the substantially straight line shape includes a connection gap between adjacent cores that widens in a direction towards an interior surface of the divided core and that closes as the divided core is bent into the half moon shape.

2. The washing machine according to claim 1, wherein:
   a plurality of connection cores are stacked at the stator;
   coupling portions of each of the layers of the divided cores are disposed in equal intervals along the circumferential direction when viewed from an axial direction; and
   a number of magnetic poles of the rotor does not become a multiple of a total number of coupling portions of the divided cores.

3. The washing machine according to claim 1, wherein:
   a plurality of connection cores are stacked at the stator; and
   when an axial thickness of the rotor is Lm, an axial thickness of the connection cores as a whole is Ls, axial thicknesses of both outer connection cores among the connection cores are Lc, and an axial thickness of the inner connection core is Lca, Lc<Lca is satisfied when Ls<Lm, and Lc>Lca is satisfied when Ls>Lm.

4. A motor comprising:
   a rotor that rotates around a rotation axis; and
   a stator facing the rotor while having a gap from the rotor,
   wherein the stator comprises:
      a ring-shaped connection core formed by connecting a plurality of divided cores;
      a reinforcement ring integrally formed with an outer circumferential portion of the connection core;
      a penetration hole configured to receive a slide pin and formed in a radial direction through the reinforcement ring at least at a coupling portion or a neighboring portion thereof of the divided cores; and an insulator formed by resin molding by an insertion forming and surrounding the connection core, wherein a radius of curvature of a divided core of the plurality of divided cores in the connection core in an assembled state is smaller than a radius of curvature of the divided core of the plurality of the divided cores that is bent from a substantially straight line shape into a half moon shape in an unassembled state of the connection core, so that a spring-back force is present within each of the plurality of divided cores in the connection core in the assembled state, and wherein the divided core in the substantially straight line shape includes a connection gap between adjacent cores that widens in a direction towards an interior surface of the divided core and that closes as the divided core is bent into the half moon shape.

5. The motor according to claim 4, wherein:

a plurality of connection cores are stacked at the stator;

coupling portions of each of the layers of the divided cores are disposed in equal intervals along the circumferential direction when viewed from an axial direction; and a number of magnetic poles of the rotor does not become a multiple of a total number of coupling portions of the divided cores.

6. The motor according to claim 4, wherein:

a plurality of connection cores are stacked at the stator; and when an axial thickness of the rotor is Lm, an axial thickness of the connection cores as a whole is Ls, axial thicknesses of both outer connection cores among the connection cores are Lc, and an axial thickness of the inner connection core is Lca, Lc<Lca is satisfied when Ls<Lm, and Lc>Lca is satisfied when Ls>Lm.

* * * * *